(12) United States Patent
Pirlot de Corbion et al.

(10) Patent No.: US 12,062,296 B2
(45) Date of Patent: Aug. 13, 2024

(54) PATIENT-SPECIFIC CARDIOVASCULAR SIMULATION DEVICE

(71) Applicant: MENTICE AB, Gothenburg (SE)

(72) Inventors: Pierre-Benoît Pirlot de Corbion, Paris (FR); Frédéric Champ, Paris (FR); Noémi Renaudin, Paris (FR); Frédéric Piasek, Paris (FR); Clément Jubert, Paris (FR); Baptiste Luciani, Paris (FR)

(73) Assignee: MENTICE AB, Gothenburg (SE)

(*) Notice: Subject to any disclaimer, the term of this patent is extended or adjusted under 35 U.S.C. 154(b) by 0 days.

(21) Appl. No.: 18/365,070

(22) Filed: Aug. 3, 2023

(65) Prior Publication Data

US 2023/0386363 A1 Nov. 30, 2023

Related U.S. Application Data

(63) Continuation of application No. 17/278,049, filed as application No. PCT/IB2019/001029 on Sep. 20, 2019, now abandoned.

(60) Provisional application No. 62/734,223, filed on Sep. 20, 2018.

(51) Int. Cl.
*G09B 23/30* (2006.01)
*G09B 23/28* (2006.01)

(52) U.S. Cl.
CPC .......... *G09B 23/285* (2013.01); *G09B 23/286* (2013.01)

(58) Field of Classification Search
CPC ...... G09B 23/28; G09B 23/285; G09B 23/30; G09B 23/303
See application file for complete search history.

(56) References Cited

U.S. PATENT DOCUMENTS

| | | | | |
|---|---|---|---|---|
| 6,234,804 B1* | 5/2001 | Yong | | G09B 23/34 434/274 |
| 6,488,507 B1* | 12/2002 | Stoloff | | G09B 23/28 434/272 |
| 9,262,943 B2* | 2/2016 | Clash | | G09B 23/28 |
| 10,078,973 B2* | 9/2018 | Barsness | | G09B 23/306 |
| 10,229,615 B2* | 3/2019 | Carson | | G09B 23/32 |
| 10,937,337 B2* | 3/2021 | Okayama | | G09B 23/34 |
| 11,195,436 B2* | 12/2021 | Okayama | | G09B 23/285 |
| 2005/0026125 A1* | 2/2005 | Toly | | G09B 23/285 434/262 |
| 2009/0162820 A1* | 6/2009 | Tada | | A61B 8/0883 434/272 |
| 2017/0076636 A1* | 3/2017 | Moore | | G09B 23/285 |
| 2018/0308394 A1* | 10/2018 | Segall | | G09B 23/28 |

* cited by examiner

*Primary Examiner* — Kurt Fernstrom
(74) *Attorney, Agent, or Firm* — Steinfl + Bruno LLP

(57) ABSTRACT

A surgical simulation device is disclosed that allows a structural heart disease (SHD) team, including a surgeon and an imaging specialist to perform a simulated cardiac intervention procedure using a patient-specific model that replicates biomechanical and echogenic properties of a specific patient to be operated on. The surgical simulation device can include a station with a tank for receiving a patient-specific cartridge with the patient-specific model. The device can also include an esophageal access system in the station and a vascular access system that couples to an access port of the station.

23 Claims, 60 Drawing Sheets

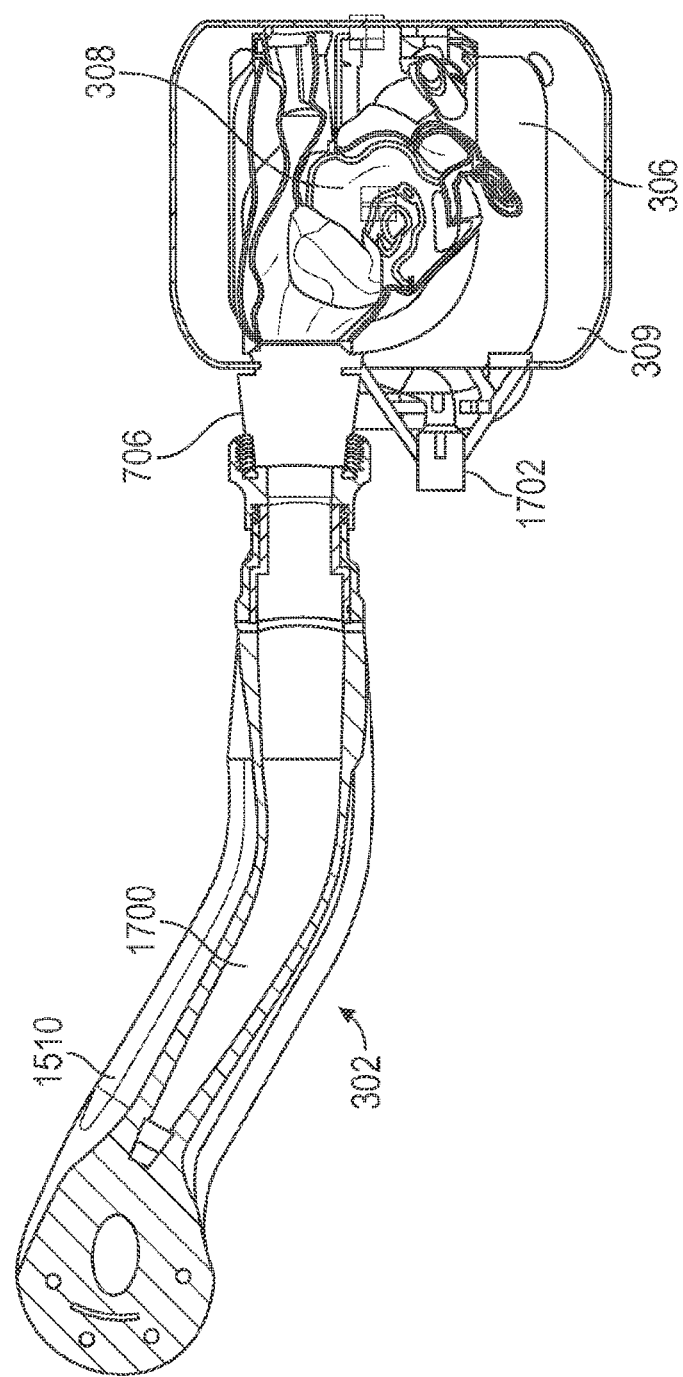

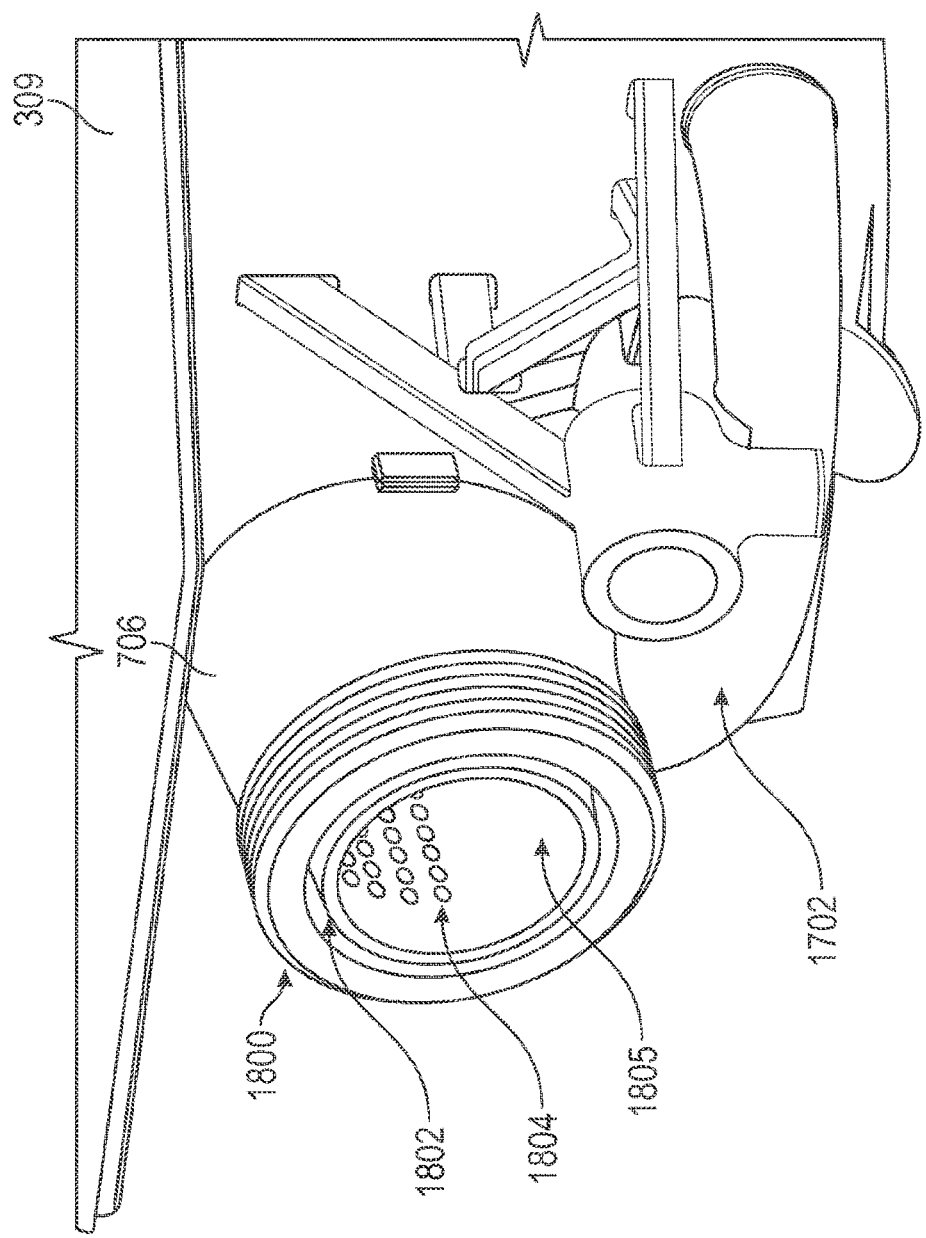

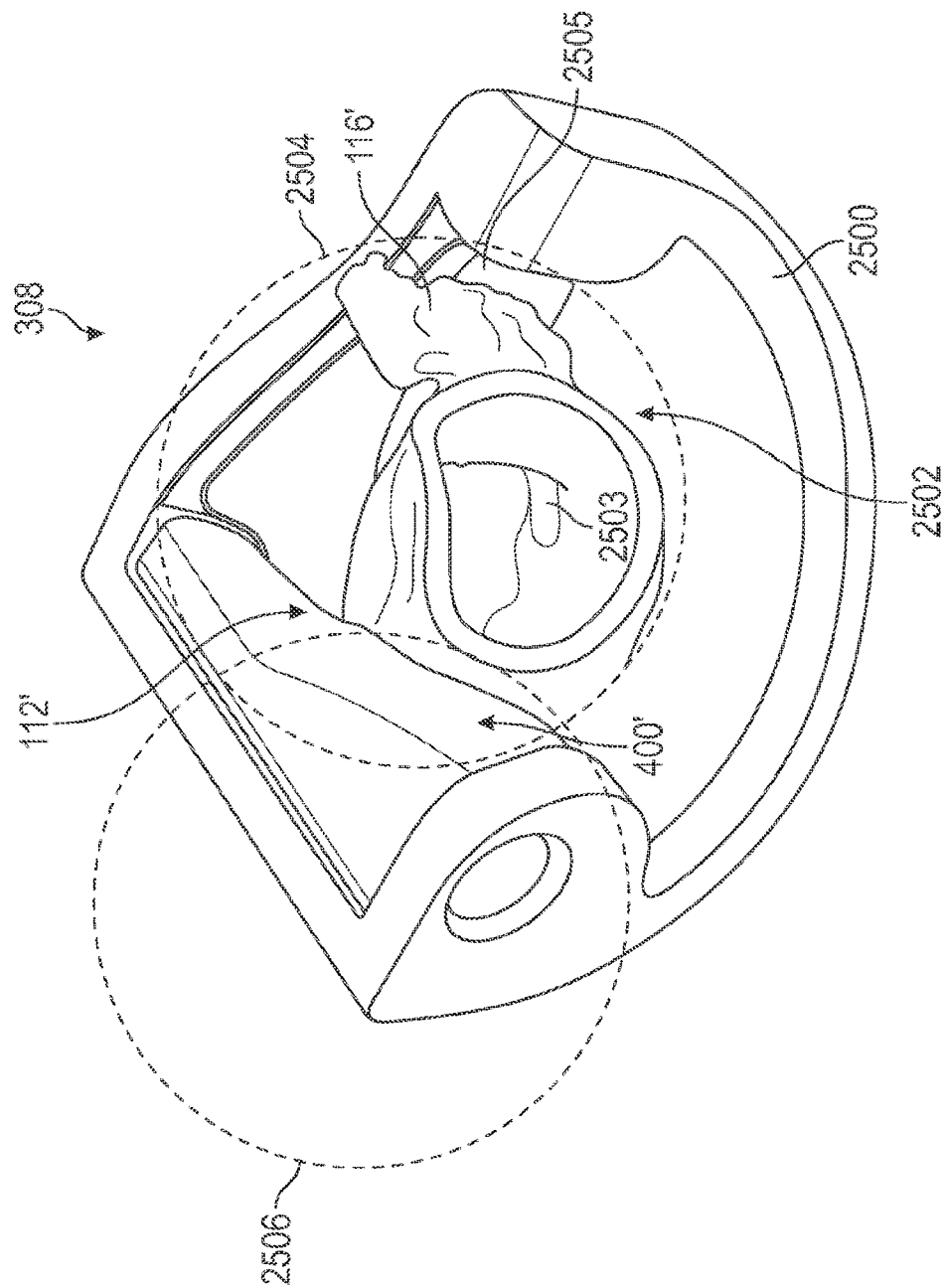

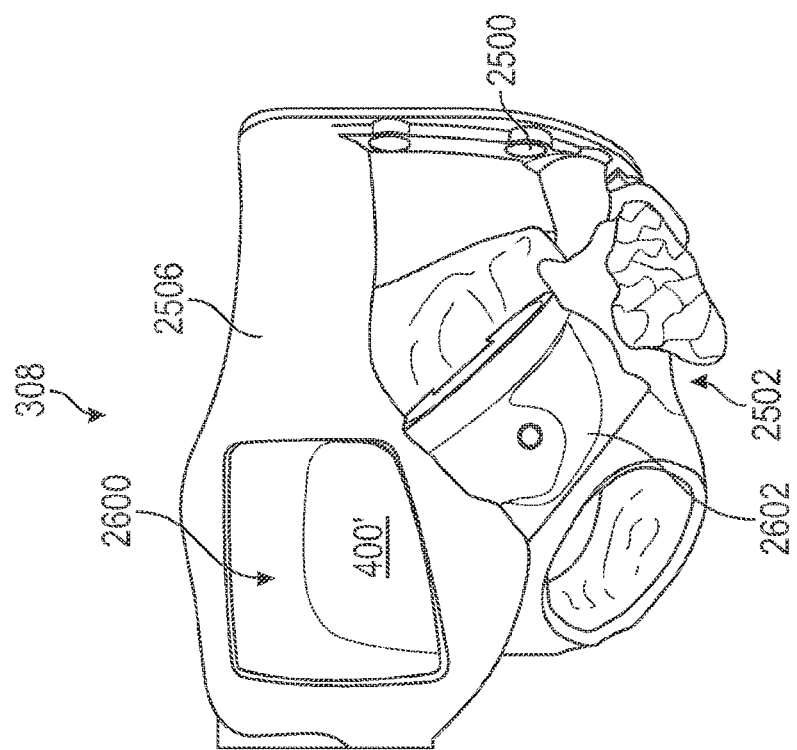
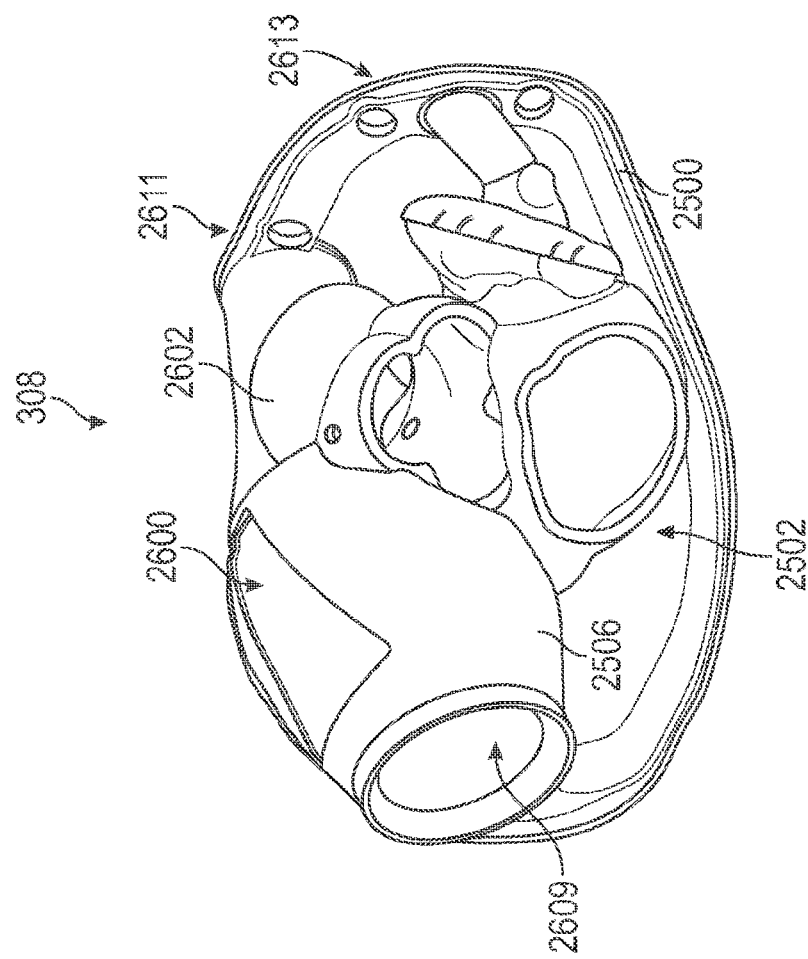
FIG. 26B
FIG. 26A

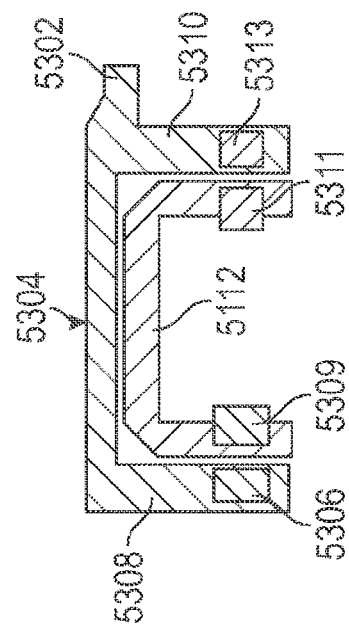
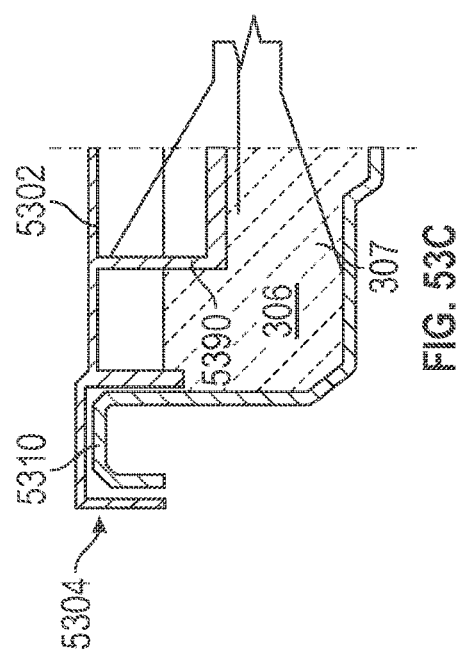
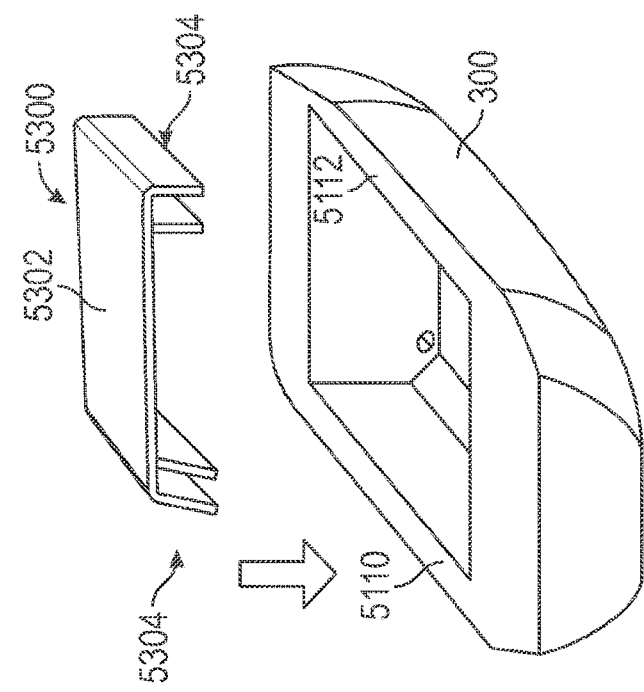

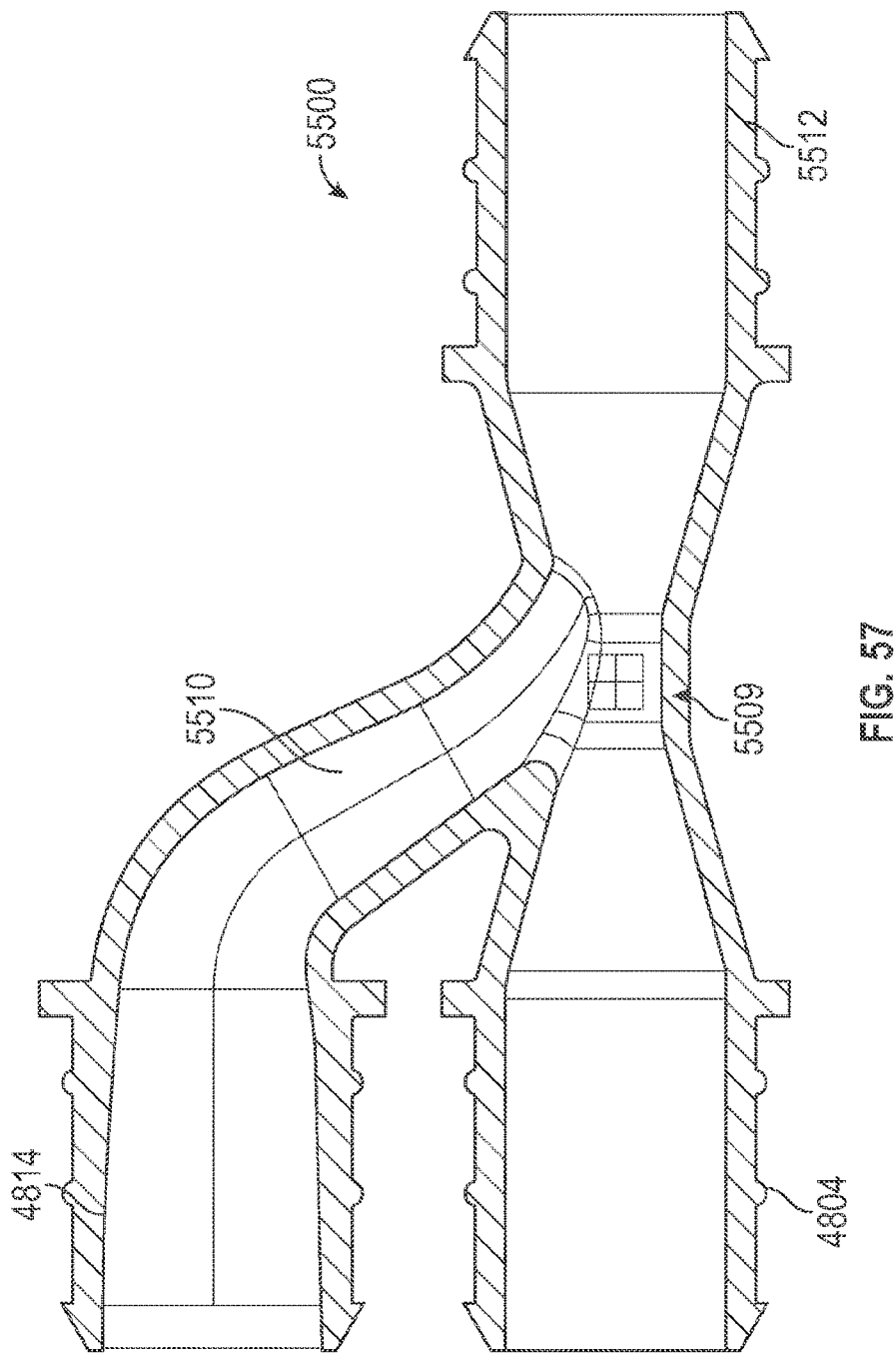

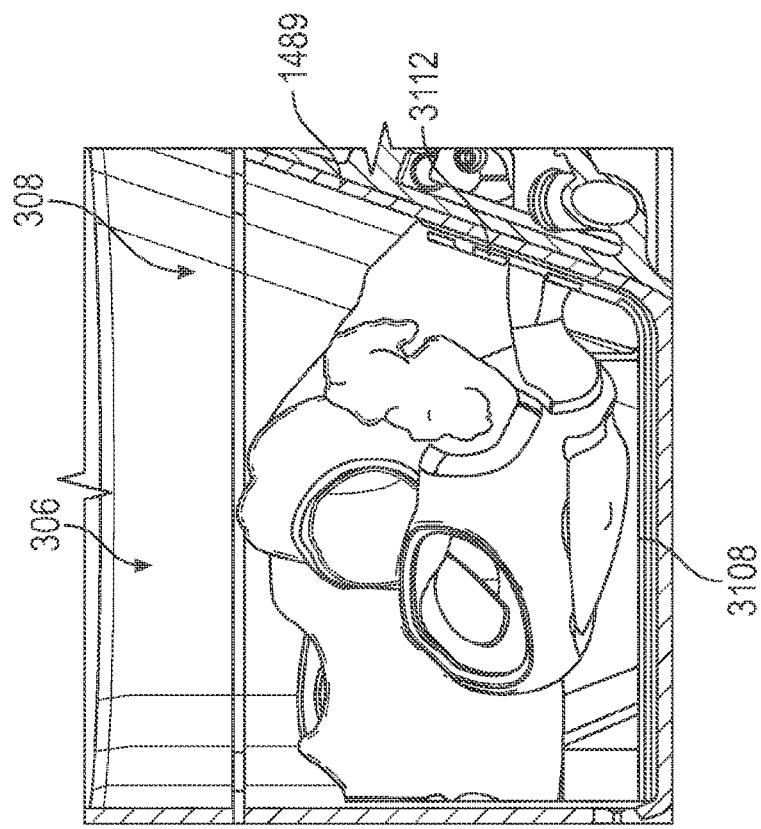
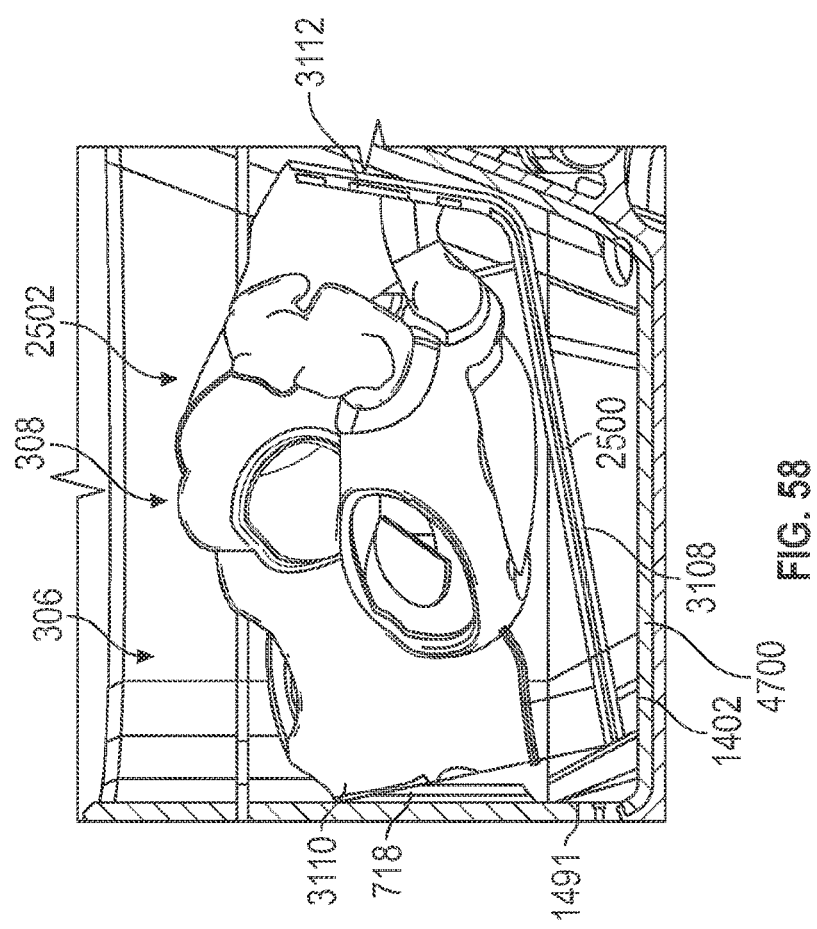

PATIENT-SPECIFIC CARDIOVASCULAR SIMULATION DEVICE

CROSS-REFERENCE TO RELATED APPLICATIONS

The present application is a continuation application of U.S. application Ser. No. 17/278,049 filed on Mar. 19, 2021, which is a U.S. National Stage of International Application No. PCT/IB2019/001029, entitled "PATIENT-SPECIFIC CARDIOVASCULAR SIMULATION DEVICE," filed on Sep. 20, 2019, which, in turn, claims priority to U.S. Provisional Patent Application Ser. No. 62/734,223, entitled "PATIENT-SPECIFIC CARDIOVASCULAR SIMULATION DEVICE" filed on Sep. 20, 2018, the contents of all of which are hereby incorporated by reference in their entireties.

TECHNICAL FIELD

This disclosure is directed simulation devices, and more particularly, to patient-specific cardiovascular simulation devices.

BACKGROUND

Heart disease is the leading cause of mortality and morbidity in the modern world. Numerous mini-invasive therapies such as percutaneous or transcatheter interventions have recently been introduced for treatment of structural heart disease (SHD). However, currently, there are limited opportunities and tools for SHD teams to plan and practice any structural heart intervention in the cardiac catheterization laboratory environment.

SUMMARY

A simulation device is disclosed that mimics cardiovascular anatomical structures for training and planning interventional cardiology procedures. The simulation device can include a frame and a multi-material patient-specific cardiac model with accurate biomechanical properties and variable echogenic materials. The variable echogenic materials may be visible on ultrasound imaging, with visual aspects close to those of biological tissues.

According to some aspects of the disclosure, a surgical simulation device is disclosed that includes a patient-specific cartridge that includes a patient-specific model of at least a portion of a heart of a patient, the patient-specific model including at least a portion configured to mimic an anatomical shape and a mechanical behavior of the portion of the heart of the patient; a station having a housing; a tank formed in the housing and configured to receive the patient-specific cartridge; an esophageal access system extending within the housing between an esophageal access port on the housing and a first port in the tank; and a vascular access system comprising a first end with a vascular access port and a second end configured to be fluidly coupled to a second port in the tank.

According to other aspects of the disclosure, a patient-specific cartridge for a surgical simulator device is provided, the patient-specific cartridge including a patient-independent frame having first, second, and third openings; and a patient-specific cardiac model. The patient-specific cardiac model includes a right atrium; a left atrium and a septum having mechanical and anatomical shape properties that correspond to the mechanical and anatomical shape properties of the left atrium and the septum of a patient; a superior vena cava interfacing portion that deviates from the anatomical shape of the superior vena cava of the patient and extends between the right atrium and the first opening in the patient-independent frame; an inferior vena cava interfacing portion that deviates from the anatomical shape of the inferior vena cava of the patient and extends between the right atrium and the second opening in the patient-independent frame; and an upper pulmonary vein interfacing portion that deviates from the anatomical shape of the pulmonary vein of the patient and extends between the left atrium and the third opening in the patient-independent frame.

According to other aspects of the disclosure, a surgical simulation device is provided that includes a station having a housing; a tank formed in the housing and configured to receive a patient-specific cartridge that includes a patient-specific model of at least a portion of a heart of a patient, wherein the tank comprises a bottom wall having a first surface that forms a bottom surface of the tank, and an opposing second surface; an esophageal access system extending within the housing between an esophageal access port on the housing and a first port in the tank; a vascular access system including a first end with a vascular access port and a second end configured to be fluidly coupled to a second port in the tank; and a spinal shadow simulation card disposed within the housing adjacent the opposing second surface of the bottom wall of the tank.

According to other aspects of the disclosure, a method is provided that includes providing a surgical simulation device having a station having a housing, a tank formed in the housing, and a vascular access system coupled to the housing; providing, in the tank, a patient-specific cartridge that includes a patient-specific model of at least a portion of a heart of a patient; inserting an imaging device through an esophageal access system within the housing from an esophageal access port on the housing, though a first port in the tank, and into a recess in a bottom surface of the tank beneath the patient-specific cartridge; and inserting a surgical element from a vascular access port of the vascular access system, through a main lumen of the vascular access system, and into a portion of the patient-specific model via a second port in the tank.

According to other aspects of the disclosure, a surgical simulation device is provided that includes a patient-specific cartridge that replicates anatomical and acoustic features of an organ of a specific patient; a station including a tank configured to receive the patient-specific cartridge: a surgical access system coupled to the station and including a lumen extending from a surgical access port to an access port for the tank, the lumen configured to simulate a blood vessel of a generic patient; and an imaging access system extending within the station from an imaging access port to the tank, the imaging access system comprising a lumen configured to simulate an imaging access pathway within the generic patient.

According to aspects of the disclosure, the imaging access system mimics an esophagus of a generic patient, and provides access to a transesophageal echocardiography probe.

It is understood that various configurations of the subject technology will become readily apparent to those skilled in the art from the disclosure, wherein various configurations of the subject technology are shown and described by way of illustration. As will be realized, the subject technology is capable of other and different configurations and its several details are capable of modification in various other respects, all without departing from the scope of the subject technology. Accordingly, the summary, drawings and detailed description are to be regarded as illustrative in nature and not as restrictive.

BRIEF DESCRIPTION OF THE DRAWINGS

The above and related objects, features, and advantages of the present disclosure will be more fully understood by reference to the following detailed description, when taken in conjunction with the following figures, wherein:

FIG. 17 illustrates a cross-sectional top view of a physical simulator device, according to aspects of the disclosure.

FIG. 18 illustrates a perspective view of an access port of a station of a physical simulator device, according to aspects of the disclosure.

FIG. 25 illustrates a perspective view of a patient-specific cartridge of a physical simulator device, according to aspects of the disclosure.

FIGS. 26A and 26B illustrate perspective and top views of another patient-specific cartridge of a physical simulator device, according to aspects of the disclosure.

FIG. 53A illustrates a perspective view of another accessory fluid heater for a physical simulator device, according to aspects of the disclosure.

FIG. 53B illustrates a cross-sectional view of a mounting portion of the accessory fluid heater of FIG. 53A, according to aspects of the disclosure.

FIG. 53C illustrates a cross-sectional view of a mounting portion and a heating element of the accessory fluid heater of FIG. 53A, according to aspects of the disclosure.

FIG. 57 illustrates a cross-sectional view of a Y-pipe of a fluid flow system of a physical simulator device for coupling to the flush system of FIG. 54, according to aspects of the disclosure.

FIG. 58 illustrates a schematic side view of a patient-specific cartridge during installation in a tank of a station of a physical simulator device, according to aspects of the disclosure.

FIG. 59 illustrates a schematic side view of a patient-specific cartridge installed in a tank of a station of a physical simulator device, according to aspects of the disclosure.

DETAILED DESCRIPTION

In the following detailed description, numerous specific details are set forth to provide a full understanding of the present disclosure. It will be apparent, however, to one ordinarily skilled in the art that embodiments of the present disclosure may be practiced without some of the specific details. In other instances, well-known structures and techniques have not been shown in detail so as not to obscure the disclosure.

Interventional cardiologists work with fluoroscopy as the main tool for real-time guidance of catheter-based therapy. Since interventions in structural heart disease (SHD) are performed on the beating heart, visualization of the relevant structures with means other than direct visual inspection by the surgeon is crucial. Advances in cardiac imaging with three-dimensional transesophageal echocardiography (TEE) have proven particularly helpful in demonstrating the complex cardiac morphology and in performing necessary pre-interventional precise measurements for planning and tailoring of percutaneous therapies.

Virtual and physical simulators offer the opportunity to train for a procedure before actions can influence patient out-comes, insulating patients from risk during the novice operator period. The use of simulators also reduces training time and facilitates more structured, comprehensive skill acquisition when compared to the classical apprenticeship model. However, existing simulation devices for training and/or planning do not reproduce a realistic biomechanical behavior and/or are not visible on ultrasound imaging with visual aspects close to those of biological tissues.

Therefore, a need exists for a physical simulator device that can assist in training and planning for structural heart disease interventions, which can replicate the interaction (e.g., friction, feedback force, etc.) between the cardiovascular wall and the surgical tools in a mechanically accurate manner, and in a manner that is visible on ultrasound imaging with visual aspects close to those of biological tissues.

In the last several years, there has been an explosion in Structural Heart Diseases (SHD) interest, driven largely by the adoption of transcatheter aortic valve replacement, mitral valve interventions, and transcatheter left atrial appendage closure.

Figure 1:
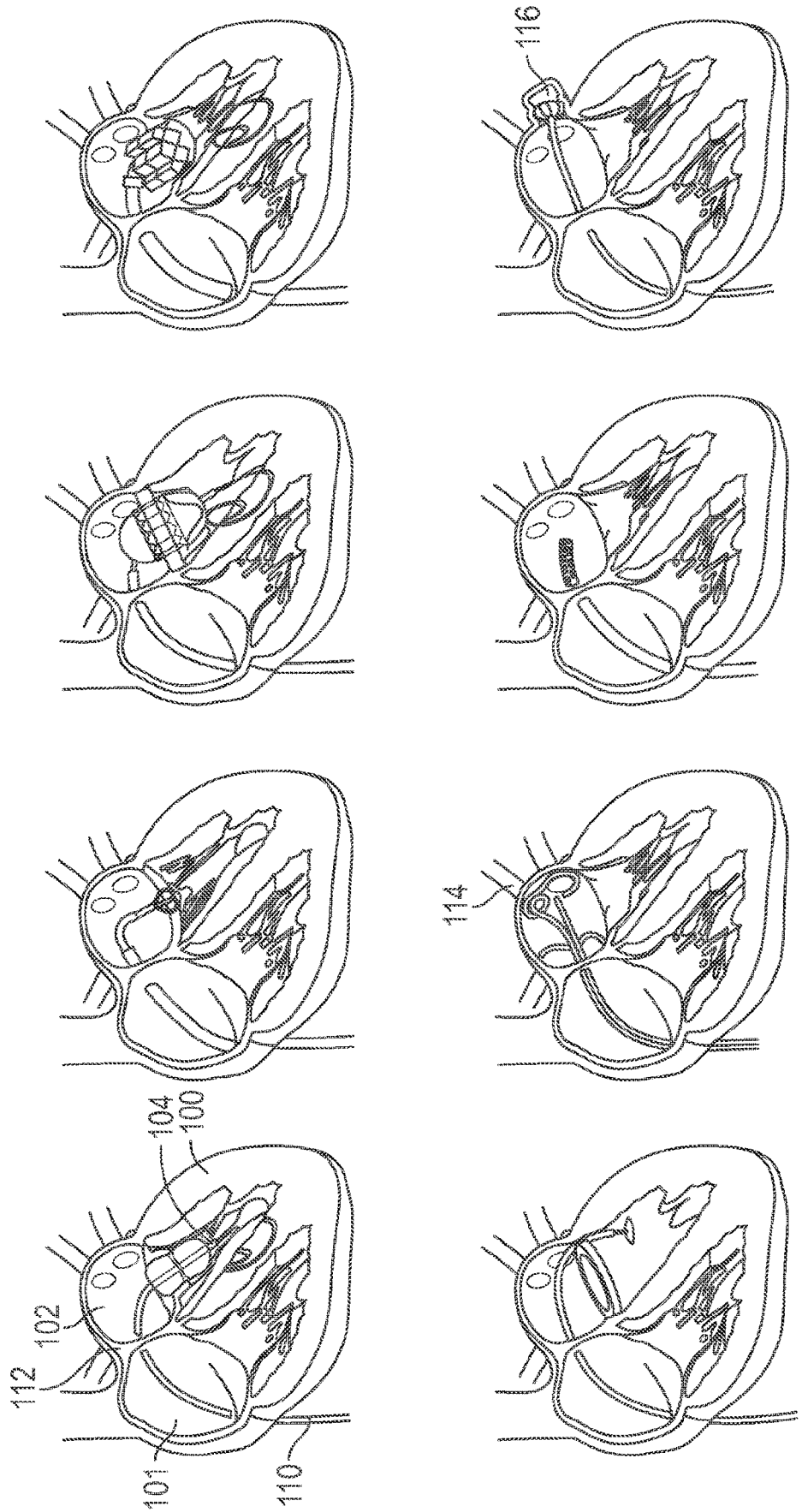
FIG. 1 illustrates various interventional cardiac procedures that can be simulated with a physical simulator device according to aspects of the disclosure.

Structural heart interventions are performed with specially designed catheters, guides, sheaths, and implantation tools. For example, FIG. 1 shows part of a 2016 Mayo Clinic® graphic which illustrates eight structural heart interventions (labeled A-H) that are performed, in part, by inserting one or more of the specially designed catheters, guides, sheaths, and implantation tools from the inferior vena cava 110 into the right atrium 101 of a heart 100 of a patient, then into the left atrium 102 via a transseptal puncture through the septum 112. As shown in FIG. 1, these interventions can be performed to manipulate and/or address issues with the mitral valve between the left atrium 102 and the left ventricle 104, the pulmonary vein 114, and/or the left atrial appendage 116 (as examples).

To perform successful interventions (e.g., of the types shown in FIG. 1) without causing any harm, it is mandatory to use these tools with high precision. For example, the transseptal puncture may be formed at different locations on the septum 112 for different procedures. For this and other reasons, SHD interventions are complex, and numerous guidelines recommend the implementation of a multidisciplinary SHD team rather than a single person. The SHD team typically consists of cardiologists and cardiac interventionalists, a cardiac surgeon, cardiovascular imaging specialists, anesthesiologists, and specialized nurses. The action of the intervening specialists heavily depends on images offered by the imaging specialist, who in turn needs to know the structures relevant to the interventionalist and what views are optimal for guiding the procedure. Identifying structures simultaneously on echocardiographic and fluoroscopic imaging is complicated and prone to miscommunication.

The systems and methods disclosed herein provide a training and planning tool for SHD procedures, such as those illustrated in FIG. 1, that better aids training and pre-operative planning for interventional cardiology procedures. For example, a physical simulation device is disclosed which accurately replicates a specific patient's anatomy and cardiac wall mechanical behavior, and, when imaged using ultrasound imaging, generates images with visual aspects that are close to the corresponding visual aspects of the corresponding biological tissues of the patient under ultrasound imaging. As will be described in further detail hereinafter, the physical simulator device can include a station that includes a housing having a tank within which a patient-specific cardiac model can be disposed, an esophageal access system within the housing, and a vascular access system coupled to the housing. A patient-specific cartridge can be placed into the tank. The cartridge includes a patient-independent frame and a multi-material patient-specific cardiac model with realistic biomechanical properties and that is visible on ultrasound imaging with an aspect that is close to the corresponding aspect of corresponding biological tissues. The simulator system (e.g., including the station and the cartridge) can be arranged to mimic the characteristics (e.g., the geometry, acoustic impedance and biomechanics) of the human right and left atrium, and to fit the environment of a non-sterile operating room (e.g., a Cath lab) without the presence of any patient.

Figure 2:
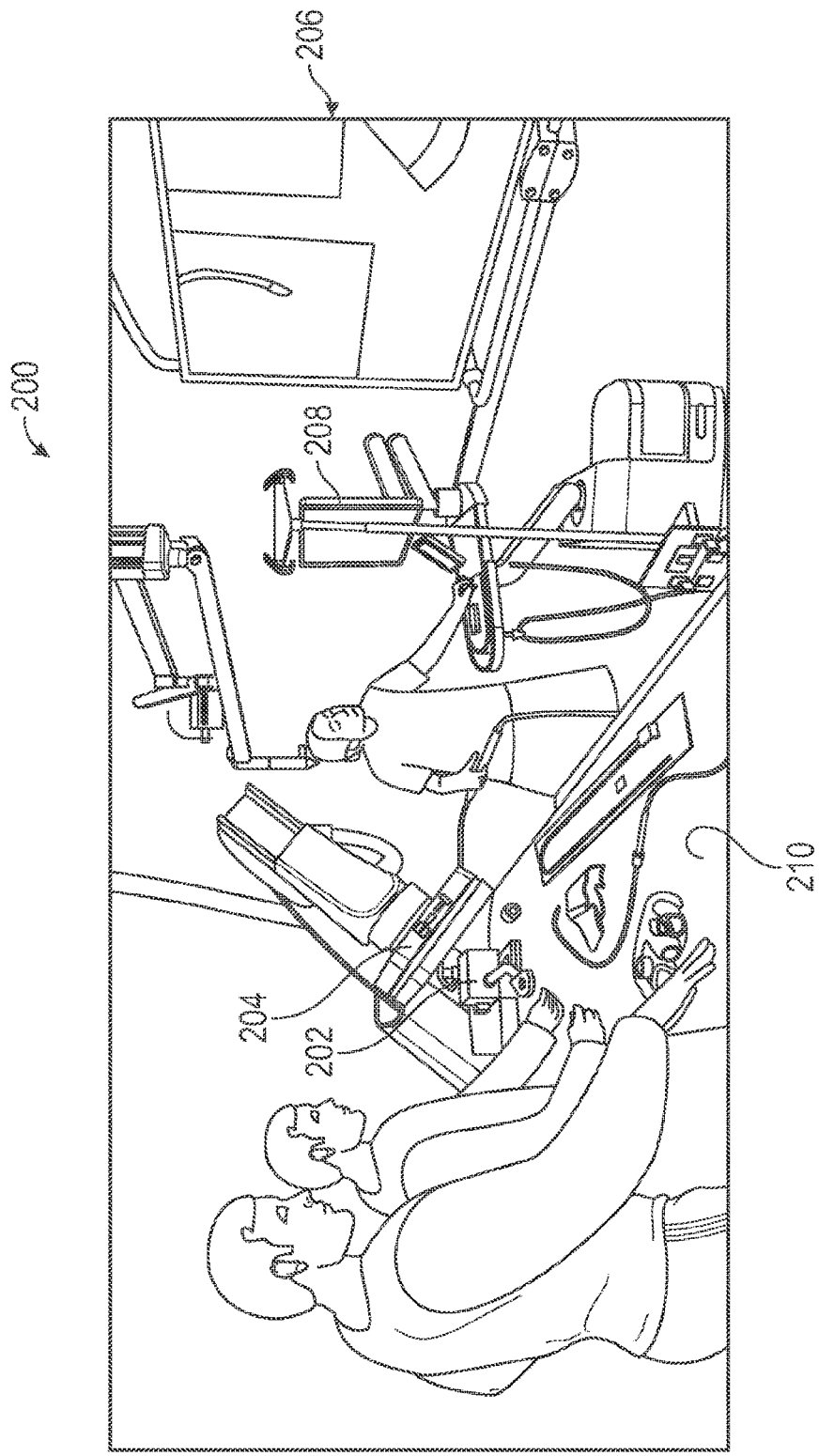
FIG. 2 illustrates an exemplary catheterization (Cath) lab including a physical simulator device, according to aspects of the disclosure.

For example, FIG. 2 illustrates a Cath lab 200 implementing a simulator system that includes a physical simulator device 202 (e.g., supported on a Cath lab table 210), an imaging system 204 (e.g., a fluoroscopy system), an ultrasound system 208 (e.g., an ultrasound imaging system), and a display 206 on which images such as ultrasound and fluoroscopy images of a cartridge within a tank of the station of the physical simulator device 202 can be seen.

Figure 3:
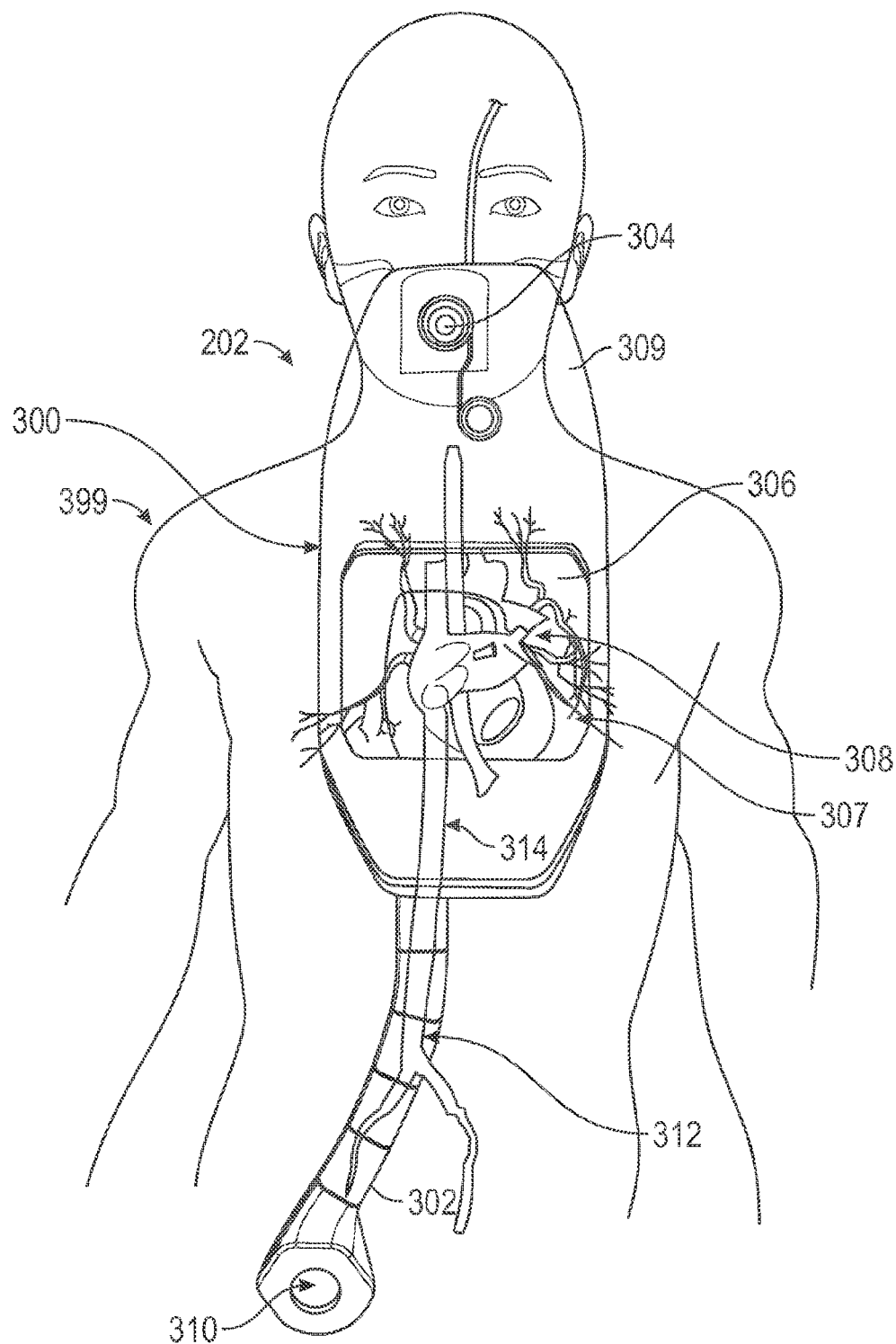
FIG. 3 illustrates a physical simulator device overlaid on a representation of a patient, according to aspects of the disclosure.

Details of the physical simulator device 202 are shown in FIG. 3. In FIG. 3, physical simulator device 202 is shown in superimposed over a depiction 399 of a human body so that the alignment between various features of the physical simulator device 202 and body of a patient can be seen. In particular, FIG. 3 shows show the physical simulator device 202 may include a station 300 having a tank 306 arranged to receive a patient-specific cartridge 308 that mimics the mechanical and acoustic features of at least portions of a heart of a particular patient.

As shown, the tank 306 is positioned relative to an esophageal access port 304 and vascular access port 310, in accordance with the relative positions of the patient's heart relative to the patient's mouth and a femoral vein puncture location. In this way, the arrangement of the physical simulator device 202 mimics the relative locations of the organ to be operated on (e.g., the heart), an ultrasound access point (e.g., the patient's mouth), and a vascular access port (e.g., along the femoral vein). For example, FIG. 3 also shows how the physical simulator device 202 includes a vascular access system 302 coupled to the station 300, and having a curvature that allows the vascular access system 302 to mimic a portion of the femoral vein, the right external and common iliac veins 312, and the vena cava 314 leading to the right atrium of the simulated patient heart in cartridge 308.

In some implementations, the combination of the cartridge 308 and the station 300 aim to achieve the functionality of all the anatomical parts needed for a Left Atrial Appendage (LAA) closure intervention. The station 300 and a frame of the cartridge 308 may represent standard anatomical parts (e.g., of a generic patient) and a patient-specific model of the cartridge 308 may represent the patient-specific anatomical parts.

In this example, the LAA closure intervention starts with a puncture at a port 310 in the femoral vein replica (e.g., a standard-patient part), and then a guidewire is installed through the replica to the right atrium replica of the heart simulated by cartridge 308. The catheter enters the cartridge 308, which includes the patient-specific part of the system.

Figure 4:
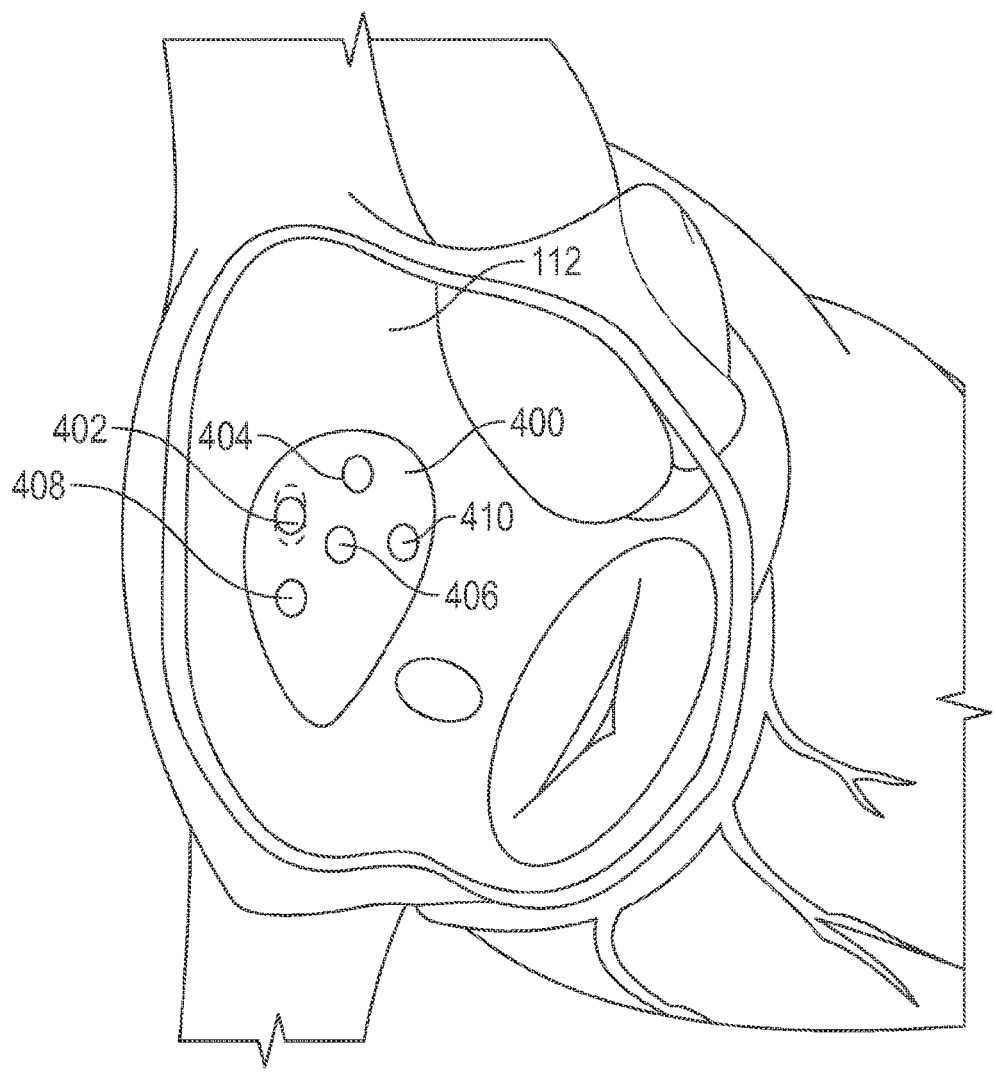
FIG. 4 illustrates various locations on a septum of a heart for a transseptal puncture for various procedures.

To access to the LAA, the cardiologist must cross the replicate septum of the cartridge 308 at a specific spot for the LAA procedure, within the fossa ovalis. For example, FIG. 4 is a portion of a Mayo Clinic® image that illustrates a location 408 on the fossa ovalis 400 for the transseptal puncture for a LAA procedure. Other locations on the fossa ovalis 400 are also shows for transseptal punctures for other procedures, such as a location 404 for a transseptal patent foramen ovale closure, a location 402 for a paravalvular leak closer, a location 406 for a percutaneous left ventricular assist device placement, and a location 410 for a pulmonary vein intervention.

Cartridge 308 includes a patient-specific model, in which the position and the shape of the fossa ovalis is patient specific. The mechanical features of the patient-specific model, such as the mechanical response of the modeled fossa ovalis to external forces (e.g., forces exerted by surgical instruments) may be patient-specific to mimic the mechanical response of the corresponding tissue of the patient's heart, responsive to the same forces. The thickness and/or material properties of portions of the model (e.g., the fossa ovalis) can be arranged to generate the desired patient-specific mechanical features, as described in further detail hereinafter. In the LAA example, once the catheter is in the left atrium, the cardiologist pushes the guidewire inside the patient-specific upper pulmonary vein replica of the cartridge 308. Then the surgeon pulls on the catheter, crosses the ridge between the replicated pulmonary vein and ends in the LAA, and deploys the device.

As shown in FIG. 3, during a simulated procedure, the cartridge 308 is positioned within the tank 306 disposed within the station 300, and submerged in a fluid 307 (e.g., water or a blood mimicking fluid) in the tank 306, so that the simulated tissue and interventional tools can be seen under ultrasound imaging (as described in further detail hereinafter). Station 300 may also include fluid control systems for circulating, flushing, filtering, heating, and/or otherwise manipulating the blood mimicking fluid 307, as described in further detail hereinafter.

Figure 5A:
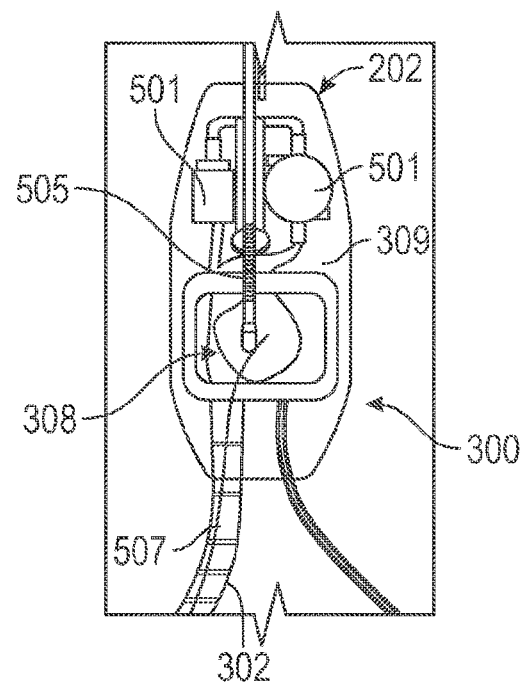
FIGS. 5A and 5B illustrate further details of a physical simulator device, according to aspects of the disclosure.
Figure 5B:
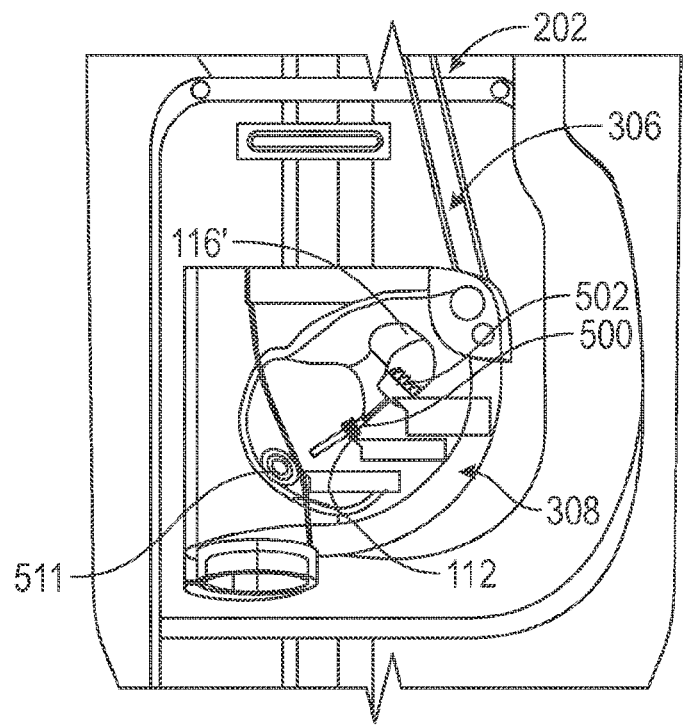

FIGS. 5A and 5B show additional views of features of the physical simulator device 202 during a simulated LAA procedure (e.g., in a simulated fluoroscopic view representing the appearance of aspects of the system under x-ray imaging). For example, in FIG. 5A, an ultrasound probe 505 (e.g., a transesophageal echocardiographic (TEE) ultrasound probe), a guidewire 507, and operational components 501 (e.g., pumps for moving fluid through the physical simulator device 202) can be seen. In this example, the ultrasound device 505 has been inserted, via an esophageal access system within the station, under the cartridge 308 in the tank 306. Guidewire 507 has been inserted via vascular access device 302, through into a portion of the patient-specific cartridge 308.

In FIG. 5B cartridge 308 can be seen with a delivery device for an LAA closure device 502 having been passed through a transseptal puncture 511 in a simulated septum 112' to close the simulated LAA 116'. A position marker 500 on the delivery device can also be seen.

Figure 6:
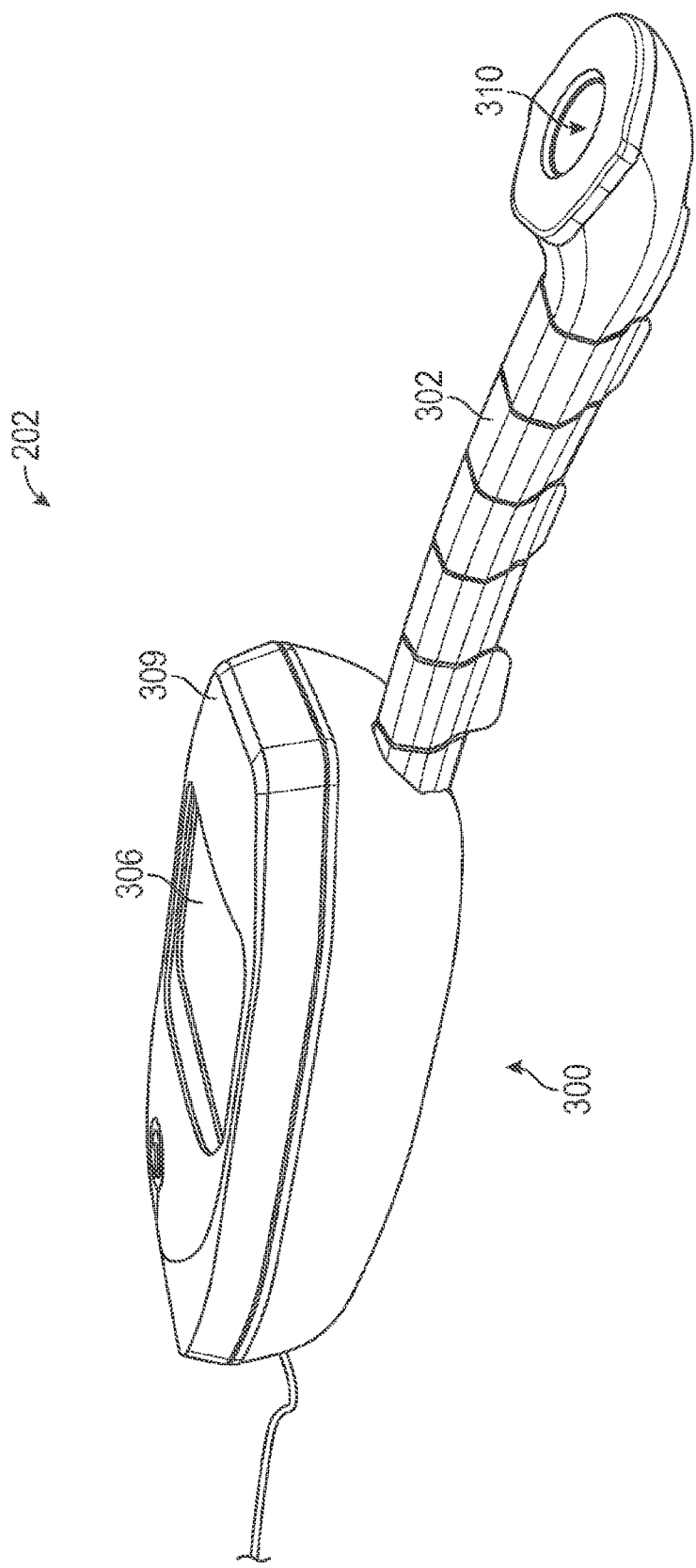
FIG. 6 illustrates a perspective view of a physical simulator device, according to aspects of the disclosure.

FIG. 6 illustrates a perspective view of the physical simulator device 202, according to aspects of the disclosure. In the example of FIG. 6, housing 309 of station 300 can be seen coupled to a surgical access device such as vascular access system 302. In this example, the vascular access port 310 at the proximal end of the vascular access system 302 can be seen. Tank 306 in the housing 309 of station 300 can also be seen.

The station 300 and/or vascular access system 302 may be arranged to represent certain standard (i.e., non-patient specific) anatomical parts involved in a simulated intervention. The primary functions of the station 300 are to hold the cartridge 308 (e.g., including the patient-specific cardiac model) in an anatomically relevant position, circulate fluid through the cartridge 308 to simulate blood flow, and provide anatomically realistic vascular and esophageal access.

The simulated vascular access provided by vascular access system 302 simulates the right femoral vein, iliac vein, and inferior vena cava access. The simulated esophageal access can be disposed within housing 309 and provides a path for insertion and placement of, for example, a transesophageal echocardiographic (TEE) ultrasound probe for imaging the simulated procedure. A pump (e.g., implemented as one of components 501 of FIG. 5) simulates blood flow through the heart to enable realistic dispersion of contrast agents introduced through the catheter employed during the practiced procedure, and to replicate the fluid mechanical forces to be experienced by the surgeon during the procedure. The pump can also purge the station 300 of fluid post procedure.

The station 300 and vascular access device 302 are designed to be positionable on a Cath Lab patient bed with all components being positioned in corresponding anatomical positions of a patient on the bed, as depicted in FIG. 3. Accordingly and as described in further detail hereinafter, the station 300 includes a main housing 309 surrounding the pump (e.g., pump 501), the tank 306 (in which the cartridge can be positioned), an imaging access system such as a replicated esophageal access system (also referred to herein as a TEE approach system), and a catheterization path channel.

Although various examples disclosed herein are described in connection with a simulator device for cardiac procedures, it should be appreciated that a physical simulator device for simulating procedures for other organs of bodily features can also be provided with station, a tank, a patient-specific cartridge corresponding to the organ, a surgical access device for simulating interventional access to the organ, and an imaging access device for simulating imaging component access to the organ, without departing from the scope of the disclosure. For example, the physical simulator device 202 may be implemented with as a surgical simulation device that includes a patient-specific cartridge 308 that replicates anatomical and acoustic features of an organ (e.g., a heart, a lung, a stomach, a urinary bladder, a bone, a lymph node, a larynx, a pharynx, muscle vasculature, a spinal column, an intestine, a colon, a rectum, or an eye) of a specific patient, a station 300 including a tank 306 configured to receive the patient-specific cartridge 308, a surgical access system 302 coupled to the station 300 and including a lumen 1700 extending from a surgical access port 310 to an access port 718 for the tank 306, the lumen 1700 configured to simulate a blood vessel of a generic patient and an imaging access system 700 extending within the station 300 from an imaging access port 304 to the tank 306, the imaging access system comprising a lumen 900 configured to simulate an imaging access pathway within the generic patient.

Figure 7:
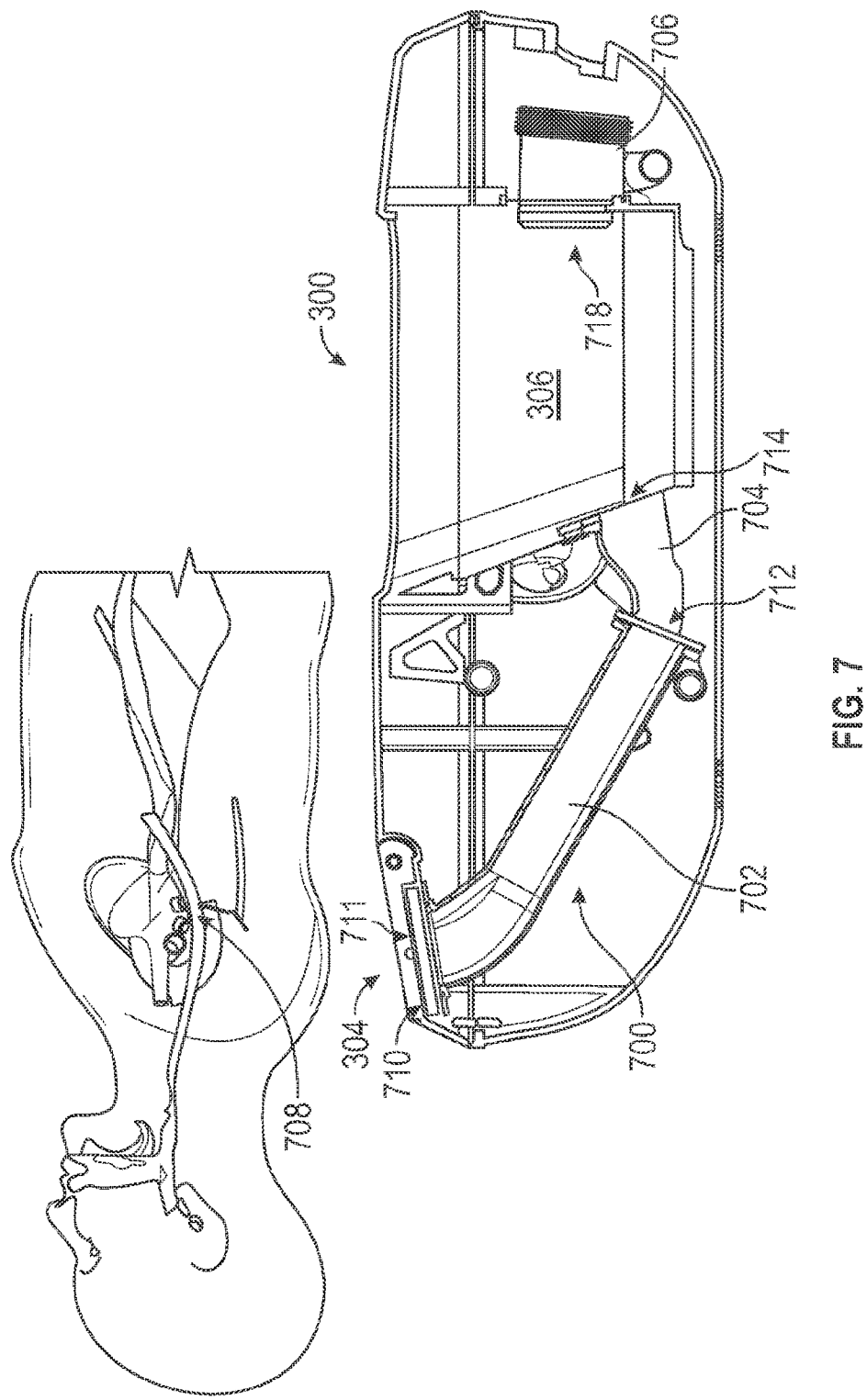
FIG. 7 illustrates a cross-sectional side view of a station of a physical simulator device, according to aspects of the disclosure.

FIG. 7 illustrates a cross-sectional side view of a station 300 with an imaging access system implemented as an esophageal access system 700. In the example of FIG. 7, esophageal access system 700 extends, within housing 309, from a proximal end 710 at the imaging access port 304 on housing 309 to a distal end 714 within the housing. As shown, the distal end 714 forms a port in the tank 306 that allows an imaging device, such as a TEE device, to be extended into the tank from imaging access port 304. A proximal membrane 711 at imaging access port 304, and distal membrane 712 at an interface between a first pipe member 702 and a second pipe member 704 of the esophageal access system 700 may be included. FIG. 7 also shows how the housing 309 of station 300 may include an access port 706 to which vascular access system 302 can be attached, and which includes an additional port 718 into tank 306, opposite to the port formed at the distal end 714 of the esophageal access system 700. Port 718 may be arranged to interface with a superior vena cava (SVC) interface on the patient-specific cartridge 308, as described in further detail hereinafter.

For ergonomic and sealing reasons, the replicated esophageal access system/TEE approach system 700 may not be fully anatomical in terms of shape, size and angulation of a patient's esophagus 708. Instead, a standardized approach for the TEE approach system 700 may be used that allows a clinician to place a TEE probe 505 in a position in the station 300 that corresponds to the position a TEE probe would be positioned during an actual procedure, with similar, though not fully simulated tactile feedback provided to the clinician.

Figure 8:
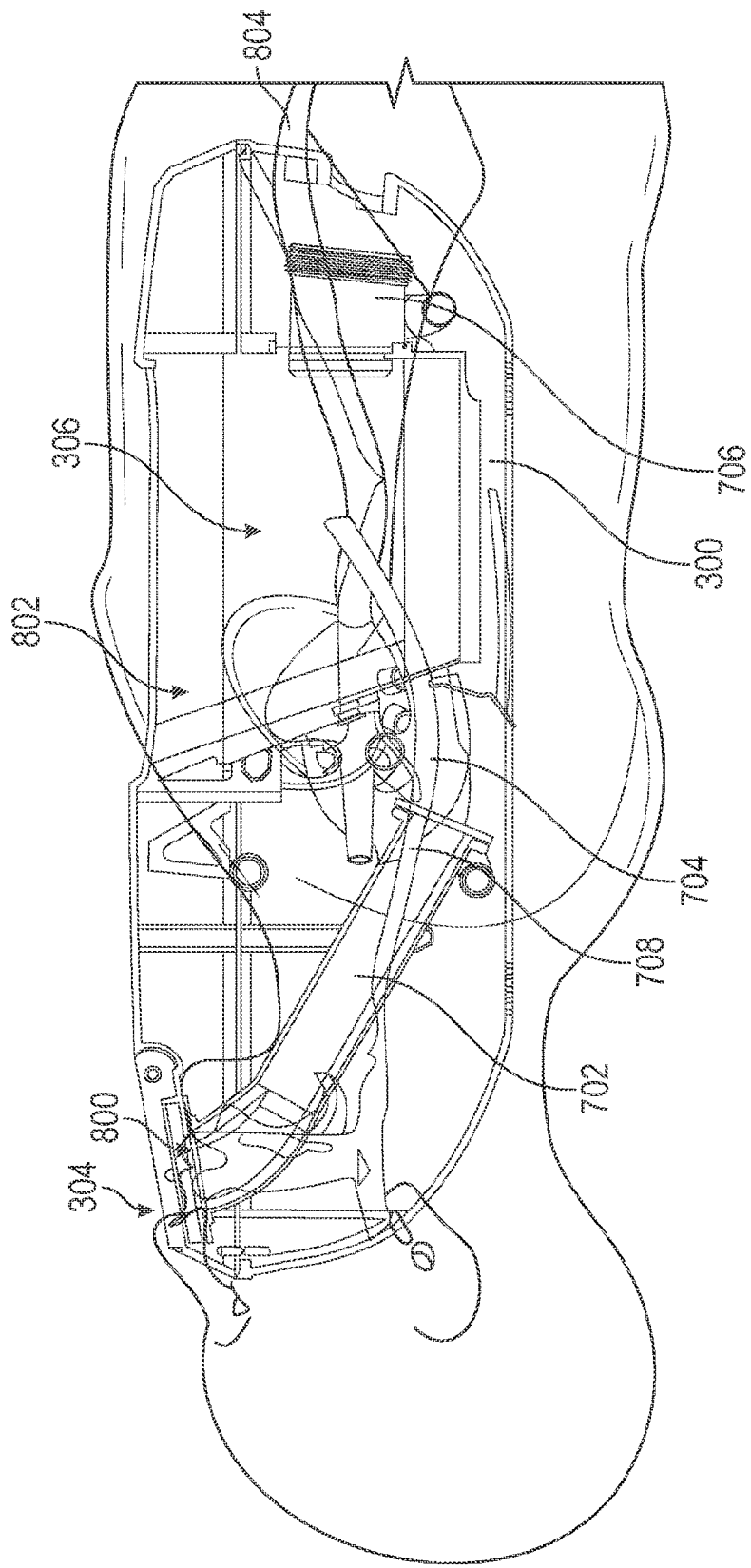
FIG. 8 illustrates a side view, aligned with and overlaid on a representation of a patient, of a station of a physical simulator device, according to aspects of the disclosure.

For example, FIG. 8 illustrates station 300, in side-view alignment with, and superimposed on a representation of a generic patient's esophagus 708, showing how the imaging access port 304 is generally aligned with the generic patient's mouth 800, and pipe sections 702 and 704 approximate the pathway of the generic patient's esophagus 708 and lead to the bottom of tank 306 at a position that would be beneath the patient's heart 802. In this way, the simulated esophageal access system 700 of FIG. 7 may provide good ergonomics without leaks and without impacting the realism of the navigation of the imaging device.

Figure 9:
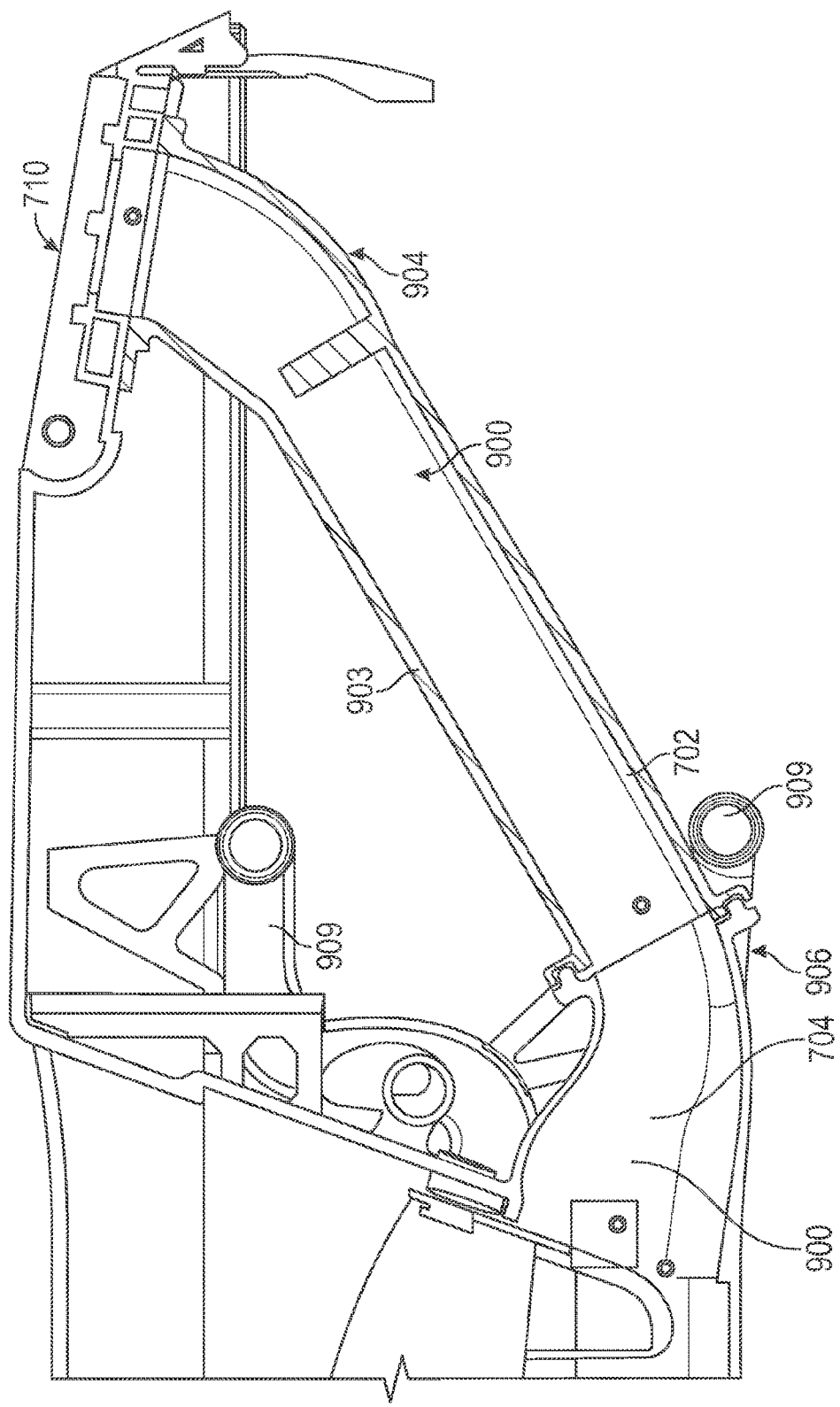
FIG. 9 illustrates a cross-sectional side view of an esophageal access system of a physical simulator device, according to aspects of the disclosure.
Figure 10:
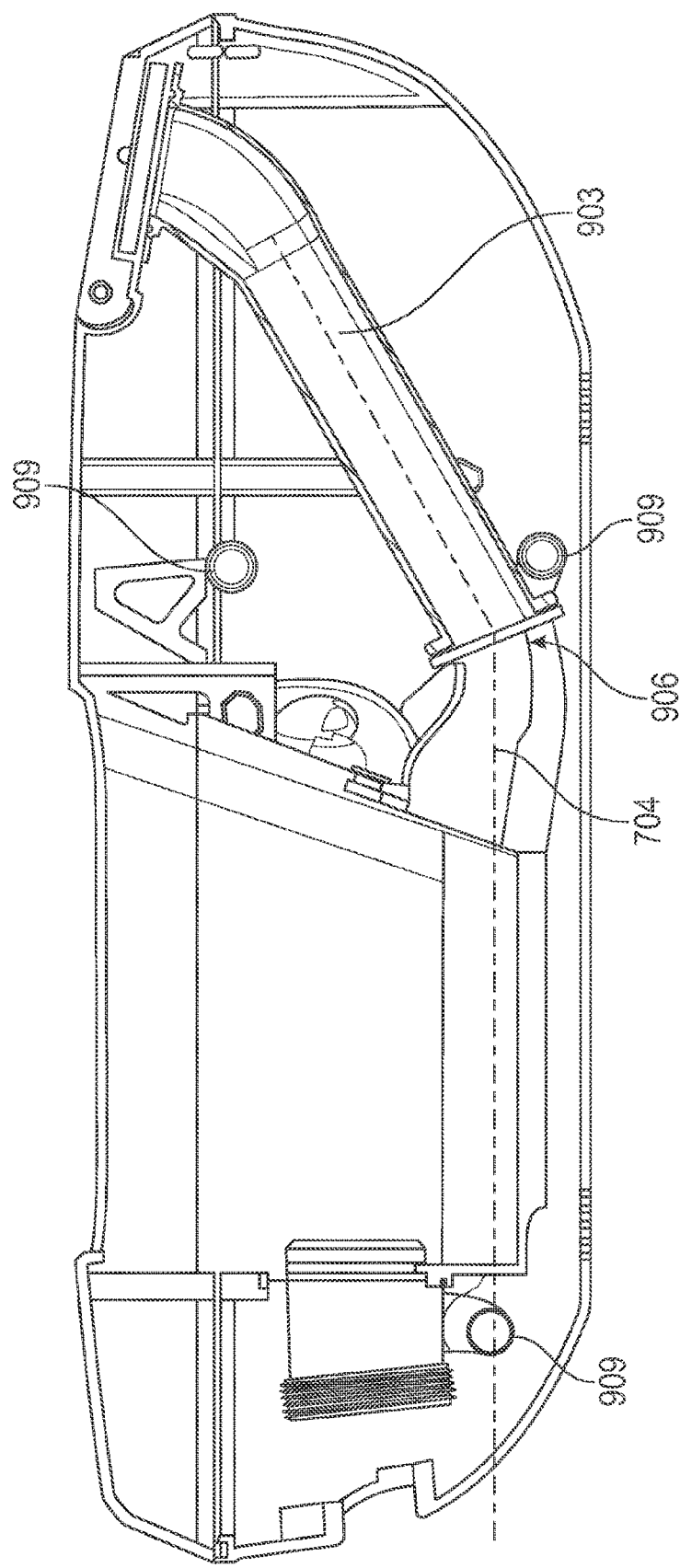
FIG. 10 illustrates a cross-sectional side view of the station of a physical simulator device, according to aspects of the disclosure.

FIGS. 9 and 10 show certain design parameters selected for the esophageal access system 700 that provide the realistic navigation with improved ergonomics. Such parameters include first and second bends 904 and 906 having radii of curvature (e.g., 67 mm) at the respective proximal and distal ends of the replicated esophageal channel 900, the length of a conduit 903 between the proximal and distal bends (e.g., 125 mm), and the angle formed between the conduit 903 and the bottom of the tank in the station (e.g., 150 degrees). While these dimensions have proven useful and appropriate for certain implementations, they are not be considered limiting in any way, and may differ, for example, in specialized stations that may be employed for planning or practicing procedures for certain patients, e.g., children, very tall patients, obese patients, etc., whose torso geometries may vary substantially from an average adult patient. In FIGS. 9 and 10, portions of the fluid flow control system 909 of station 300 are also shown, as will be described in further detail hereinafter.

Figure 11:
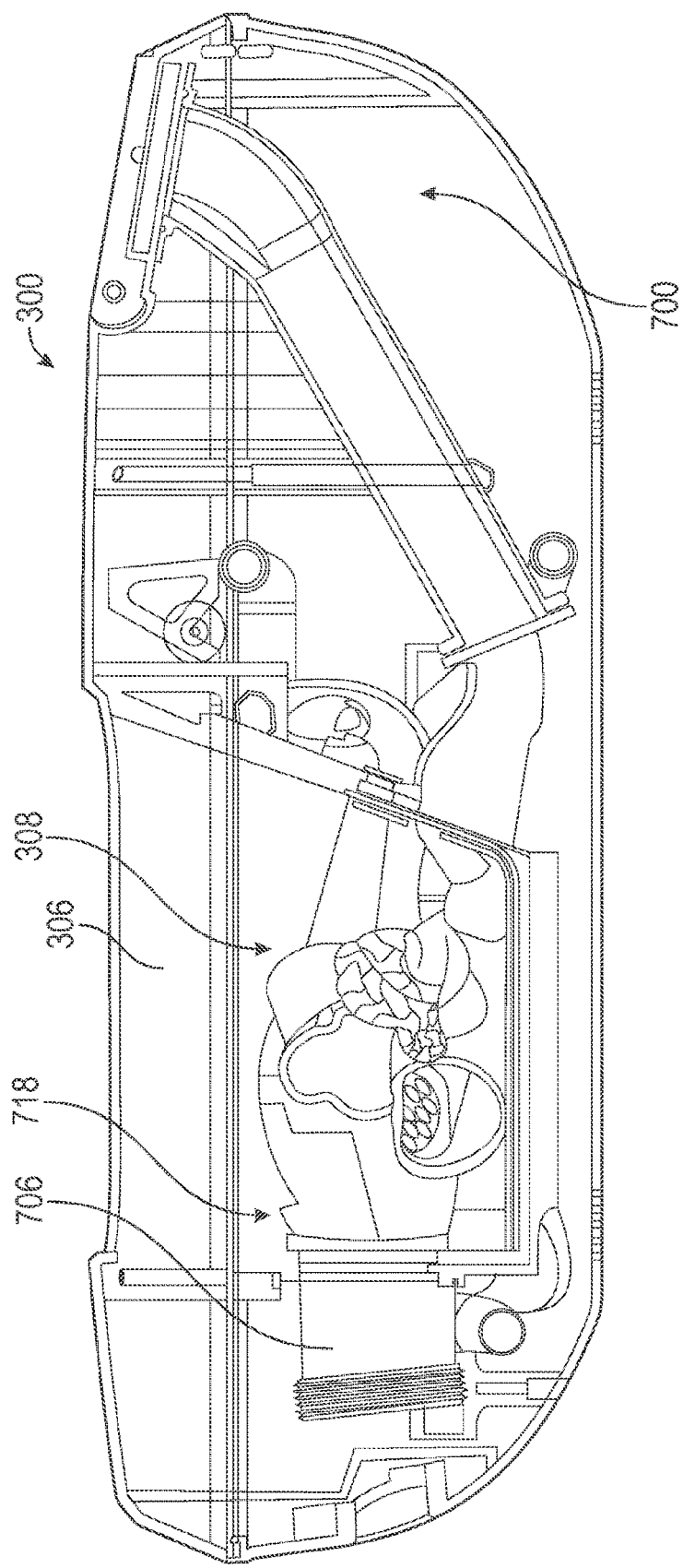
FIG. 11 illustrates a side view representation of a physical simulator device including a patient-specific cartridge, according to aspects of the disclosure.
Figure 12:
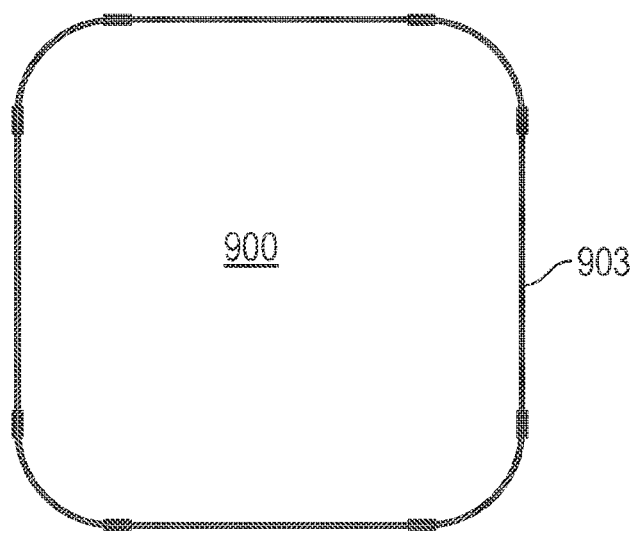
FIG. 12 illustrates a cross-sectional end view of a lumen of a physical simulator device, according to aspects of the disclosure.

FIG. 11 shows another view of the esophageal access system 700 in the station 300, with a cartridge 308 installed in the tank 306 and coupled, at interface port 718, to vascular access port 706 within the housing. FIG. 12 shows a cross section of the primary conduit 903 of the replicated esophageal channel 900 with illustrative, non-limiting dimensions.

As illustrated in FIGS. 7-11, the esophageal access system 700 may include first and second pipe sections 702 and 704 within the housing 309, the first pipe section 702 extending from the esophageal access port 304 on the housing 309 to the second pipe section 704, and the second pipe section 704 extending from the first pipe section 702 to a first port (at distal end 714) in the tank 306. The first pipe section 702 may include a first bend 904 at a proximal end, and a substantially straight conduit 903 extending from the first bend 904 to the second pipe section 704. The second pipe section 704 includes a second bend 906. The second bend 906 may form an angle of between one hundred thirty degrees and one hundred seventy degrees between the substantially straight conduit 903 and a bottom surface (see, e.g., bottom surface 1402 of FIG. 14) of the tank. The esophageal access system 700 may also include a first membrane 711 at the esophageal access port 304 and a second membrane 712 at an interface between the first pipe section 702 and the second pipe section 704.

Figure 13:
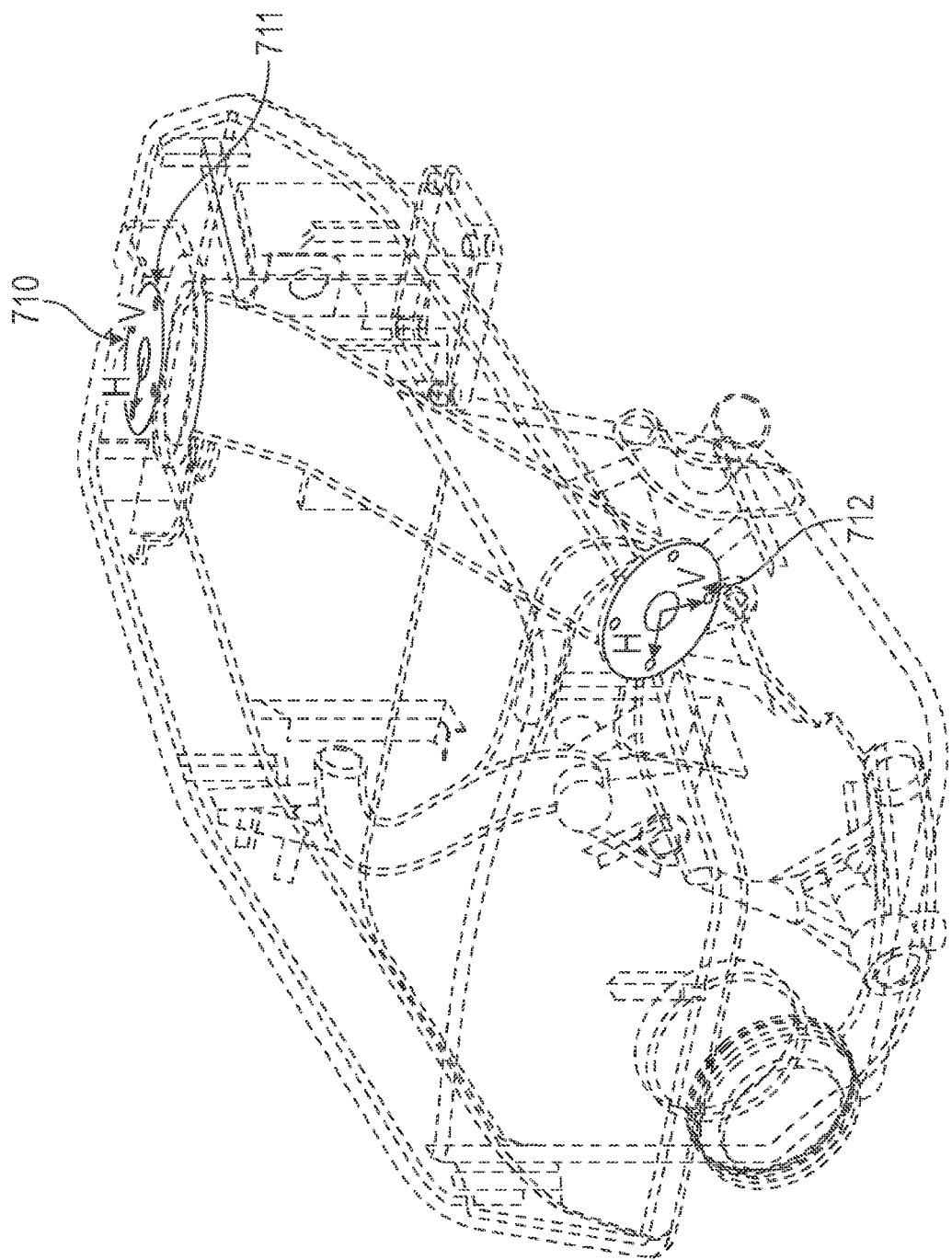
FIG. 13 illustrates a perspective view of a portion of an esophageal access system of a physical simulator device, according to aspects of the disclosure.

In patient's body, a TEE probe will slide along the esophagus, which helps maintain the probe position during the manipulation. As the station esophagus system 700 is not anatomic, the system includes features that reproduce this esophagus "catch" in order to hold the probe in a realistic way. For example, esophageal access system 700 may combine two interchangeable membranes (e.g., latex membranes) located on the way to the tank 306 (e.g., a proximal membrane 711 at the top of the station 300 at the proximal end of the esophageal access system 700, and a distal membrane 712 just before the tank), as illustrated in FIG. 13. These two membranes 711 and 712 may be changed easily in order to be compatible with all probes (e.g., different brands, shrinking sizes, etc.)

Figure 14:
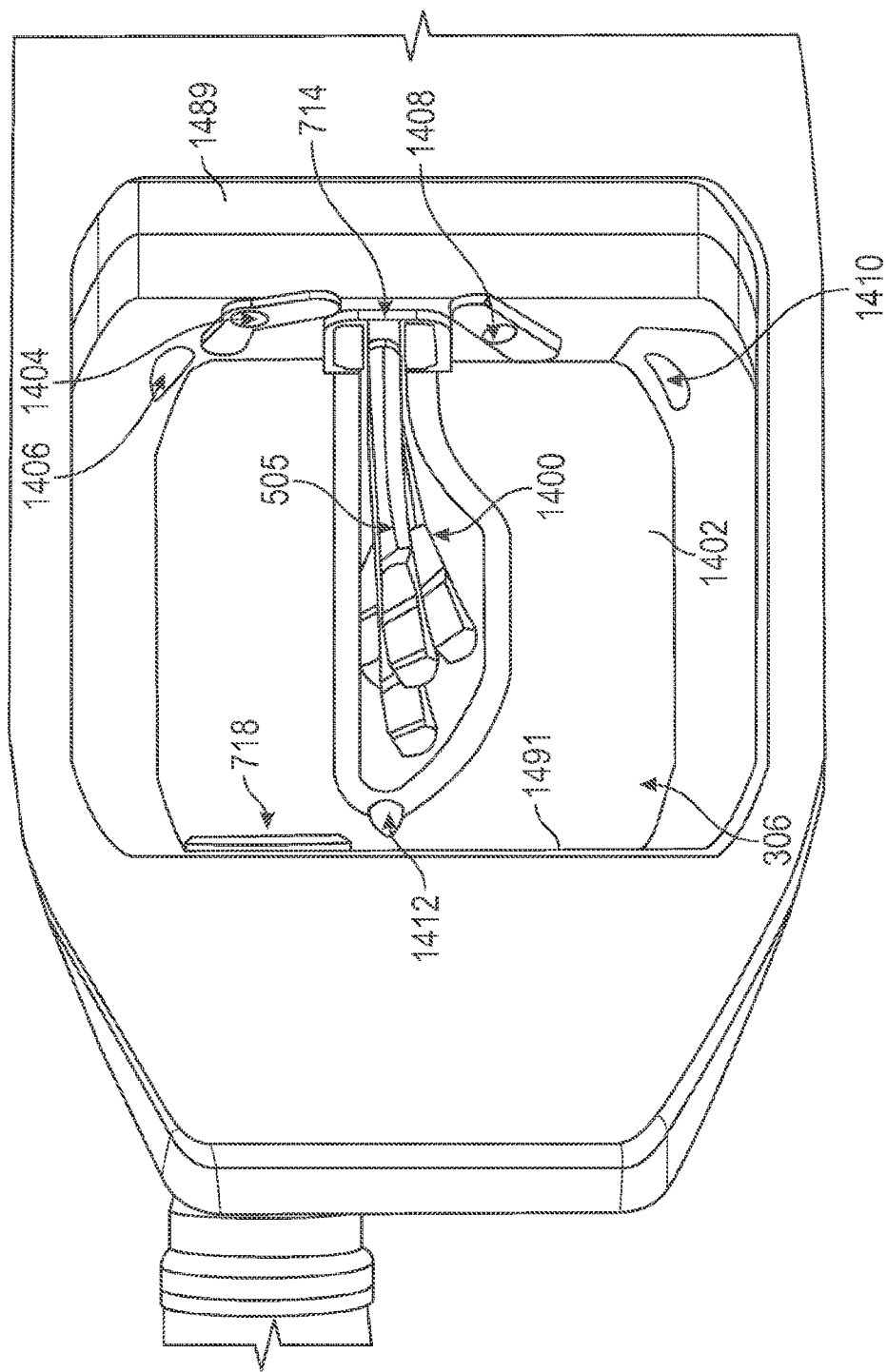
FIG. 14 illustrates a top view of a portion of a physical simulator device, according to aspects of the disclosure.

FIG. 14 shows a top-down view of the station tank 306, with the patient-specific cardiac model removed. As shown in FIG. 14, a recess 1400 is formed in the bottom surface 1402 of tank 306, into which the TEE probe can extend from the tank port at the distal end 714 of the esophageal access system 700. In the example of FIG. 14, the recess 1400 is wider than the probe 505 allowing the clinician an ability to adjust the probe position within the tank 306 in a realistic manner with realistic movement constraints.

FIG. 14 also shows how access port 718 may be formed on a sidewall 1491 of tank 306. As shown, additional access ports such as access ports 1404 and 1408 can be provided on an opposing sidewall 1489 of tank 306. Access port 718 may be arranged to interface with a simulated superior vena cava interface on patient-specific cartridge 308. Access port 1404 may be arranged to interface with a simulated inferior vena cava interface on patient-specific cartridge 308. Access port 1408 may be arranged to interface with a simulated upper pulmonary vein interface on patient-specific cartridge 308.

FIG. 14 also shows how one or more fluidic openings such as fluidic openings 1406, 1410, and 1412 may be provided in tank 306, to allow flow of blood simulation fluid 307 around a patient-specific cartridge 308 that is mounted in tank 306 (e.g., in addition to and/or in place of fluid 307 flow into and/or out of the patient-specific structures of cartridge 308 via access ports 1404, 1408, and 718). Fluidic openings 1406, 1410, and 1412 may be fluidically coupled to fluid control system 909 (see, e.g., FIGS. 9 and 10), as described in further detail hereinafter, and may be located at different positions from those shown in FIG. 14 in some implementations. Access ports 1404, 1408, and 718 may also, or alternatively, be fluidically coupled to fluid control system 909 (see, e.g., FIGS. 9 and 10), as described in further detail hereinafter.

Figure 15A:
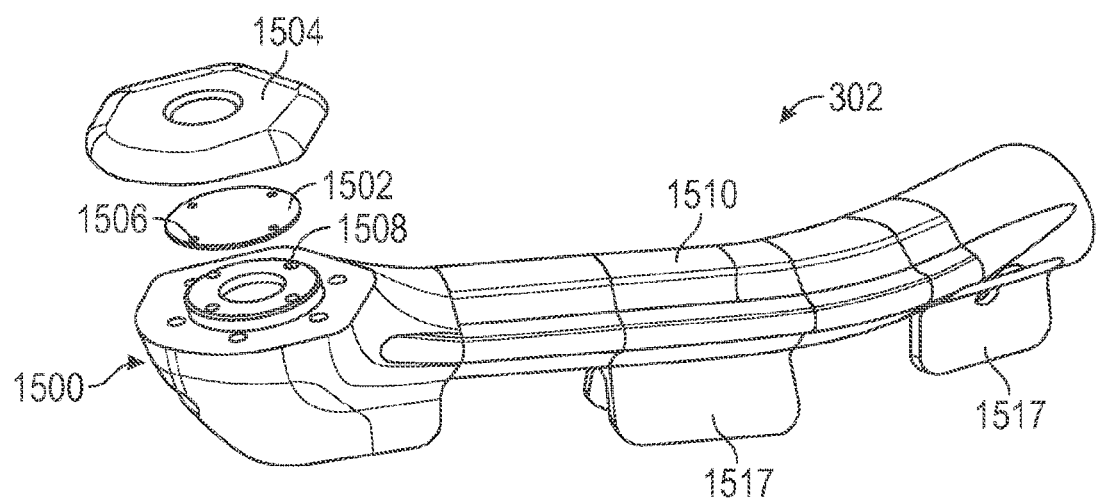
FIGS. 15A and 15B illustrate exploded perspective and perspective views of a vascular access device of a physical simulator device, according to aspects of the disclosure.
Figure 15B:
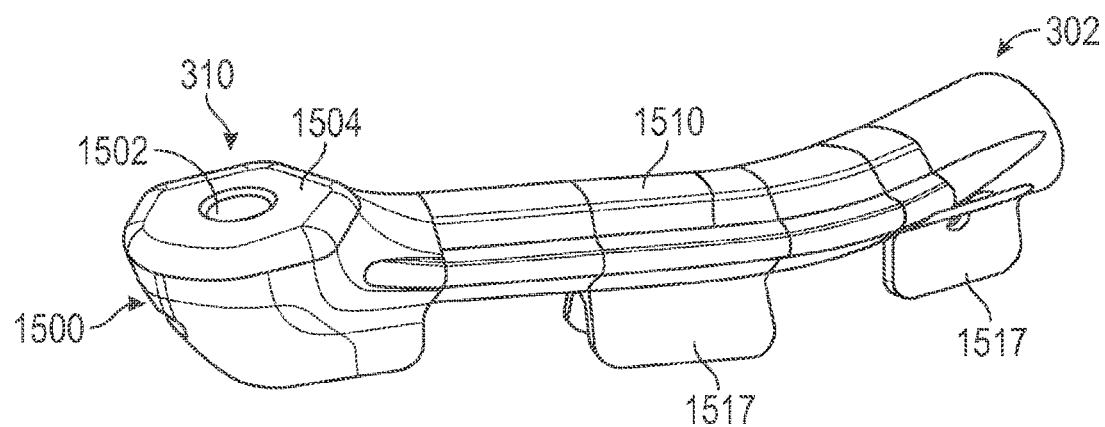

FIGS. 15A and 15B show perspective exploded and perspective views, respectively, of the vascular access system 302 that couples to and extends away from the station 300. The vascular access system 302 replicates the anatomic and certain biomechanical features of the vascular pathway from the right femoral vein to the inferior vena cava that a clinician would experience in a live procedure.

As seen in FIG. 15, the proximal end 1500 (e.g., the end configured to be proximal to the clinician during a simulated procedure) of the vascular access system 302 includes sealing membrane 1502 (e.g., a latex seal) that can be punctured by a catheter to simulate the introduction of a catheter into the right femoral vein of a patient (e.g., into the femoral vein and through the skin). As shown in FIG. 15B, the vascular access port 310 formed at proximal end 1500 is wide enough to allow for the use of an introducer, which may be needed for certain difficult to catheterize patients. As can be seen in FIG. 15A, the sealing membrane 1502 is replaceable by removal of a seal cap 1504 that covers the proximal end 1500 of the vascular access system 302. The sealing membrane 1502 itself can include several alignment holes 1506 that are aligned with posts 1508 extending upwards from a portion of the proximal end of the vascular access system to ensure proper seal placement.

As shown in FIGS. 15A and 15B, the bottom side of the vascular access system 302 includes a number of flanges 1517 extending downwards from the main shaft 1510 to support the vasculature access system at a height over a Cath lab patient table (see, e.g., table 210 of FIG. 2) that would be anatomically appropriate for an average patient.

The vascular access system 302 can be constructed of multiple components joined together. The assembly is in some implementations semi-rigid to improve the stability of the device on a work surface (such as a Cath lab table), to reduce the likelihood of cantilevering of the device, and improve durability of the device. The main shaft 1510 includes an interior lumen (not visible in FIGS. 15A and 15B) of the vascular access system 302, which can have a substantially constant diameter for the majority, or in some implementations, the entirety of the length of the lumen.

Figure 16A:
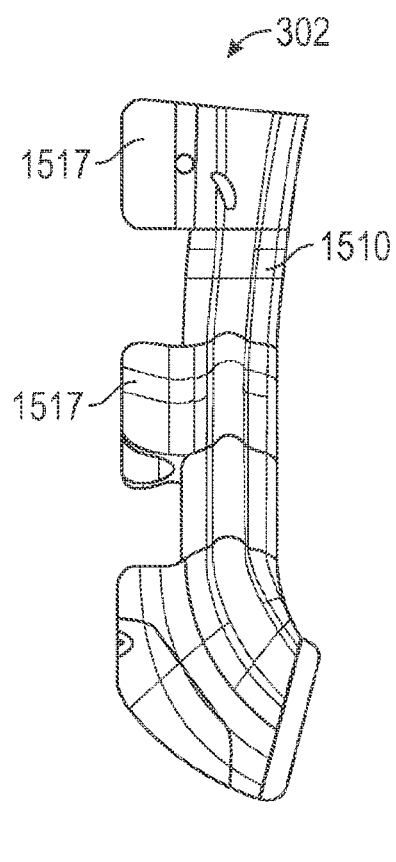
FIGS. 16A and 16B illustrate side and top views of the vascular access device of a physical simulator device, according to aspects of the disclosure.
Figure 16B:
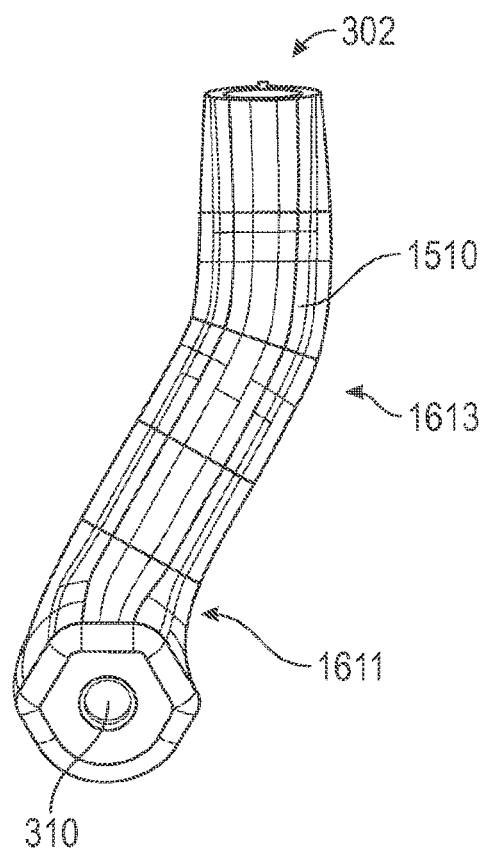

FIGS. 16A and 16B show a side view and top view, respectively, of the vascular access system 302. As can be seen in FIGS. 15 and 16B, the vascular access system 302 (e.g., the main shaft 1510 and internal lumen) has a curvature (e.g., including a first or proximal curve 1611 and a second or distal curve 1613) that substantially replicates the path of the right femoral vein, iliac vein and inferior vena cava to the right atrium.

FIG. 17 shows a top down cutaway view of the vascular access system 302 coupled to the housing 309 of the station 300 at access port 706. The access system 302 can be screwed onto the access port 706 of the housing 309, providing fluidic access between the internal lumen 1700 within main shaft 1510 to the interior of the tank 306. When a patient-specific cartridge 308 with a patient-specific cardiac model is installed in the tank 306 (as shown in FIG. 17), the coupling between vascular access system 302 and access port 706 of housing 309 provides fluidic coupling between internal lumen 1700 and a portion of the patient-specific model that simulates a portion of the right atrium of the patient.

FIG. 18 shows an enlarged view of the access port 706, formed in the housing 309, for connection between the vascular access system 302 and a cartridge 308 installed in the tank 306 of the station 300. As shown in FIG. 18, the access port 706 may be implemented as a dual-lumen pipe 1800 within housing 309, with a central lumen 1805 allowing a catheter access to a cardiac model within the station tank 306 and to allow fluid to flow into the vascular access system 302 (e.g., into main lumen 1700). An outer toroidal chamber 1802 may be provided that surrounds the central lumen 1805 and is fluidically coupled to the central lumen 1805 through an array of through holes 1804.

Figure 19:
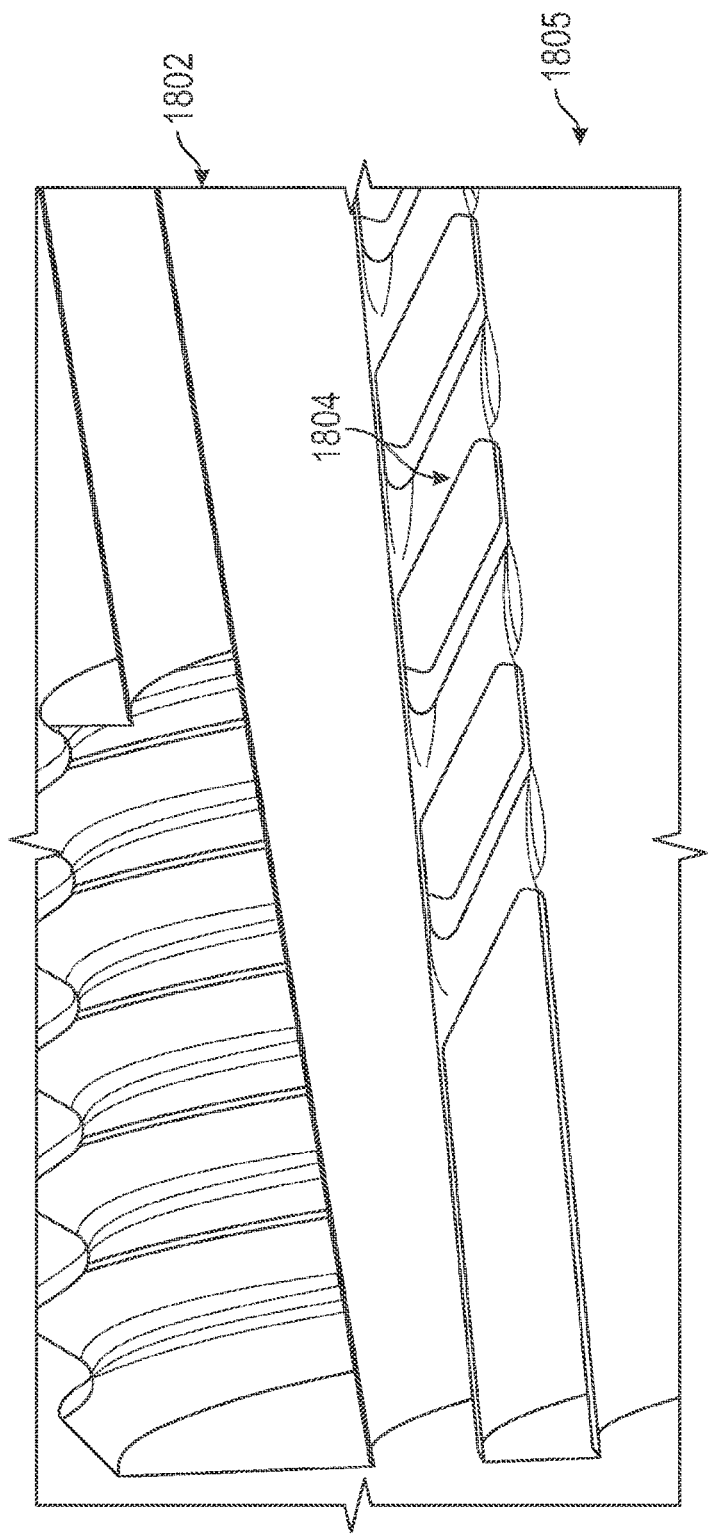
FIG. 19 illustrates through holes of the access port of FIG. 18, according to aspects of the disclosure.

The holes 1804 (shown in cutaway detail in FIG. 19) may be angled away from the tank 306 of station 300 at, for example, 60 degrees from the horizontal, though the angle can be between 50 and 75 degrees in other implementations. This angling of the holes 1804 away from tank 306 (e.g., opposite to the direction in which surgical instruments moved toward the tank during insertion) helps ensure that a catheter, guidewire, or other surgical instrument being inserted into the tank via central lumen 1805 does not catch on the holes. The holes 1804, in the illustrated implementation, have a diameter of 1.5 mm, but can range from 1.0-2.0 mm in other implementations. The toroidal chamber 1802 is fluidically coupled by a return fluid channel 1702 to the tank 306. As such, if too much fluid pressure builds up in the vascular access system 302 or in the replicated right atrium, the fluid can escape through the holes 1804 and be rerouted back to the tank 306. In some implementations, the hole array only occupies the top half of the wall of the central lumen 1805. In other implementations, more or less of the wall surface of the central lumen 1805 is occupied by through holes.

Figure 20:
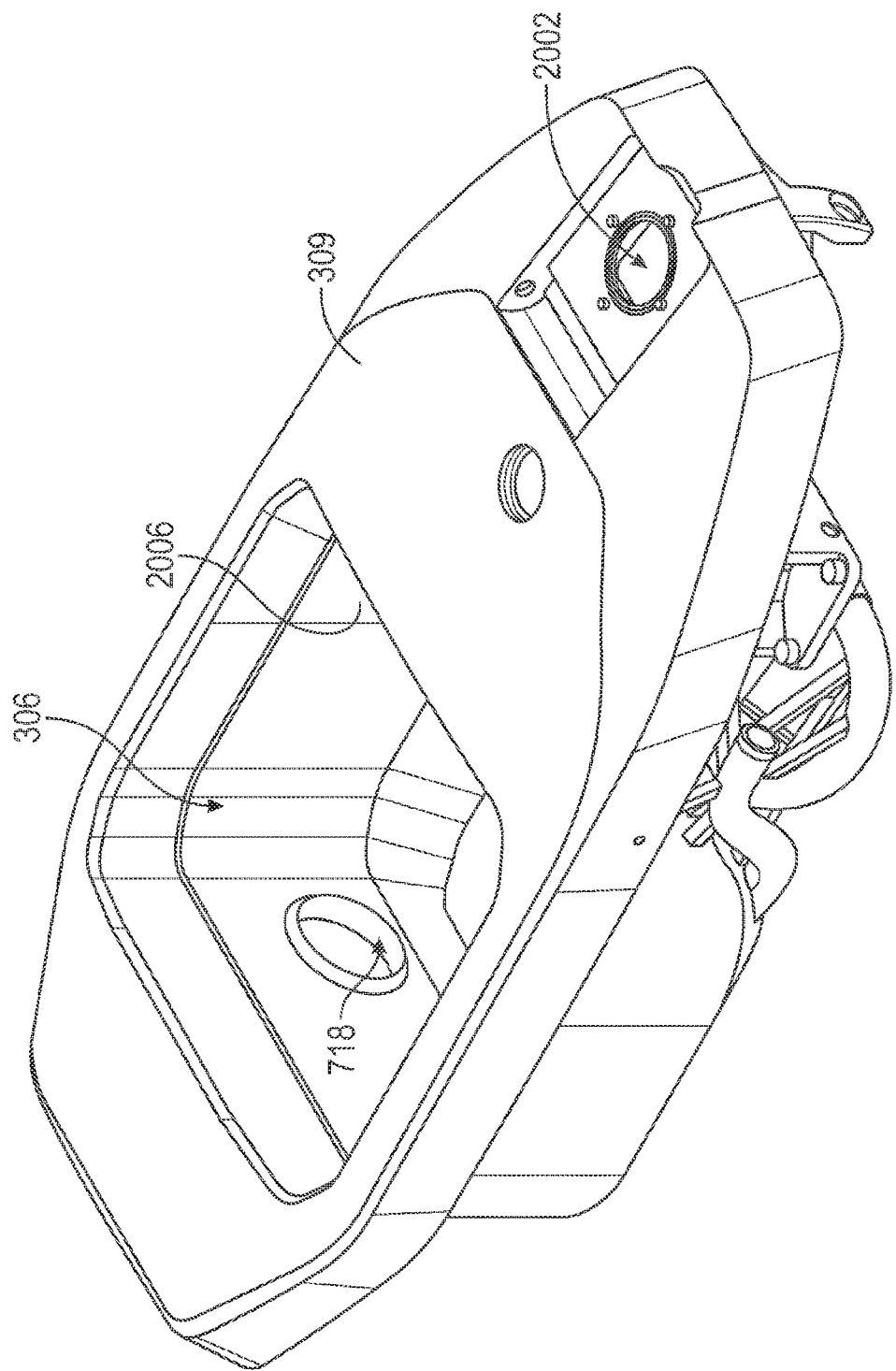
FIG. 20 illustrates a perspective view of a housing of a station of a physical simulator device, according to aspects of the disclosure.
Figure 21:
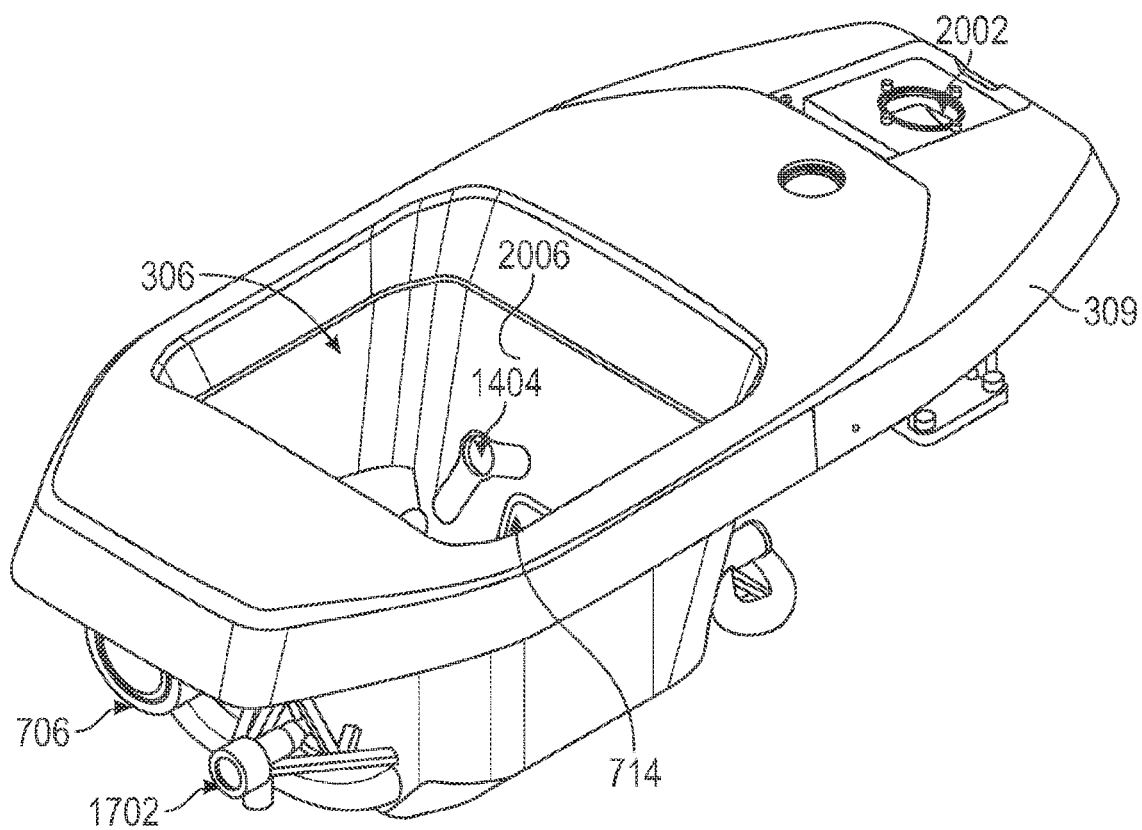
FIG. 21 illustrates another perspective view of the housing of the station of a physical simulator device, according to aspects of the disclosure.

FIGS. 20 and 21 show two different perspective views of the housing 309 of station 300, showing the tank 306 at different angles. Also seen in FIGS. 20 and 21 is an opening 2002 in housing 309 for the proximal end 710 of the esophageal access system 700. FIG. 20 shows interface port 718 connecting to the passageway (e.g., central lumen 1805 of access port 706) out of the tank 306 to the vascular access system 302.

Figure 22:
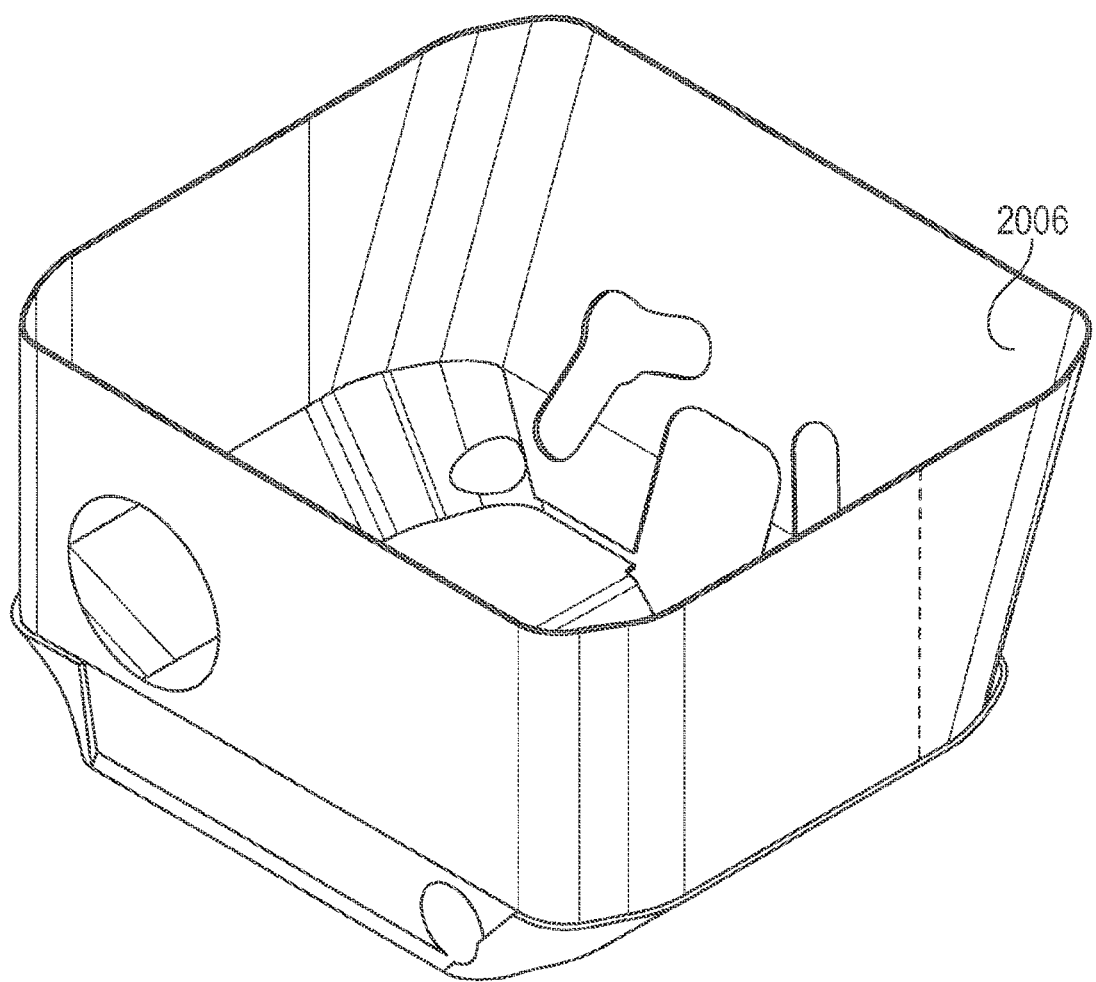
FIG. 22 illustrates an acoustic coating for a tank of station of a physical simulator device, according to aspects of the disclosure.
Figure 23:
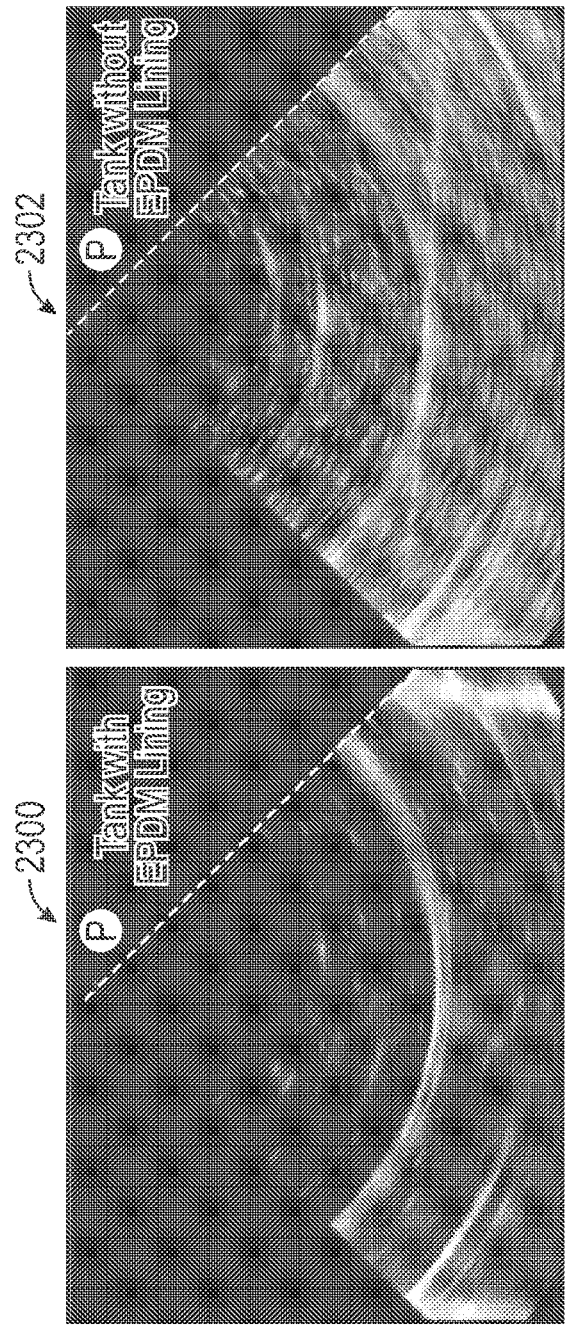
FIG. 23 illustrates ultrasound images obtained with and without an acoustic coating in a tank of a physical simulator device, according to aspects of the disclosure.

As illustrated in FIGS. 20 and 21, the interior of the tank 306 may be coated with acoustic shielding 2006. A perspective view of the acoustic shielding 2006 is also shown in FIG. 22. The acoustic shielding 2006 may be constructed from ethylene propylene diene monomer (EDPM) rubber, though other polymer coatings with similar acoustic properties could be used instead. The acoustic shield 2006 helps prevent the walls of the tank 306 from impacting the ultrasound images (i.e., by reducing acoustic noise) obtained via the TEE probe. Acoustic output measurements or ultrasonic imaging/testing in general can be strongly affected by reflections or echoes from test tank walls. To overcome this, the tank 306 may be coated with linings of low ultrasonic reflection yet highly absorbent to ultrasound (EDPM is one such material). For example, acoustic shielding 2006 may provide absorption of acoustic energy in the frequency range of $1\ \text{MHz} < F < 10\ \text{MHz}$ (e.g., the frequency range for medical ultrasound imaging), or $4\ \text{MHz} < F < 8\ \text{MHz}$ (e.g., the frequency range for TEE: Trans Esophageal Echography). FIG. 23 shows two ultrasound images, including a first image 2300 obtained with a tank that has the acoustic shielding 2006, and a second image 2302 obtained with a tank that does not have acoustic shielding, to show the impact of the shielding.

Figure 24:
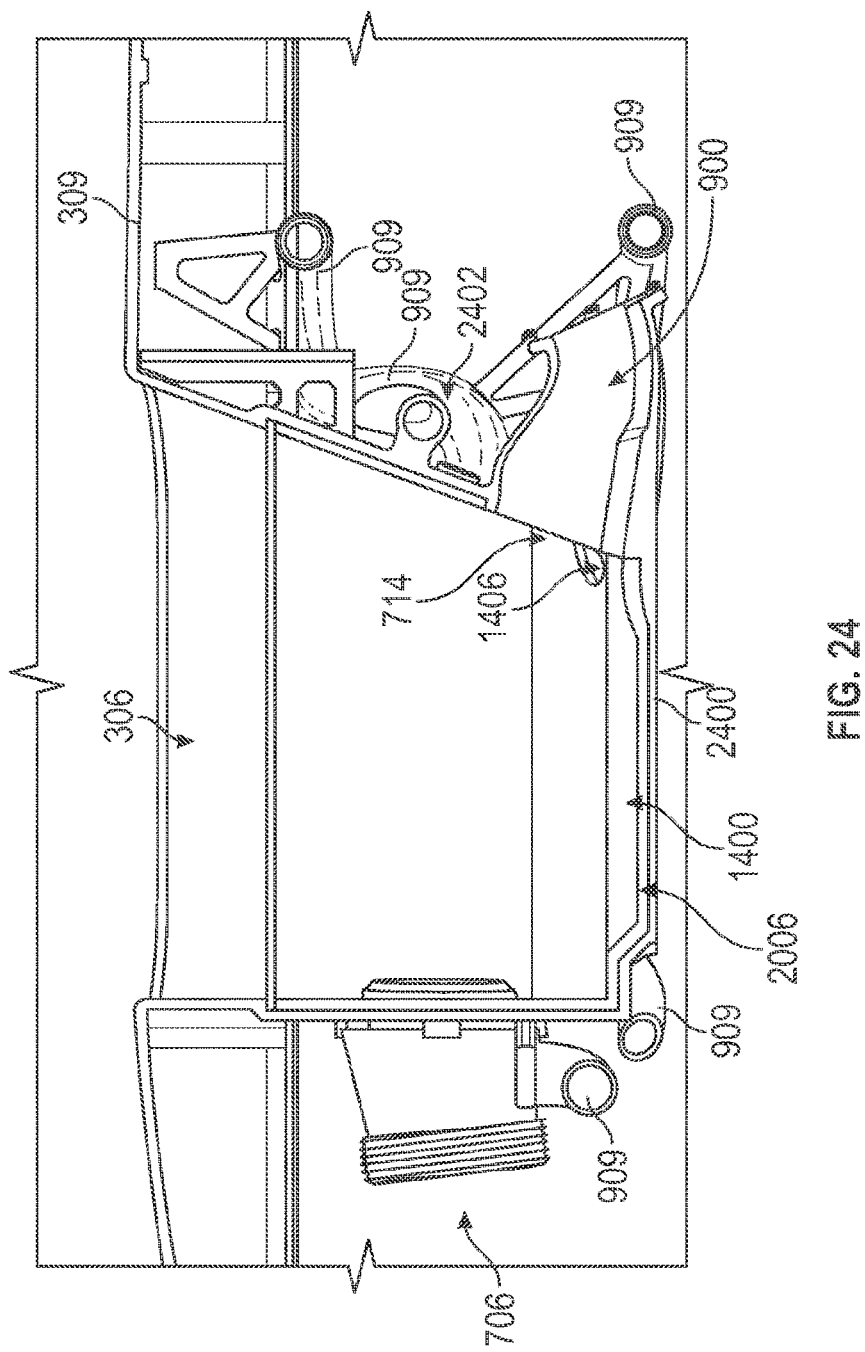
FIG. 24 illustrates a cross-sectional side view of a tank of station of a physical simulator device, according to aspects of the disclosure.

FIG. 24 shows a cutaway view of the tank 306 with the acoustic shielding 2006. Also visible in FIG. 24 are the distal end 714 of the esophageal access system 700, the recess 1400 in which a TEE probe can positioned after passing through lumen 900, the access port 706 for coupling to the vascular access system 302, and a fluid channel 2402 for introducing fluid into the simulated pulmonary vein of the cardiac model (not shown in FIG. 24). As shown, the recess 1400 may be a recess in a bottom wall 2400 of tank 306.

Several studies have shown that cardiac physical models can be conveniently used to evaluate treatment strategies. Most previous studies have been carried out on models obtained using injection molds or additive manufacturing technology, using just one material. The presently disclosed systems and methods utilize a patient-specific cartridge 308 with a patient-specific cardiac model that has the advantages of being arranged for mounting to interface port 718 in tank 306 of station 300, and of being multi-material. For example, the cardiac model may be derived directly from a patient-specific anatomy into a biomechanical simplified model, approaching the biomechanical behavior of the anisotropic vascular wall material and as well as being, in some implementations, visible under echography.

FIG. 25 illustrates an example of a patients-specific cartridge 308 that includes a frame 2500 and a cardiac model 2502. Of the cardiac model 2502, one or more, and in some implementations, all of the following components are patient specific: the replicated septum 112', the replicated fossa ovalis 400' of the septum (e.g., both the position and biomechanics of the replicated fossa ovalis 400' may be patient specific for tenting and puncture), a replicated upper 2.5 cm-5 cm (e.g., 3 cm) of the replicated left pulmonary vein 2505 and the spur (also referred to as a ridge) separating the left pulmonary vein 2505 from the left atrium 2504, the replicated Left Atrial Appendage 116' (e.g., the position of the LAA 116 and its trabeculae, including both position and biomechanics can be patient specific), and the replicated mitral ring 2503 (e.g., the position of the replicated mitral ring may be patient specific).

In some implementations, the cardiac model 2502 may include either patient-specific or standardized portions for a replicated portion 2506 of the right atrium and non-patient specific portions of the left atrium 2504.

A method for fabricating a patient-specific physical cardiac simulation device such as patient-specific cartridge 308 may include segmenting the region of interest from typical medical imaging modalities such as MRI, CT; creating a 3D geometric model from the segmented images, integrating the 3D geometric model to a standard (patient-independent) frame, creating a 3D Finite Element model of the anatomical region of interest, assigning realistic material properties from a data-bases of biomechanical cardiovascular tissue model, creating a second 3D Finite Element model, applying a goal-based design optimization algorithm to the second 3D Finite Element model to assign the distribution of printable materials that can replicate the behavior of the first 3D Finite Element model, and printing (e.g., using additive manufacturing techniques) the multi-material model with the frame. More detailed descriptions of this process can be found in PCT Applications WO/2018/050915 and WO/2018/051162, each of which is hereby incorporated by reference in its entirety.

In the example of FIG. 25, the frame 2500 holds a cardiac model 2502 that includes a portion 2506 corresponding to a patient's right atrium, a portion 2504 corresponding to the patient's left atrium, a portion 116' corresponding to the patient's left atrial appendage 116 extending off from the left atrium that has the shape and biomechanics of the left atrial appendage of the patient, and a portion corresponding to the patient's pulmonary vein 2505 (positioned behind the left atrial appendage). A portion 400' corresponding to the patient-specific fossa ovalis separates the right atrium from the left atrium. In some implementations, the portion 2506 corresponding to the right atrium need not be patient specific and may have a standard shape and material composition.

FIGS. 26A and 26B illustrate perspective and top views, respectively, of another example cardiac model 2502 incorporated into a frame 2500, according to another implementation. In contrast to the model shown in FIG. 25, the cardiac model 2502 shown in FIGS. 26A and 26B includes a window 2600 in an upper facing-portion of the replicated right atrium 2506. The window 2600, formed by an absence of material (for example), provides both visual access to the replicated right atrium 2506 during a planning/practice procedure, reduces the time, complexity, materials, and cost of manufacturing the cardiac model 2502, as well as improves the ultrasound aspect of the device (e.g., by avoiding unrealistic ultrasound effects generated by a top wall of the right atrium). In addition, the model 2502 shown in FIGS. 26A and 26B includes a replicated aortic valve annulus 2602 not seen in FIG. 25. In FIG. 26B, the replicated fossa ovalis 400' can be seen clearly through the window 2600 formed in the right atrium model portion 2506, avoiding the need for fluoroscopy during the practice/planning procedure. Finally, the window 2600 provides an avenue for air bubbles to escape the replicated right atrium 2506 that might introduce artifacts in an ultrasound image.

The frame 2500 in all of FIGS. 25, 26A, and 26B is shaped such that it curves around the anatomic structures relevant to the procedure to avoid introduction of ultrasound artifacts, while still supporting (but not over-supporting) the cardiac model 2502. The frame 2500 also has standard dimensions used for all patients, so that the cartridge 308 can be securely positioned within the tank 306 of the station 300 and such that the fluidic channels of fluid control system 909 of the station mate with the model fluid ports connected to the right atrium and pulmonary vein portions 2506 and 2505 of the model 2502 to ensure proper fluid flow through the model. For example, as shown in FIG. 26A, frame 2500 may include openings 2609, 2611, and 2613 corresponding, respectively, to the simulated superior vena cava interface, the inferior vena cava interface, and the upper pulmonary vein interface of the patient-specific model 2502, and respectively, to the access ports 718, 1404, and 1408 in tank 306.

In some implementations, the standard frame 2500 includes the right atrium portion 2506 of the cardiac model 2502, other than the septum 112' and fossa ovalis 400' separating the right atrium from the left atrium portions of the model. In general, the artificial tissues may range in thickness from between about 0.5 cm to about 2.5 cm.

Figure 27:
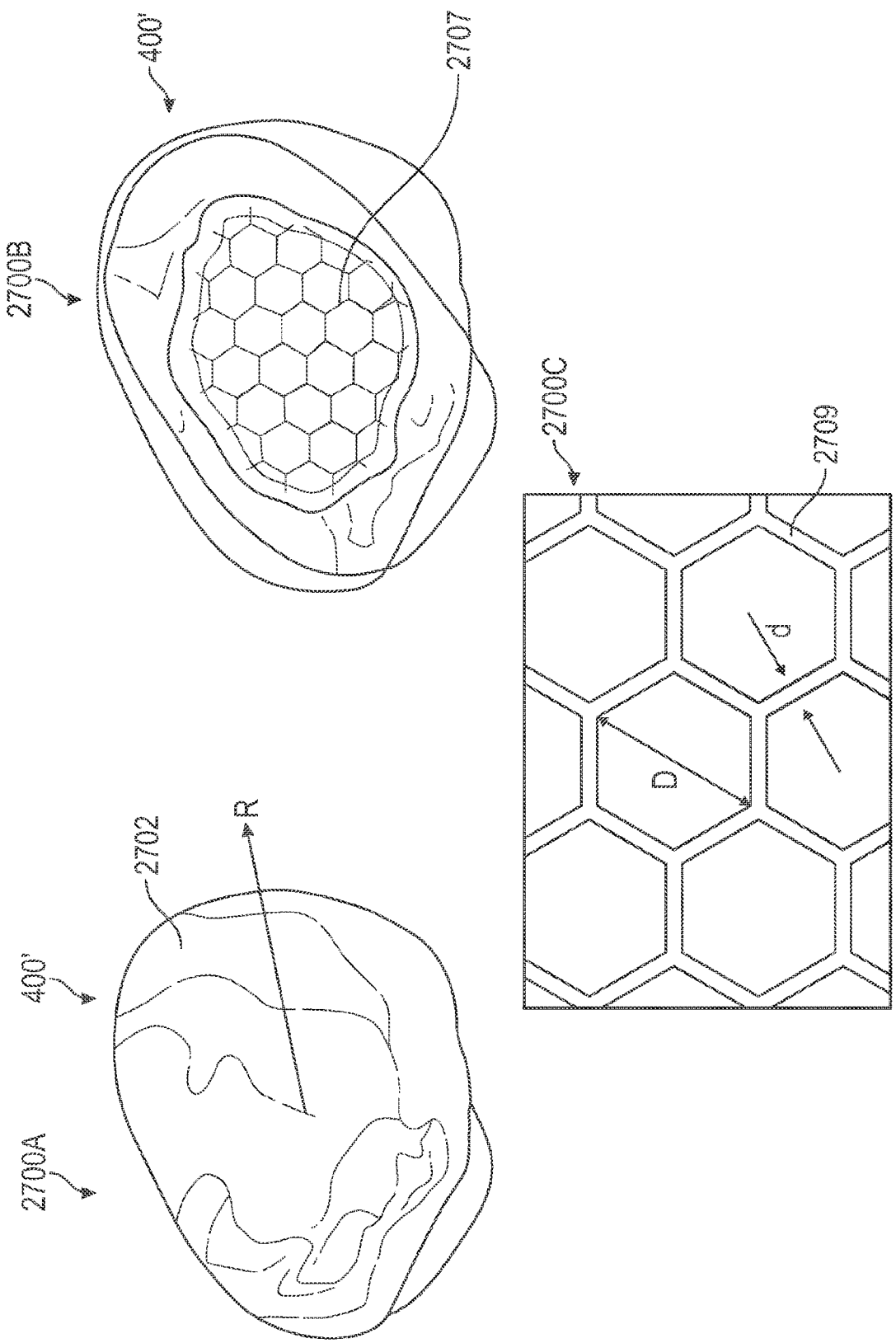
FIG. 27 illustrates features of a fossa ovalis of a patient-specific model of a patient-specific cartridge of a physical simulator device, according to aspects of the disclosure.

To help provide biomimetic mechanics of the replicated fossa ovalis 400', in some implementations, additional structural reinforcements are introduced into the model structure. The additional structures allow for bio-realistic tenting and puncturing of the model fossa ovalis 400' during procedures. For example, FIG. 27 shows two images 2700A and 2700B, each with a view of an example model fossa ovalis 400', included in the cardiac model 2502. Image 2700A shows a view of the external surface 2702 of the model fossa ovalis 400'. Image 2700B shows a view of the interior structure of the model fossa ovalis 400'. In overview, the model fossa ovalis 400' can be constructed from, for example, three structural layers, including two outer layers (e.g., one facing the right atrium and one facing the left atrium), and an inner reinforced layer 2707. The inner reinforced layer 2707 includes an array of honeycomb structures.

The thickness and other material and/or mechanical properties of the patient-specific model 2502 may be selected and arranged to provide both a patient-specific flexible septum, and a patient-specific flexible fossa ovalis. More specifically, the flexibility of various portions of patient-specific model 2502 is based on both the shape of the anatomy of the specific patient, and on the mechanical properties of the whole septum structure. As would be understood by one of ordinary skill in the art, the fossa ovalis is a portion of the septum, being defined as an oval/round depression in the lower posterior part of the interatrial septum (e.g., in average 30% of the whole septum area), composed primarily by thin fibrous tissue.

For example, in order to form a simulated fossa ovalis 400' for patient-specific model 2502, the simulated fossa ovalis may be provided with a superior-inferior diameter of, for example, 20.8±16.2 mm, an anterior-posterior diameter of, for example, 15.7±6.2 mm and thickness equal to, for example, 0.68±0.27 mm, the lowest in the whole septum anatomy. Then, moving anteriorly or posteriorly the thickness may increase, with an average value of about, for example, 1.8±0.7 mm. In particular, the simulated septum 112' may be thickest above the fossa ovalis 400' adjacent to superior vena cava entrance 2609 (e.g., 3.4 mm in average); e.g., 1.8 mm thick, in average, in the narrow isthmus anterior to the fossa and in the most inferior portion; e.g., 2.4 mm, in average, in the area immediately inferior to the fossa.

In order to provide the simulated fossa ovalis 400' with an adequate flexibility towards a proper patient-specific tenting while providing a more realistic puncturing mechanical feedback to the surgeon during a simulated procedure, the thickness and the material properties of the simulated septum may be arranged to create a gradient zone moving from the outer part of the septum toward s the center (fossa ovalis), progressively increasing (e.g., in a direction opposite the radial direction R indicated in FIG. 27) the flexibility and the compliance of the model wall, by the arrangement of the materials and/or thicknesses of the model at those locations. For example, the thickness and the material properties the simulated left atrium tissue may be selected based on the strain energy function in Equation 1 below:

$$W = c_{10}(\bar{I}_1 - 3) + c_{01}(\bar{I}_2 - 3) + c_{20}(\bar{I}_1 - 3)^2 + c_{11}(\bar{I}_1 - 3)(\bar{I}_2 - 3) + c_{02}(\bar{I}_1 - 3)^2 \quad (1)$$

where $I_1$ and $I_2$ are invariants of strain, and $c_{ij}$ are material constants such as the constants provided in Table 1 below.

TABLE 1

| Parameter | Value | Units |
|---|---|---|
| $c_{10}$ | $-5.84 \times 10^4$ | Pa |
| $c_{01}$ | $6.34 \times 10^4$ | Pa |
| $c_{20}$ | $1.60 \times 10^7$ | Pa |
| $c_{11}$ | $-3.53 \times 10^7$ | Pa |
| $c_{02}$ | $1.97 \times 10^7$ | Pa |

The mechanical features of the simulated septum 112' are arranged to mimic biological soft tissue, particularly with respect to the interatrial septum fibers, which have a hierarchical microstructure that results in hyperelastic properties. These mechanical features of the simulated septum 112' allow the patient-specific cartridge 308 to mimic a patient's actual transseptal tenting and puncture for clinicians training and/or patient-specific rehearsal. The mechanical features of the simulated septum 112' may be arranged to be nearly isotropic and hyperelastic. Accordingly, in some implementations, the simulated fossa ovalis 400' of patient-specific model 2502 may be isotropic and hyperelastic with a flexibility gradient of decreasing flexibility with increasing radial distance from the center of the fossa ovalis.

FIG. 27 also includes a diagram 2700C showing more detailed geometry of the honeycombs 2709 that may be included in inner reinforced layer 2707, and that may be arranged (e.g., along with the thickness and material properties of the surrounding layers) to provide the patient-specific flexibility and tenting characteristics of the simulated septum 112' and fossa ovalis 400' of the patient-specific model. For example, each honeycomb 2709 can be hexagonal in shape, with a diameter D ranging from around 5.0 mm to about 6.0 mm. The honeycomb can be fabricated, for example, from Acrylonitrile butadiene styrene (ABS). The distance (d) between cells (i.e., the in-plane thickness of the edges of each honeycomb) can range from about 0.4 to about 0.5 mm. The out-of-plane thickness of the honeycomb (which corresponds to the thickness of the entire inner layer) is about 0.3 to about 0.4 (e.g., 0.36) mm. The honeycomb structure can be filled, for example with Agilus polyjet material having a Young's Modulus of between about 0.6-5 MPa. In contrast, the ABS that forms the honeycomb can have a Young's Modulus of between about 1-2 GPa. The inner and outer layers of the model fossa ovalis 400' can also be formed form Agilus, and have a thickness of between about 0.30 mm and 0.35 mm (e.g., 0.32). Together the model fossa ovalis 400' may be about 1 mm thick, though thickness may be varied based on the specific anatomy of the patient.

The remaining patient-specific portions of the cardiac model 2502 can be made from a combination of materials determined using the above-referenced optimization process (discussed further in PCT Applications WO/2018/050915 and WO/2018/051162) to obtain tissues that have shapes and biomechanical characteristics substantially similar to that of the actual patient's anatomy. Typical replicated anatomical wall thicknesses range from about 0.5 to about 2.5 cm. In some implementations, as described further in U.S. patent application Ser. No. 16/417,151, hereby incorporated herein by reference in its entirety, the materials can further be selected to achieve an ultrasound aspect that is substantially similar to that of the actual specific patient.

For example, manufacturing the patient-specific portions of patient-specific model 2502 may include obtaining medical image data of an organ (e.g., the patient's heart) within a specific patient. The medical image data may then be processed to generate one or more data files including a volumetric model of the organ. Generating the data file(s) may include receiving one or more material data files specifying a configuration of one or more materials to be deposited by an additive manufacturing system. The patient-specific model may then be generated by dispensing at least one first material having lower acoustic impedance properties and a second material having higher acoustic impedance properties.

The medical image data of the organ may be obtained using common medical imaging modalities such as X-ray radiography, X-ray rotational angiography, MRI, CT scanning, ultrasound imaging (2D or 3D), or nuclear medicine functional imaging techniques such as positron emission tomography and single-photon emission computed tomography. The medical image data may be obtained for an organ within a specific patient or for pan of a larger organ. For example, the organ may be a heart, a portion of a heart, or an artery. The medical image data may also include data associated with organs surrounding or located in close proximity to the organ being imaged such as bones, joints, fatty tissue, glands, or membranes which may exert mechanical feedback on the organ to be replicated.

The medical image data may be processed to generate a volumetric model of the specific organ to be replicated as the patient-specific model 2502. The volumetric model may be generated by converting the medical image data into a three dimensional data model describing the anatomic characteristics of the organ to be replicated. The anatomic characteristics may include various linear dimensions, volume dimensions, thicknesses, as well as other characteristics of the organ being replicated, such as tissue echogenicity. Such characteristics can be derived directly from the medical imaging data collected (e.g., from ultrasound images), or indirectly by reference to one or more databases or other electronic data sources of anatomical knowledge that stores reference information about representative tissue characteristics of various tissues in the body. The volumetric model includes a three dimensional set of nodes which define a plurality of elementary volumetric elements or voxels partitioning a space region (e.g., the space encompassed by the organ or portions of the organ) modeled by the volumetric model. The elementary volumetric elements may be defined as shapes of a tetrahedron, a pyramid, a triangular prism, a hexahedron, a sphere, or an ovoid. The volumetric model may be generated from a three dimensional surface mesh of the organ to be replicated which captured in the medical image data. In some implementations, the volumetric model may be generated by performing volumetric model generation on the surface mesh. In some implementations, the volumetric model is generated by performing finite-element volumetric model generation on the medical image data. In some implementations, the volumetric model is further processed to generate a deformed volumetric model of the organ to be replicated. In these implementations, the deformed volumetric model replicates the loads and constraints imposed on the in vivo organ tissue of a specific patient by one or more organ tissues surrounding the specific patient's in vivo organ tissue.

Defining the three dimensional set of nodes and the elementary volumetric elements or voxels associated with the imaged organ allows a plurality of materials to be assigned to each voxel so that the additive manufacturing system may form the patient-specific model 2502 such that the echogenic properties of the in vivo organ tissue at one or more locations are accurately replicated in the corresponding locations of the patient-specific model 2502. The assigned materials may include materials of differing acoustic impedance values, such as higher acoustic impedance materials, lower acoustic impedance material, or mixtures or suspensions of materials having different acoustic impedances.

Material assignment is performed using a cost function to minimize the error between the desired echogenic properties (determined based on the medical image data or from electronic databases or data sources storing representative tissue characteristic data) and the resulting echogenic properties of the combination of one or more of the materials selected for deposition in a location corresponding to a given voxel or cluster of voxels of the volumetric model. In some embodiments, the cost function may include additional cost functions, for example a cost function to minimize the error associated with the elastic material properties or other mechanical material properties of the organ being replicated. In these embodiments, material assignment may be achieved by solving the cost function using a joint search to minimize the sum of the errors between the mechanical material properties and the echogenicity material properties. In some implementations, weights may be applied to the respective constituent cost functions based on the desired application. For example, it may be desirable to apply a higher weight to the cost function associated with mechanical material properties when accurately simulating echogenicity in the patient-specific model 2502 is less important. Alternatively, it may be important to weight the cost function associated with echogenic material properties higher in situations where it is critical to accurately simulate echogenicity in the patient-specific model 2502. After performing a joint search as described above, a final volumetric model may be generated.

In some implementations, as an alternative to a joint search method, a predetermined number of best fitting echogenic (acoustic) property models could be evaluated using a mechanical property cost function to select an overall best fitting model. Additionally, or alternatively, a predetermined number of best fitting mechanical property models may be evaluated using an echogenicity cost function to identify an overall best fitting model. In some implementations, the cost function may include constraints to prevent aspects of the volumetric model from being assigned specific materials. For example, a constraint may be implemented to require lower acoustic impedance materials formed from sacrificial material to be fully encapsulated within one or more higher acoustic impedance materials.

The object materials to be assigned to each voxel that were determined as a result of applying the cost function(s) may be selected from a database of object materials. In some implementations, a particular material may be selected based on the results of minimizing a cost function for a given region (e.g., a cluster) or plurality of elementary volumetric elements of the volumetric model.

In some implementations, processing the medical image data includes converting the medical image data from a data or file format that is specific to the particular medical imaging modality used to obtain the medical image data into a data or file format that is compatible with an additive manufacturing system. For example, the medical image data may be processed and converted into one or more STL data files or other additive manufacturing system compatible file format. The STL file format may be utilized by the additive manufacturing system to generate a 3D patient-specific model 2502 based on the volumetric model included in the one or more data files.

One or more material data files may specify a configuration of one or more materials to be deposited by an additive manufacturing system. The one or more material data files may define an arrangement or configuration of a plurality of echogenic and non-echogenic materials (or higher acoustic impedance and lower acoustic impedance materials) to be deposited by the additive manufacturing system based on the processed image data. For example, based on the plurality of materials assigned to each voxel of the volumetric model included in the one or more material data files, the additive manufacturing system may determine the arrangement of one or more materials to be deposited in one or more layers to form the patient-specific model 2502.

The additive manufacturing system may form the patient-specific model 2502 by dispensing at least one material having lower acoustic impedance properties and a second material having higher acoustic impedance properties. The additive manufacturing system dispenses the plurality of materials to form the patient-specific model 2502. The plurality of materials includes at least one lower acoustic impedance material and a higher acoustic impedance material. The two materials may be dispensed simultaneously as a suspension of the higher acoustic impedance material within the lower acoustic impedance material, or as separate depositions of higher acoustic impedance material and lower acoustic impedance materials. Based on the configuration of materials assigned to each voxel of the volumetric model included in the one or more material data files, the additive manufacturing system dispenses the appropriate material determined for a given elementary volumetric element defined in the volumetric model of the organ to be replicated. For example, the additive manufacturing system dispenses amounts of at least one hypo-echogenic material at locations in the patient-specific model 2502 which map or correspond to the same locations in the volumetric model that were determined to be less echogenic areas or regions based on the medical image data. Similarly, hyper-echogenic materials (e.g., a suspension with a higher density of high acoustic impedance material) may be dispensed by the additive manufacturing system at locations in the patient-specific model 2502 which correspond to the same locations in the volumetric model that were determined to be more echogenic.

There need not be a one-to-one correspondence between a voxel and a given material deposition. A voxel is a logical construct which can be processed by an additive manufacturing device to determine an appropriate set of independent material depositions. For example, some volumetric models may be generated with lower resolution than a print-resolution of a 3D printer used to print the patient-specific model 2502. In such situations, the 3D printer may make multiple deposits of material to generate a single voxel. For example, in some implementations, each voxel may correspond to a 3×3×3, 4×4×4, 5×5×5, or other sized cuboid of material depositions. In other implementations, voxels may translate into ovoid or other shaped depositions, rather than cuboid depositions. The 3D printer used to fabricate the patient-specific model 2502 may translate an echogenicity value assigned to each voxel to an appropriate pattern of material depositions within a given a corresponding cuboid or ovoid deposition. In other implementations, each voxel corresponds to a single material deposition, which may have a spherical, ovoid, rectangular or other regular or irregular shape depending on the equipment used to make the deposition. The at least one material having lower acoustic impedance properties and the second material having higher acoustic impedance properties may be dispensed by the additive manufacturing system using casting, 3D printing, mechanical linkages of disparate materials and material deposition manufacturing. A variety of additive manufacturing processes may be utilized by the additive manufacturing system to form the patient-specific model 2502 including binder jetting, directed energy deposition, material jetting, power bed fusion, fused deposition modeling, laser sintering, stereolithography, photopolymerization, and continuous liquid interface production. In some implementations, 3D printers using PolyJet Matrix™ technology (Stratasys, Ltd., Eden Prairie, MN) may be used to simultaneously dispense a plurality of materials having different elastic and acoustic impedance properties to form an patient-specific model 2502 with varying elastic and echogenic properties at one or more locations. In some implementations, the at least one material having higher acoustic impedance properties includes a polymerized material, such as PolyJet material having a polymerized density of 1.18-1.21 g/cm$^3$. In some implementations, the lower acoustic impedance includes a hydrogel with acoustic properties similar to water. In some implementations, the lower acoustic impedance material includes a non-polymerized material such as water, a gel, an ion, or a bio-molecule.

In the example of FIG. 27, the patient-specific model 2502 includes a fossa ovalis 400' having a flexibility corresponding to a flexibility of a fossa ovalis of the heart of the patient (e.g., a flexibility that decreases with increasing radial distance from a center thereof, such as according to the decreasing flexibility of the fossa ovalis of the patient with the same increasing radial distance).

Figure 28:
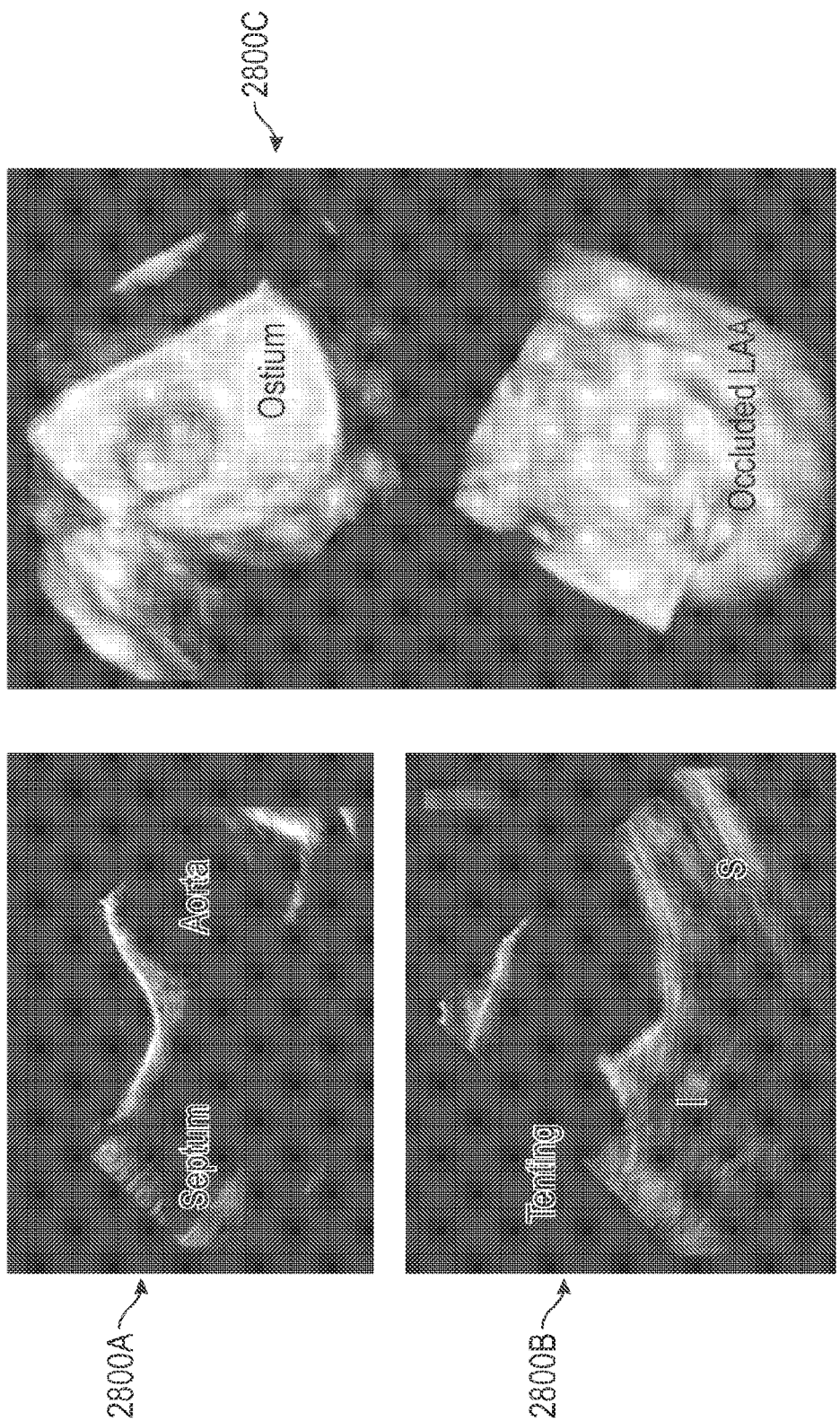
FIG. 28 illustrates ultrasound images of a patient-specific model in a tank of a physical simulator device, which may be obtained using an ultrasound device disposed in the tank of the physical simulator device, according to aspects of the disclosure.

FIG. 28 shows three images 2800A, 2800B, and 2800C of an example cardiac model cartridge 308 under ultrasound, demonstrating the biomimetic ultrasound response of the model. In particular, images 2800A and 2800B show the model septum before and after pressure from a puncturing instrument is applied to the septum (causing the tenting in image 2800B). Image 2800C shows the model LAA before and after occlusion. In various scenarios, the surgical simulation device 202 may be used by providing a surgical simulation device 202 having a station 300 having a housing 309, a tank 306 formed in the housing 309, and a vascular access system 302 coupled to the housing 309, providing, in the tank 306, a patient-specific cartridge 308 that includes a patient-specific model 2502 of at least a portion of a heart of a patient, inserting an imaging device (e.g., TEE probe 505) through an esophageal access system 700 within the housing 309 from an esophageal access port 304 on the housing 309, though a first port (at end 714) in the tank 306, and into a recess 1400 in a bottom surface 1402 of the tank 306 beneath the patient-specific cartridge 308, and inserting a surgical element (e.g., a guidewire, a tool, etc.) from a vascular access port 310 of the vascular access system 302, through a main lumen 1700 of the vascular access system 302, and into a portion of the patient-specific model 2502 via a second port 718 in the tank 306. The imaging device may then be operated to capture images such as ultrasound images 2800A, 2800B, or 2800C, to aid in manipulating the surgical element to, through, around, or within various portions of the patient-specific model.

Figure 29:
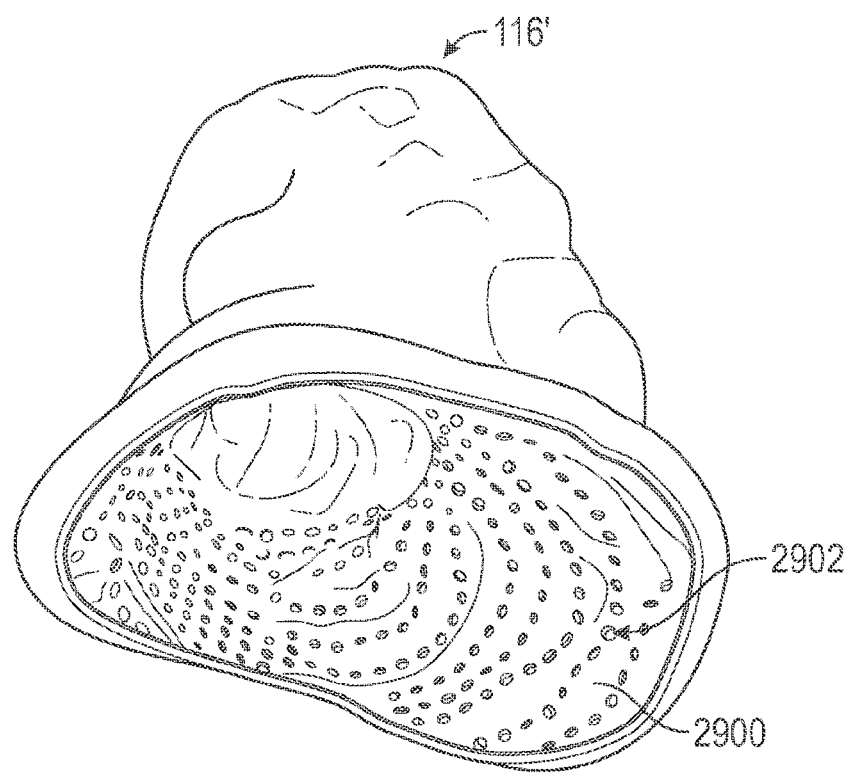
FIG. 29 illustrates a left atrial appendage of a patient-specific model of a patient-specific cartridge of a physical simulator device, according to aspects of the disclosure.

FIG. 29 shows an example entry to the replicated left atrial appendage 116' to be occluded during example procedures contemplated to be carried out using the station 300 and cartridges 308 disclosed herein. As can be seen in FIG. 29, the interior surface 2900 of replicated left atrial appendage 116' may include a micropattern of small depressions 2902. The depressions 2902 shown in FIG. 29 are circular in shape, though other regular or irregular geometric shapes may also be used. Each depression 2902 can be between about 0.1 mm and 1.0 mm in diameter and be between 0.1 mm and 2.0 mm deep. The micropattern improves the ability for atrial appendage occluders to anchor to the simulated tissue. In various implementations, the micropattern may extend to from about 1.0 cm to about 2.5, cm into the model left atrial appendage 116'.

Figure 30:
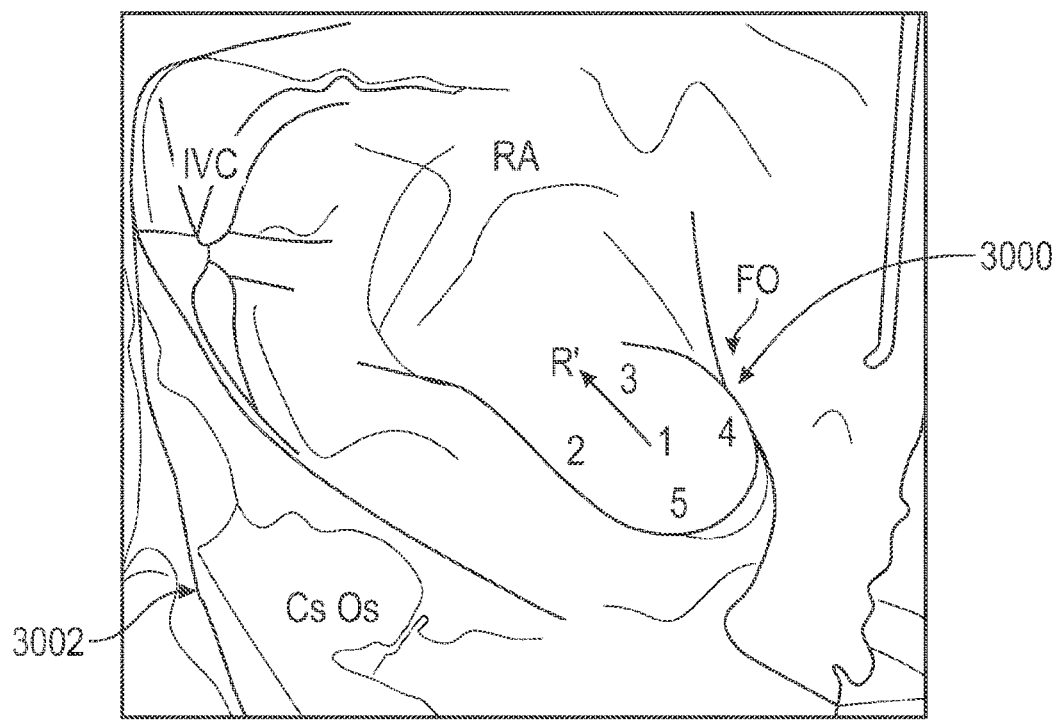
FIG. 30 illustrates a portion of a patient heart that can be modeled by a patient-specific model of a patient-specific cartridge of a physical simulator device, according to aspects of the disclosure.

FIG. 30 illustrates a portion of a patient heart that can be modeled by a patient-specific model of a patient-specific cartridge of a physical simulator device, according to aspects of the disclosure. For example, FIG. 30 shows a patient's fossa ovalis 3000, and various potential puncture locations thereon, relative to other cardiac structures such as the coronary sinus ostium (CS Os) 3002, right atrium (RA), and inferior vena cava (IVC), and indicates the radial direction R' of the patient's negative flexibility gradient, corresponding to the radial direction R of the flexibility gradient of the simulated fossa ovalis 400' described above in connection with FIG. 27.

Figure 31:
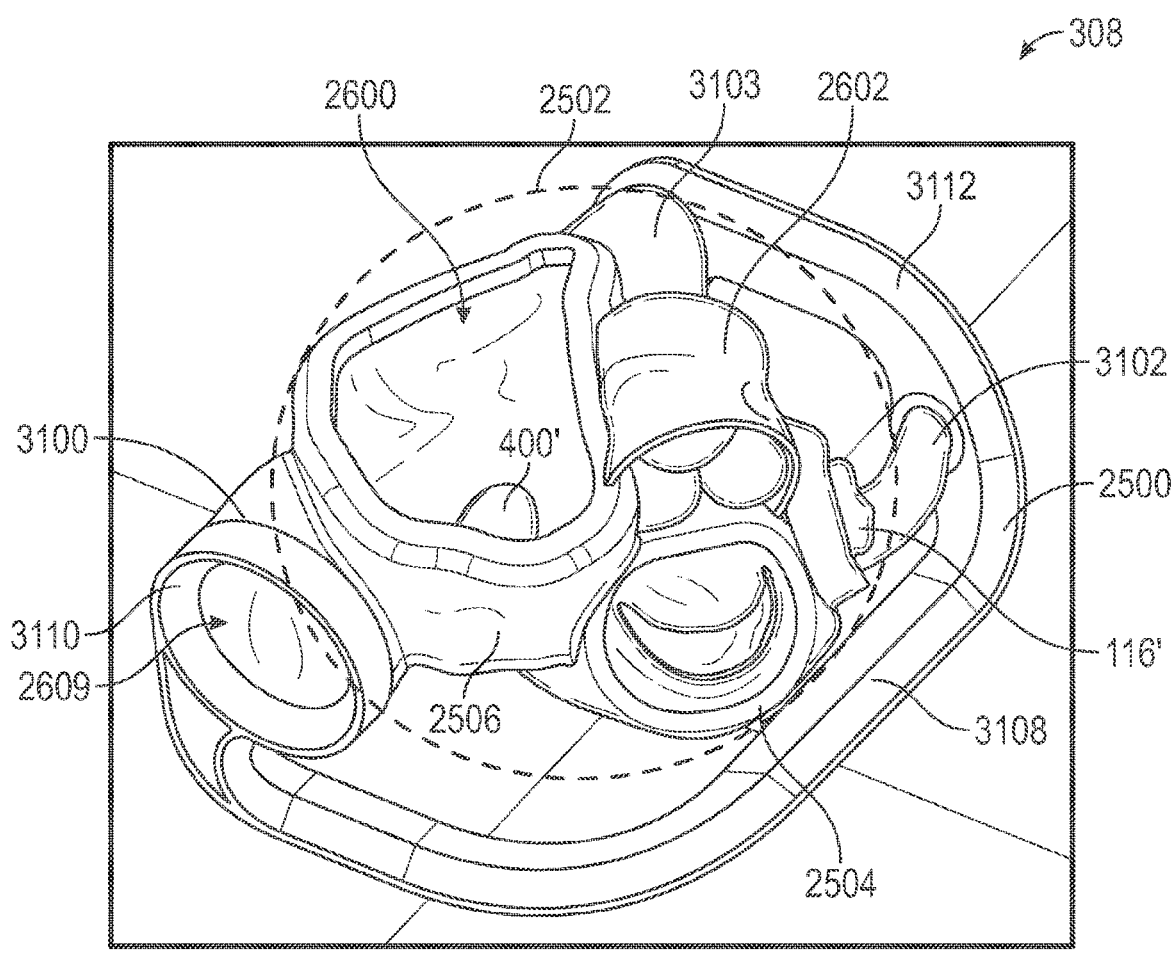
FIG. 31 illustrates a perspective view of a patient-specific cartridge having a patient-independent frame, according to aspects of the disclosure.

As described above in connection with, for example, FIGS. 26A and 26B, patient-specific cartridge 308 may include a patient-specific model 2502 coupled to a frame 2500. In some implementations, the frame 2500 is a patient-independent frame that can carry various different patient-specific models. FIG. 31 illustrates a perspective view of a patient-specific cartridge having a patient-independent frame, according to aspects of the disclosure. As shown in FIG. 31, patient-specific model 2502 may include a patient-specific portion (e.g., including the simulated right atrium 2506, the simulated left atrium 2504, the simulated aortic annulus 2602, and the left atrial appendage 116') in which the shape, mechanical properties, acoustic properties, and/or other properties correspond to the same properties of a specific patient. The patient-specific model 2502 may also include interfacing portions such as interfacing portions 3100, 3102, and 3103 that may deviate, in shape, size, orientation, and/or mechanical properties, from the corresponding properties of the patient, in order to interface with standard frame 2500. As shown in FIG. 31, patient-independent frame 2500 may include a base portion 3108, a proximal portion 3112, and a distal support 3110 surrounding opening 2609 (e.g., corresponding to a superior vena cava interface for patient-specific cartridge 308). As shown, interfacing portion 3100 extends between the patient-specific portion of patient-specific model 2502 and opening 2609 of frame 2500. Interfacing portions 3100, 3102, and 3103 may be integrally formed portion of a contiguous patient-specific model 2502, though they may deviate from the patient's anatomical shape.

Figure 32:
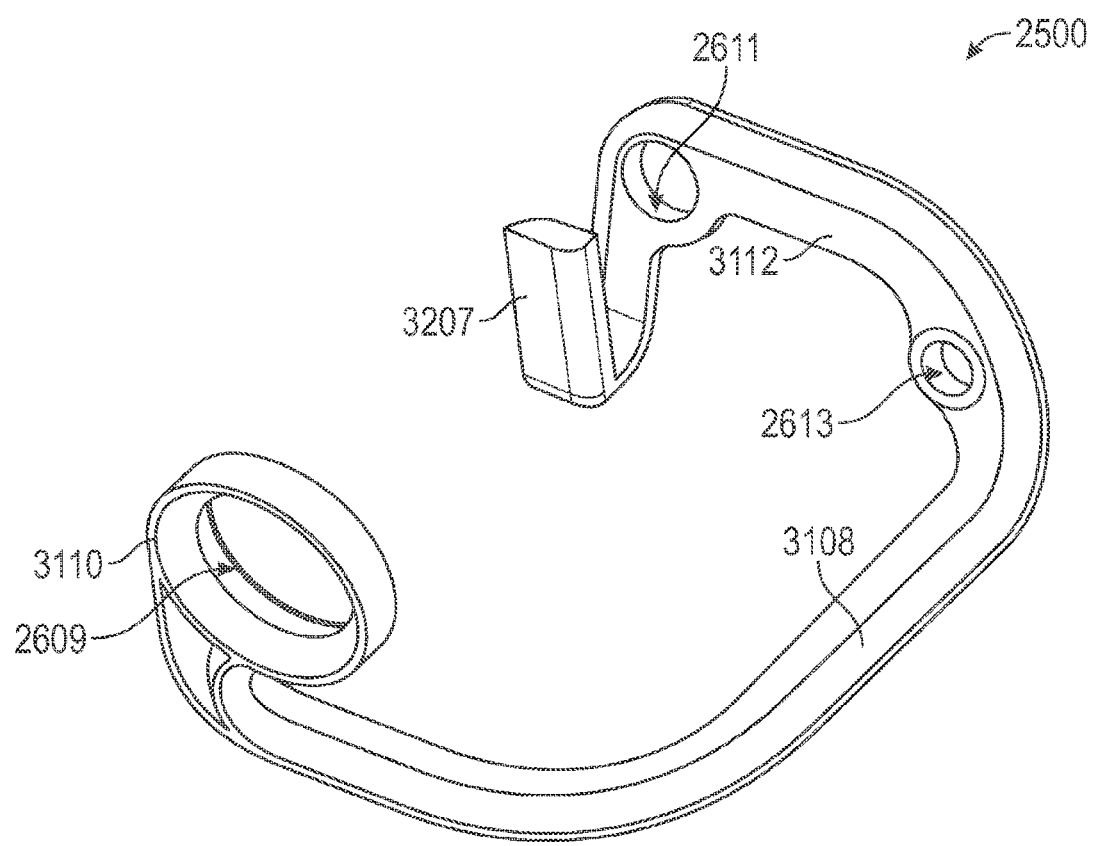
FIG. 32 illustrates a perspective view of a patient-independent frame for a patient-specific cartridge, according to aspects of the disclosure.

FIG. 32 illustrates a perspective view of the patient-independent frame 2500 of FIG. 31, with the patient-specific model removed. As shown in FIG. 32, proximal portion 3112 may include two additional openings 2611 and 2613. As shown in FIG. 32, a curved support structure 3207 may also extend from proximal portion 3112 for supporting and/or orienting patient-specific model 2502 on the frame.

Figure 33:
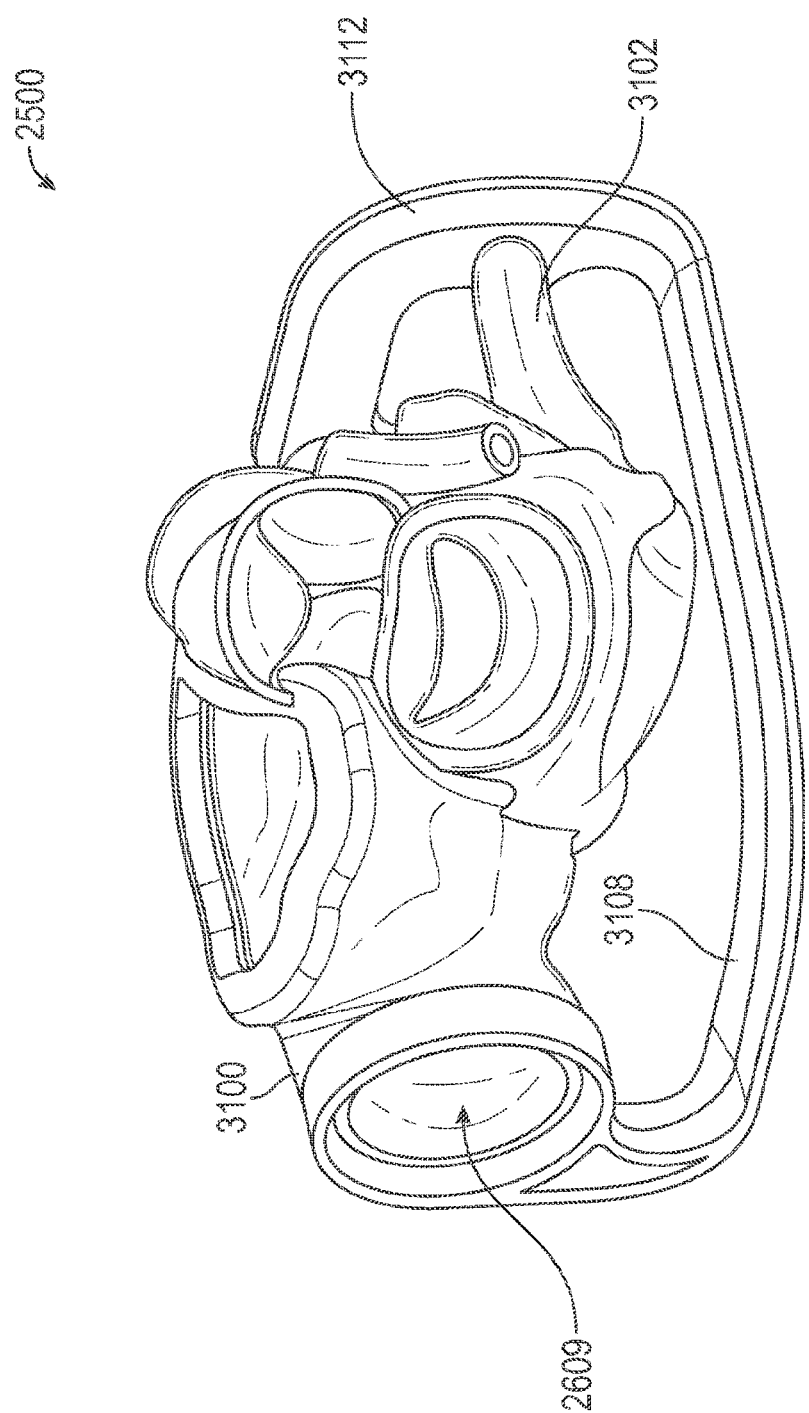
FIG. 33 illustrates a perspective view of a patient-specific cartridge having a patient-specific model coupled to a patient-independent frame, according to aspects of the disclosure.

FIG. 33 illustrates a perspective view of a patient-specific cartridge 308 having a patient-specific model 2502 coupled to a patient-independent frame 2500 in an orientation in which an upper pulmonary vein interface portion 3102 of patient-specific model 2502 extends between the patient-specific portion of patient-specific model 2502 and opening 2613 in frame 2500. Because interfacing portions 3100, 3102, and 3103 are allowed to deviate from the patient-specific shape of the patient-specific portion, each patient-specific model 2502 is arranged to include features that anatomically, mechanically, and/or acoustically correspond to a particular patient, while coupling to the same patient-independent frame 2500, which reduces cost, and increases ease of use of the simulator device 202.

Figure 34:
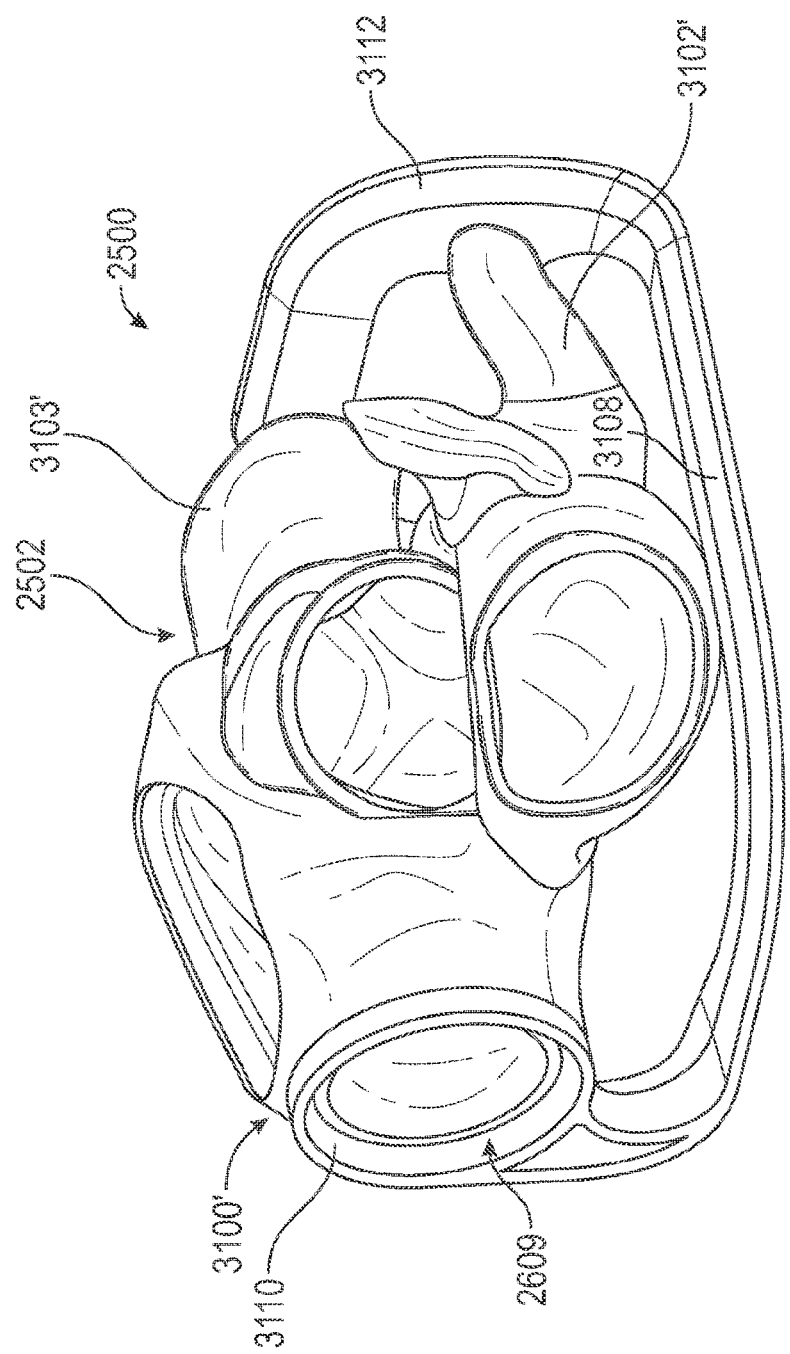
FIG. 34 illustrates another perspective view of a patient-specific cartridge having another patient-specific model coupled to a patient-independent frame, according to aspects of the disclosure.

For example, FIG. 34 illustrates a patient-specific cartridge 308 having another patient-specific model 2502 coupled to the patient-independent frame 2500. As shown in FIG. 34, the patient-specific portion of patient-specific model 2502 is different from that of FIG. 33, resulting in interfacing portions 3100', 3102', and 3103' having different shapes from portions 3100, 3102, and 3103 of FIG. 33 that allow interfacing to the same standard openings 2609, 2611, and 2613 of the same standard model 2500.

Figure 35:
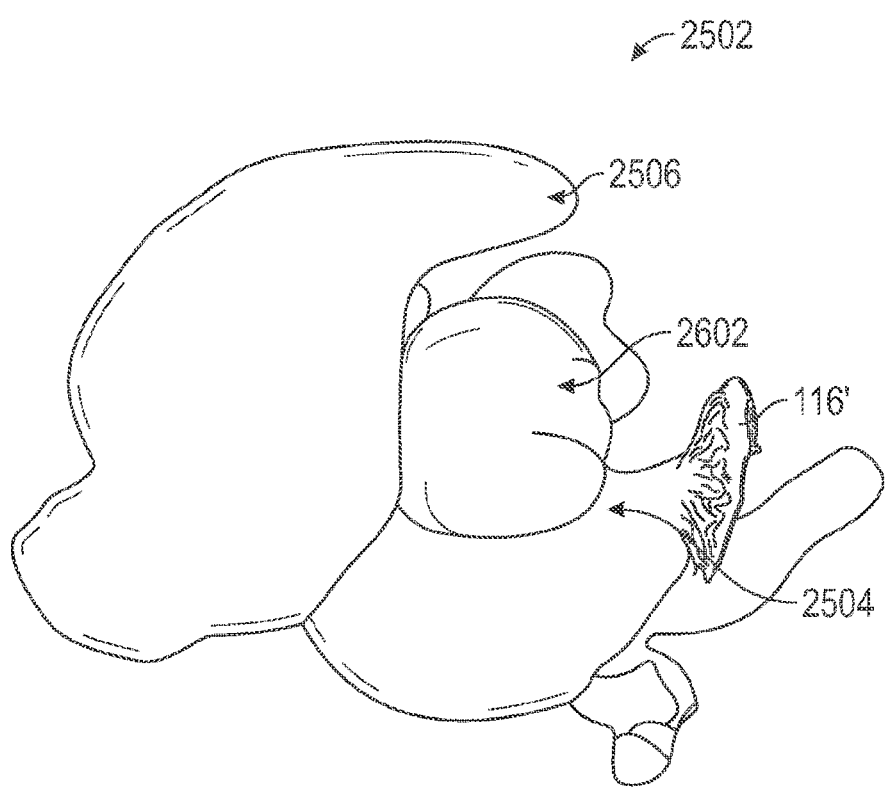
FIG. 35 illustrates a patient-specific model, according to aspects of the disclosure.
Figure 36:
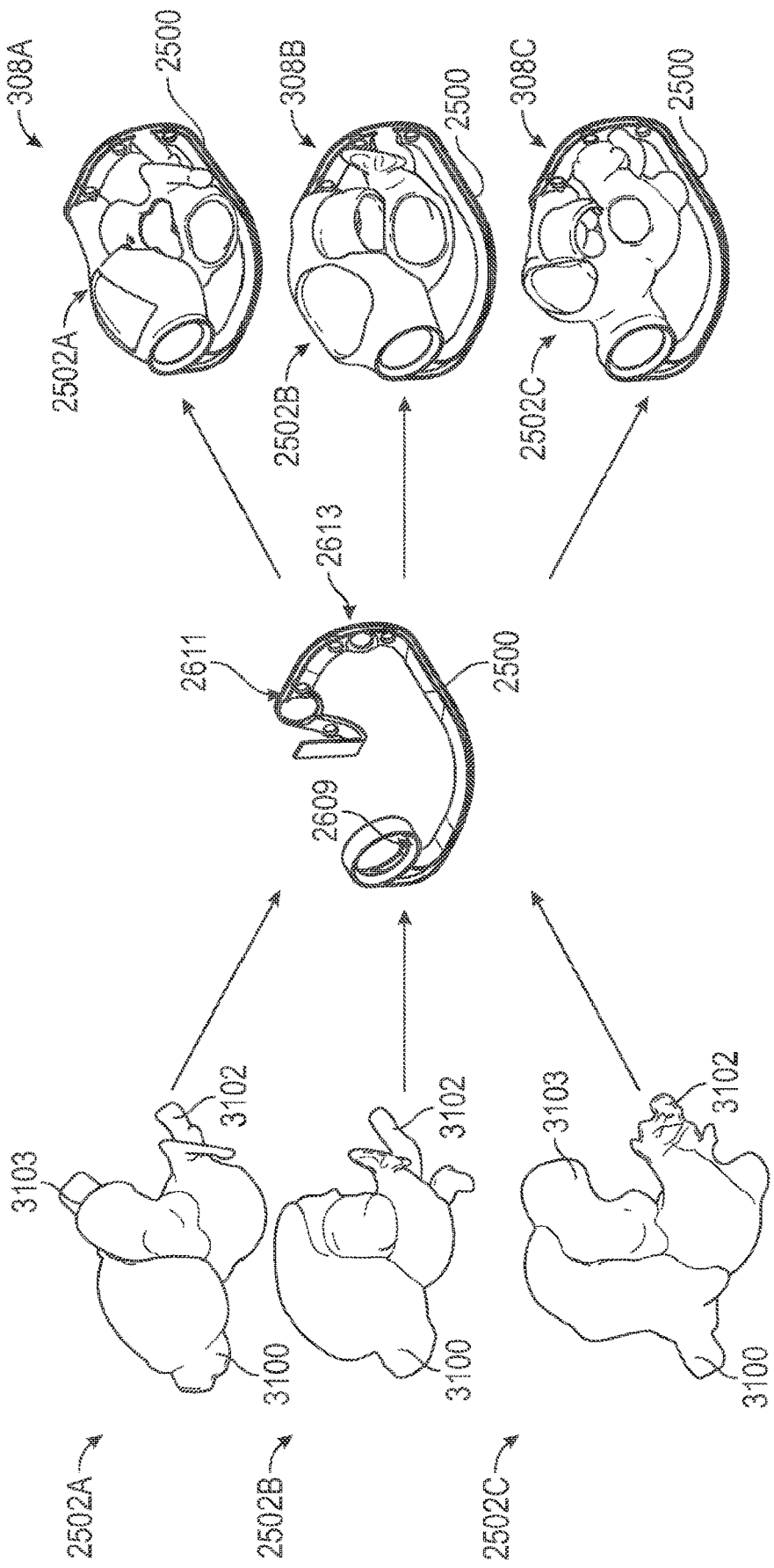
FIG. 36 illustrates another perspective view of a patient-independent frame of a patient-specific cartridge coupled to various different patient-specific models, according to aspects of the disclosure.

FIG. 35 illustrates a patient-specific model 2502, emphasizing the patient-specific portion(s) of the model, which may include the simulated right atrium 2506, aorta 2602, left atrium 2504, and left atrial appendage 116'. FIG. 36 illustrates three different patient-specific models 2502A, 2502B, and 2502C, each having different patient-specific features (e.g., patient-specific right atria 2506, aortas 2602, left atria 2504, and left atrial appendages 116') that match the anatomical, mechanical, and acoustic characteristics of the corresponding features of a particular patient, and each having different interfacing portions 3100, 3102, and 3103 that allow the different patient-specific features to interface with the same standard frame 2500. As shown, the three different patient-specific models 2502A, 2502B, and 2502C can be coupled to a patient-independent frame 2500 to form three different patient-specific cartridges 308A, 308B, and 308C.

Figure 37:
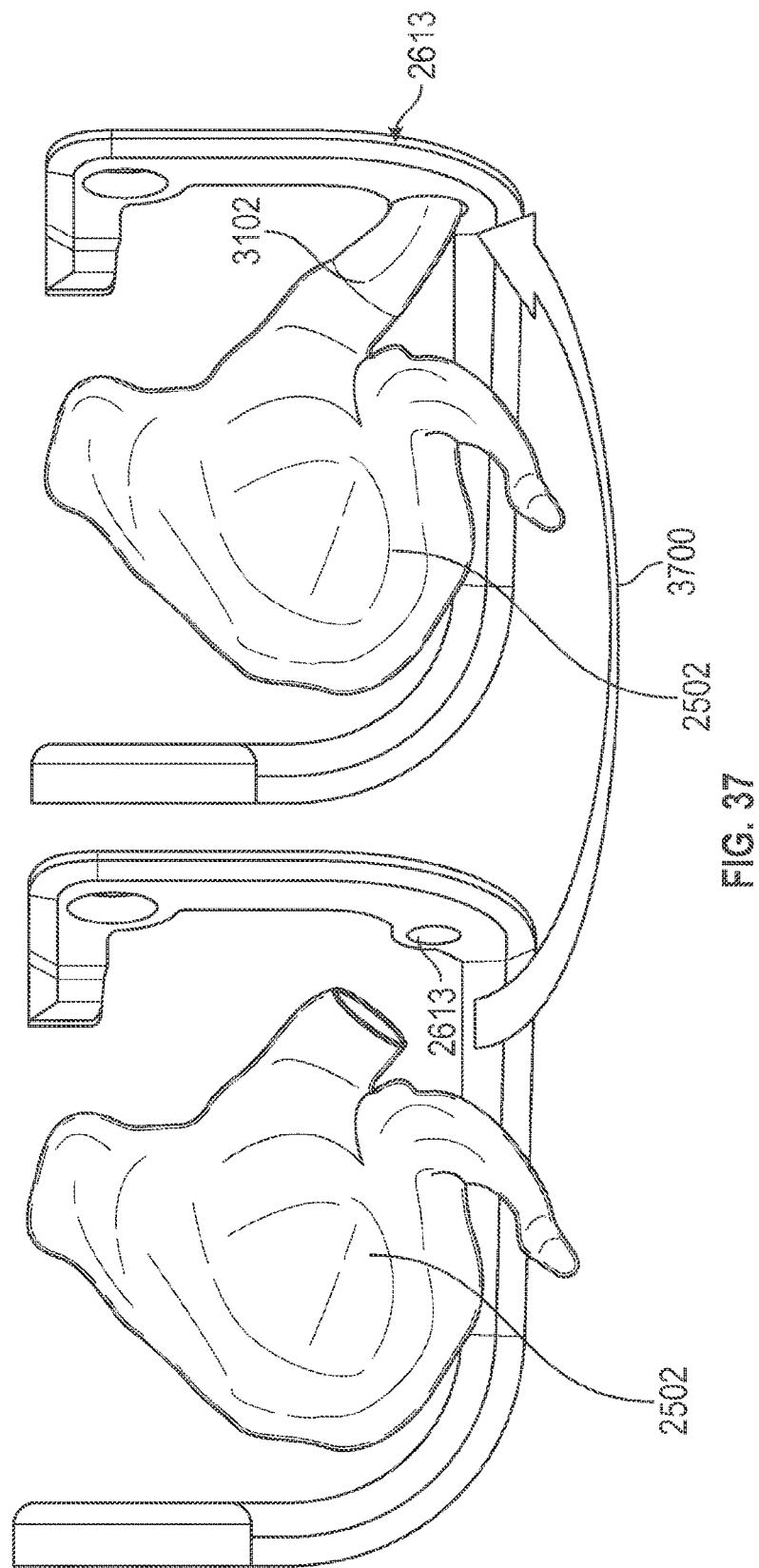
FIG. 37 illustrates a coupling portion of a patient-specific model for coupling to a patient-independent frame, according to aspects of the disclosure.

For example, FIG. 37 shows how a patient-specific model 2502 can have an integrally formed upper pulmonary vein interfacing (coupling) portion 3102 that deviates from the patient's anatomical form and extends between the patient-specific portion and opening 2613. Arrow 3700 indicates that the interfacing portion 3102 is a supplemental piece of the patient-specific model 2502, though the patient-specific portion and the interfacing portion 3102 can be formed in a common manufacturing process (e.g., an additive manufacturing process).

As illustrated in, for example, FIGS. 31-37, a patient-specific cartridge 308 for a surgical simulator device 202 may include a patient-independent frame 2500 (sometimes referred to herein as a standard frame) having first, second, and third openings 2609, 2611, and 2613, and a patient-specific cardiac model 2502. The patient-specific cardiac model 2502 may include a right atrium 2506, a left atrium 2504 and a septum 112' having mechanical and anatomical shape properties that correspond to the mechanical and anatomical shape properties of the left atrium 102 and the septum 112 of a patient, a superior vena cava interfacing portion 3100 that deviates from the anatomical shape of the superior vena cava of the patient and extends between the right atrium 2506 and the first opening 2609 in the patient-independent frame 2500: an inferior vena cava interfacing portion 3103 that deviates from the anatomical shape of the inferior vena cava of the patient and extends between the right atrium 2506 and the second opening 2611 in the patient-independent frame 2500, and an upper pulmonary vein interfacing portion 3102 that deviates from the anatomical shape of the pulmonary vein of the patient and extends between the left atrium 2504 and the third opening 2613 in the patient-independent frame 2500. The patient-specific cardiac model 2502 may also include a left atrial appendage 116' having mechanical and anatomical shape properties that correspond to the mechanical and anatomical shape properties of the left atrial appendage 116 of the patient.

Figure 38A:
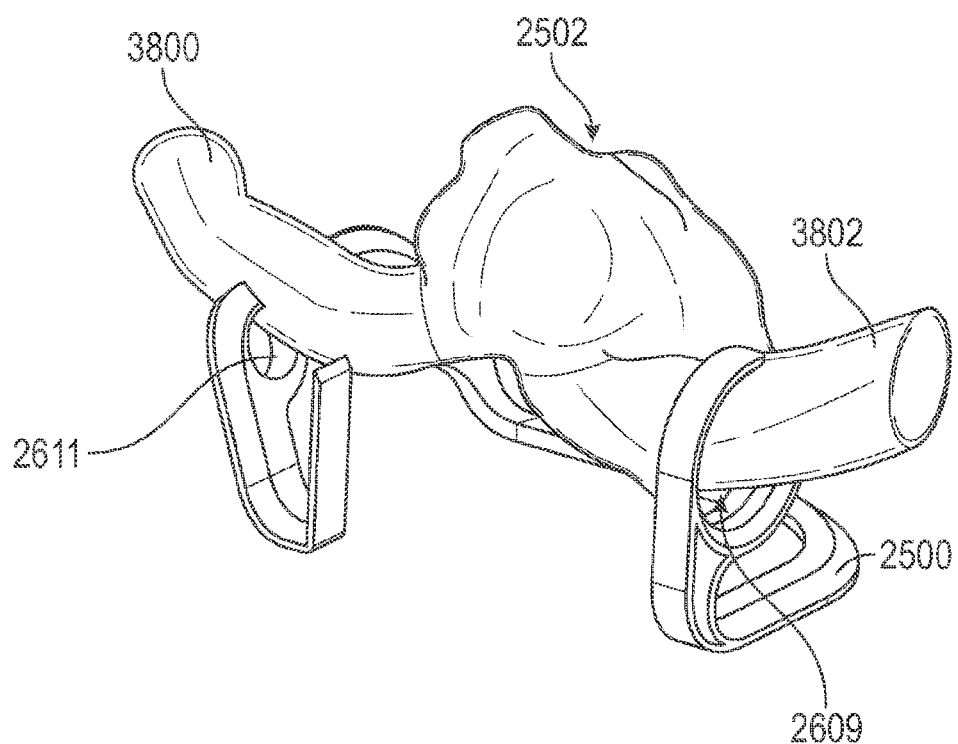
FIGS. 38A and 38B respectively illustrate misaligned patient portions and corresponding coupling portions of a patient-specific model for coupling to a patient-independent frame, according to aspects of the disclosure.
Figure 38B:
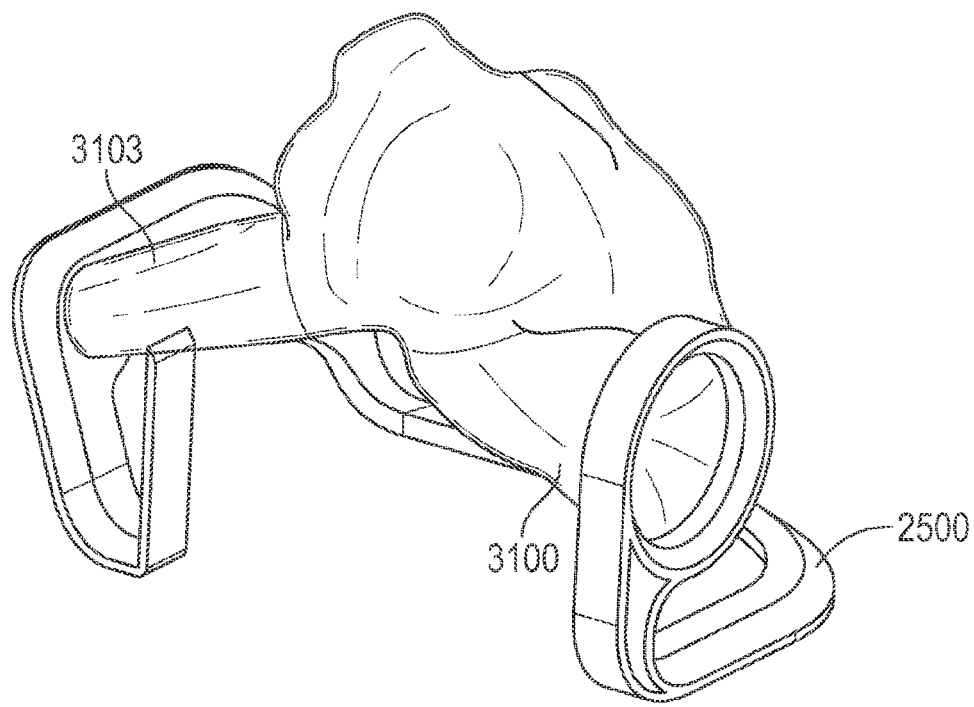
Figure 39:
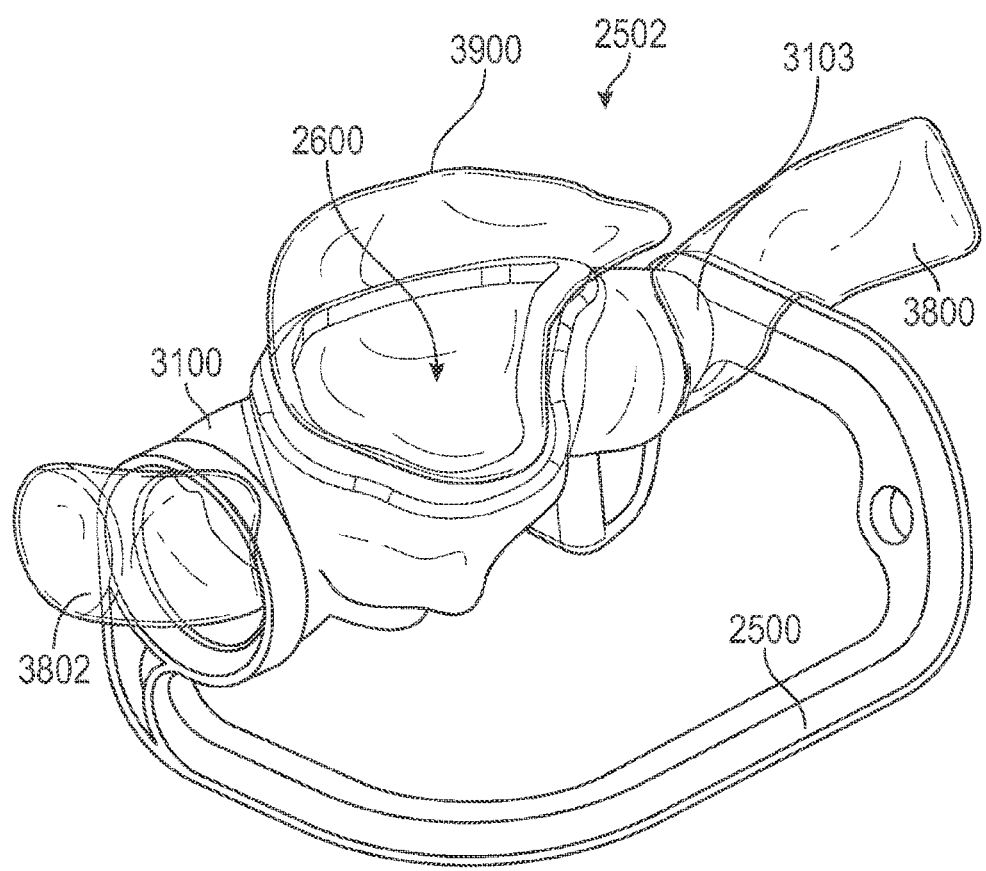
FIG. 39 illustrates another example of misaligned patient portions and corresponding coupling portions of a patient-specific model for coupling to a patient-independent frame, according to aspects of the disclosure.

FIGS. 38A and 38B respectively illustrate misaligned patient-specific superior vena cava and inferior vena cava interfacing portions 3802 and 3800 that do not align with standard frame 2500, and corresponding interfacing portions 3100 and 3102 of a patient-specific model that deviate from the patient-specific forms of 3802 and 3800 to couple to openings 2609 and 2611 of a patient-independent frame 2500. FIG. 39 illustrates another view of the misaligned patient-specific superior vena cava and inferior vena cava interfacing portions 3802 and 3800 (which would not be manufactured), the corresponding interfacing portions 3100 and 3102 coupled to openings 2609 and 2611, and an additional portion 3900 of the model that can be removed after manufacturing or omitted from manufacturing, to form an opening 2600 into the right atrium of the model.

Figure 40:
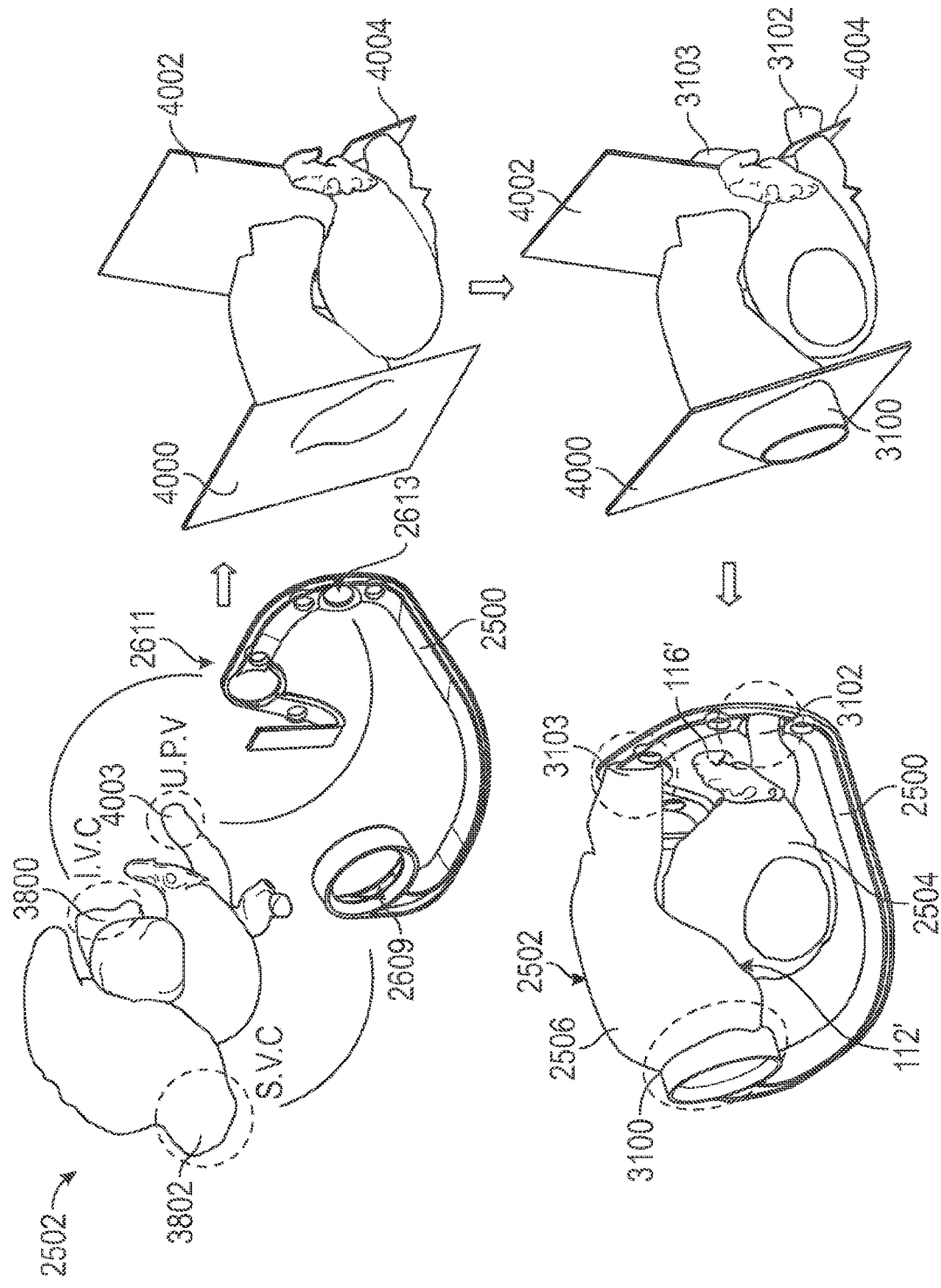
FIG. 40 illustrates various aspects of a process for manufacturing a patient-specific cardiac model for coupling to a patient-independent frame, according to aspects of the disclosure.

FIG. 40 illustrates various aspects of a process for manufacturing a patient-specific cardiac model 2502 for coupling to a patient-independent (standard) frame 2500, according to aspects of the disclosure. As indicated in FIG. 40, during the design phase of the manufacturing process for a particular patient-specific model 2502, the virtual patient-specific model may include patient-specific superior vena cava portion 3802, patient-specific inferior vena cava portion 3800, and patient-specific upper pulmonary vein portion 4003, which would be misaligned with openings 2609, 2611, and 2613 of standard frame 2500. These patient-specific features can be generated based on images and/or other measurements of the size, shape, orientation, thicknesses, and/or other properties of the patient's actual cardiac structures. As shown, three interfaces between the virtual patient-specific model and three planes 4000, 4002, and 4004 may be identified. Portions 3800, 3802, and 4003 extending beyond respective planes 4000, 4002, and 4004 may be removed, and interfacing portions 3011, 3102, and 3103 can be designed to extend between the identified planar interfaces and the known locations of standard frame openings 2609, 2611, and 2613. Once these interfacing portions 3011, 3102, and 3103 are designed into the virtual model, the entire patient-specific model including these portions can be generated (e.g., in an additive manufacturing, molding, or other suitable manufacturing process).

As shown in the various examples shown in FIGS. 31, 33, 35, 36, 39, and 40, the patient-specific cartridge 308 can be provided with a frame 2500 configured to couple the patient-specific model 2502 to the tank 306. The frame 2500 can include first, second, and third openings 2609, 2611, and 2613 configured to align with first, second, and third access ports 718, 1404, and 1408 in the tank. As shown in these examples, the patient-specific model 2502 may include a patient-specific portion that corresponds to the anatomical shape of the corresponding portion of the heart of the patient, and first, second, and third interfacing portions 3100, 3103, and 3102 that deviate from the anatomical shape of the corresponding portions of the patient's heart to extend between the patient-specific portion and the first, second, and third openings 2609, 2611, and 2613. The first, second, and third interfacing portions 3100, 3103, and 3102 may correspond, respectively, to a superior vena cava interfacing portion, an inferior vena cava interfacing portion, and an upper pulmonary vein interfacing portion of the patient-specific model. The patient-specific model 2502 may include a simulated right atrium 2506 having a window 2600.

Various examples discussed herein describe the advantages of providing a patient-specific model 2502 with acoustic features that mimic the acoustic features of the corresponding patient cardiac structures (e.g., for ultrasound imaging during a simulated surgical procedure). In some circumstances, it can also be beneficial to be able to provide a physical simulator device in which features of the patient's anatomy mimic the response of various anatomical features to other imaging technologies.

Figure 41:
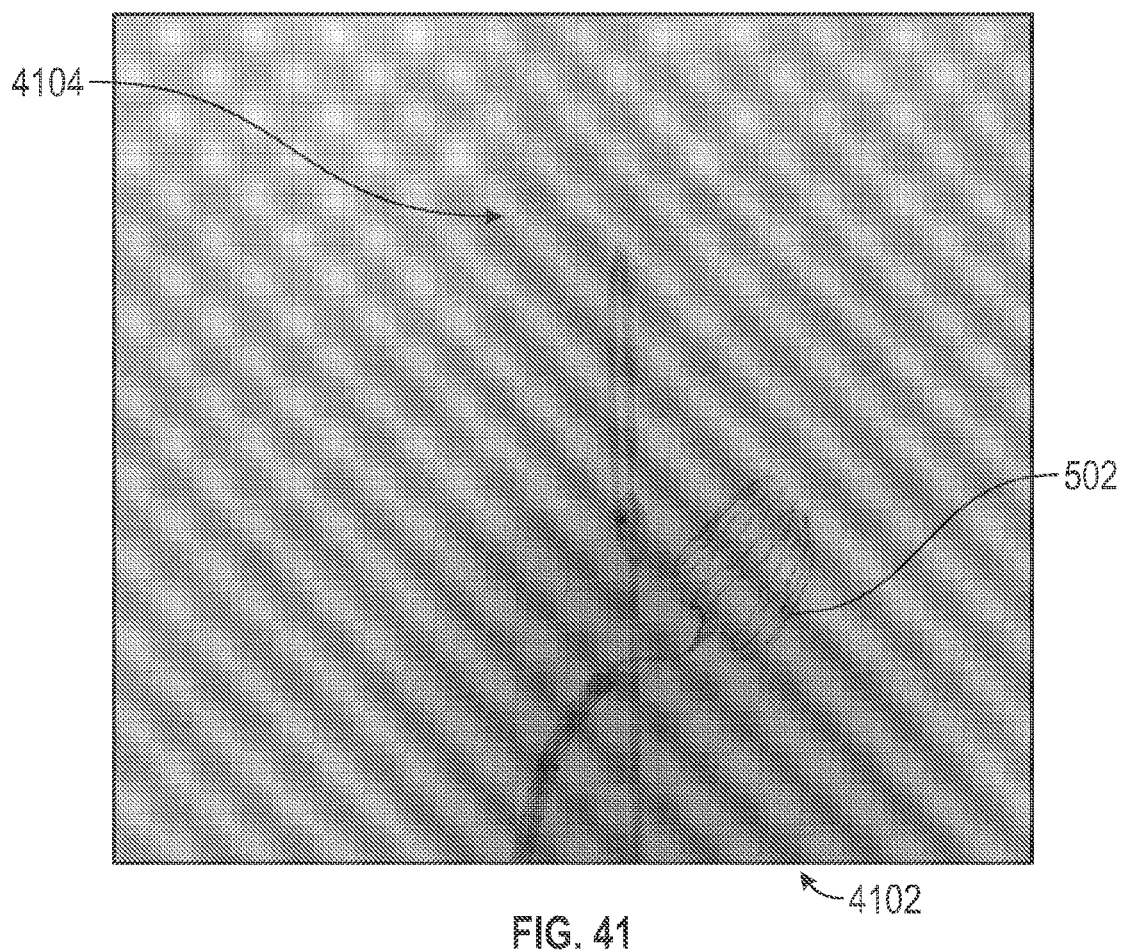
FIG. 41 illustrates a fluoroscopic image of a surgical instrument in a portion of a patient's heart, according to aspects of the disclosure.
Figure 42:
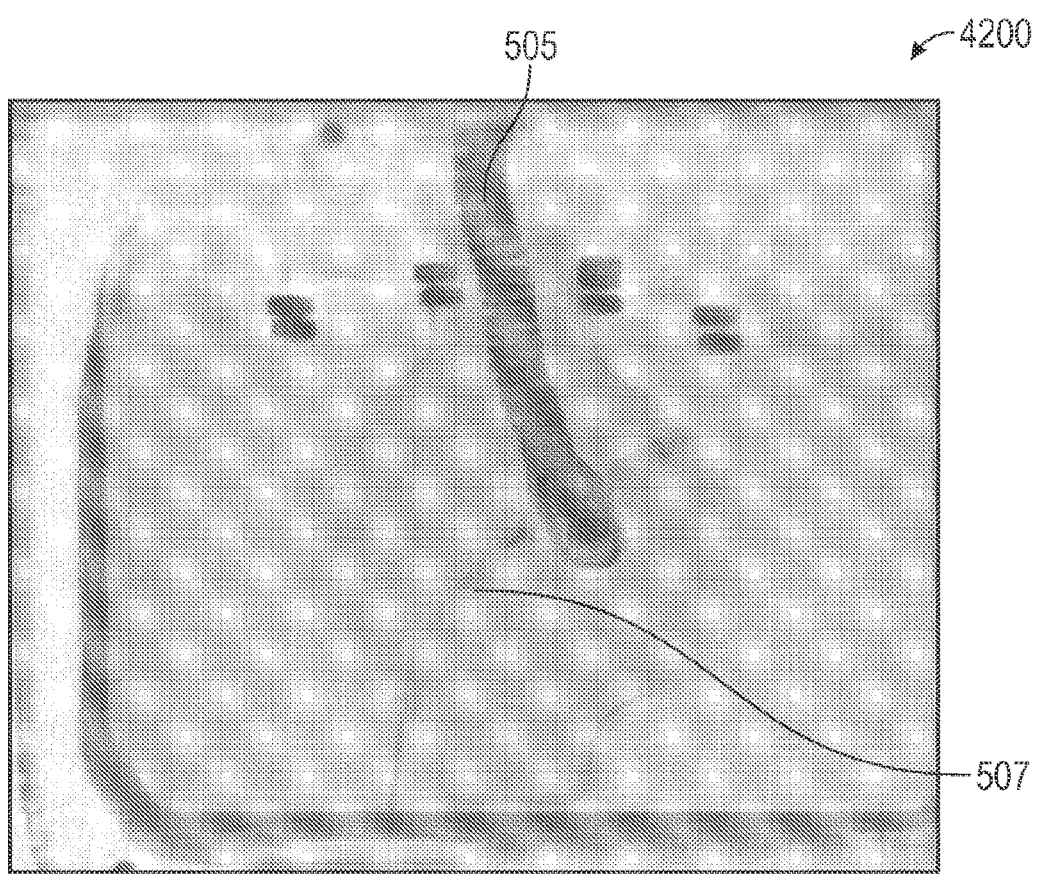
FIG. 42 illustrates a fluoroscopic image of a surgical instrument in a patient-specific model of a patient's heart, according to aspects of the disclosure.

For example, during some cardiac interventions, x-ray imaging can be performed to help a surgeon more accurately understand the location of a guidewire or other surgical device. FIG. 41 illustrates, for example, a fluoroscopic image of an LAA closure device 502 being installed within a patient's heart, in which the shadow 4102 of the patient's heart and a shadow 4104 of the patient's spine can be seen. These shadows, while faint, can be helpful to a surgeon, in addition to ultrasound imaging with ultrasound probe 505. However, as shown in FIG. 42, unless the patient-specific model 2502 and/or other portions of station 300 are provided with x-ray interactive features, while the ultrasound probe 505, and a guidewire 507 can be seen in a fluoroscopic image 4200 of device 202, image 4200 does not include the shadows 4102 and 4104. In order to include these fluoroscopic shadow features, patient-specific model 2502 and/or portions of station 300 can be provided with x-ray interactive features.

Figure 43:
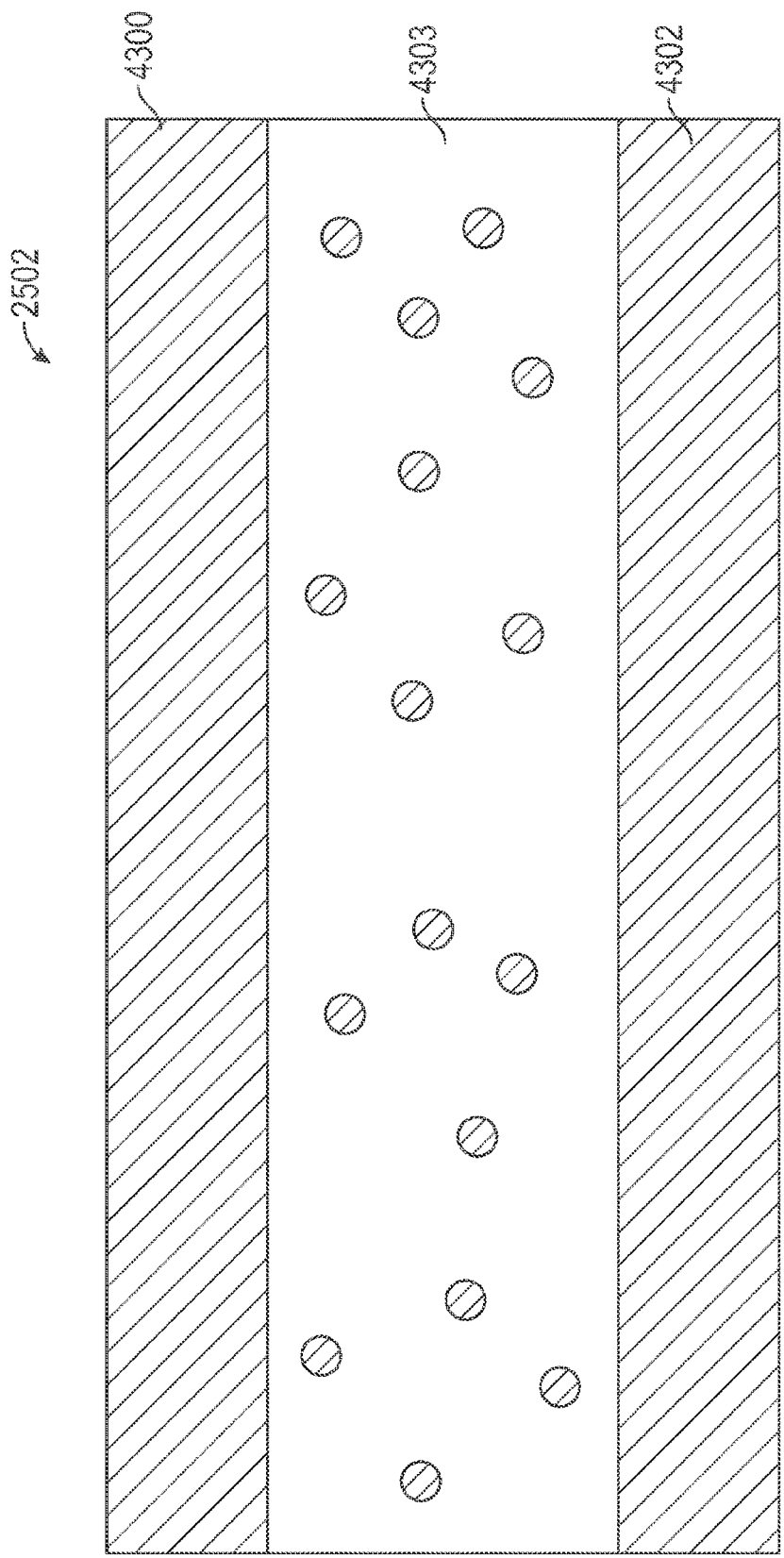
FIG. 43 illustrates a cross-sectional view of a portion of a wall of a patient-specific model of a patient's heart, according to aspects of the disclosure.

FIG. 43 illustrates a cross-sectional view of a portion of a wall of a patient-specific model 2502 of a patient's heart. As shown in FIG. 43, the walls of patient-specific model 2502 may be formed (e.g., in a three-dimensional printing process) from an inner polymer (e.g., PolyJet) layer 4302, an outer polymer (e.g., PolyJet) layer 4300, and a hydrogel layer 4303 interposed between the inner and outer layers 4302 and 4300. For example, inner layer 4302 and outer layer 4300 may be formed from Polyjet materials (e.g., Stratasys resins) that encapsulate hydrogel layer 4303. In various implementations, hydrogel layer 4303 may be used as a sacrificial support material or may be used to absorb an injected aqueous liquid such as an x-ray attenuating liquid. Layers 4300, 4302, and/or 4303 may be arranged to mechanically and/or acoustically mimic the anatomical features of patient cardiac structures.

Figure 44:
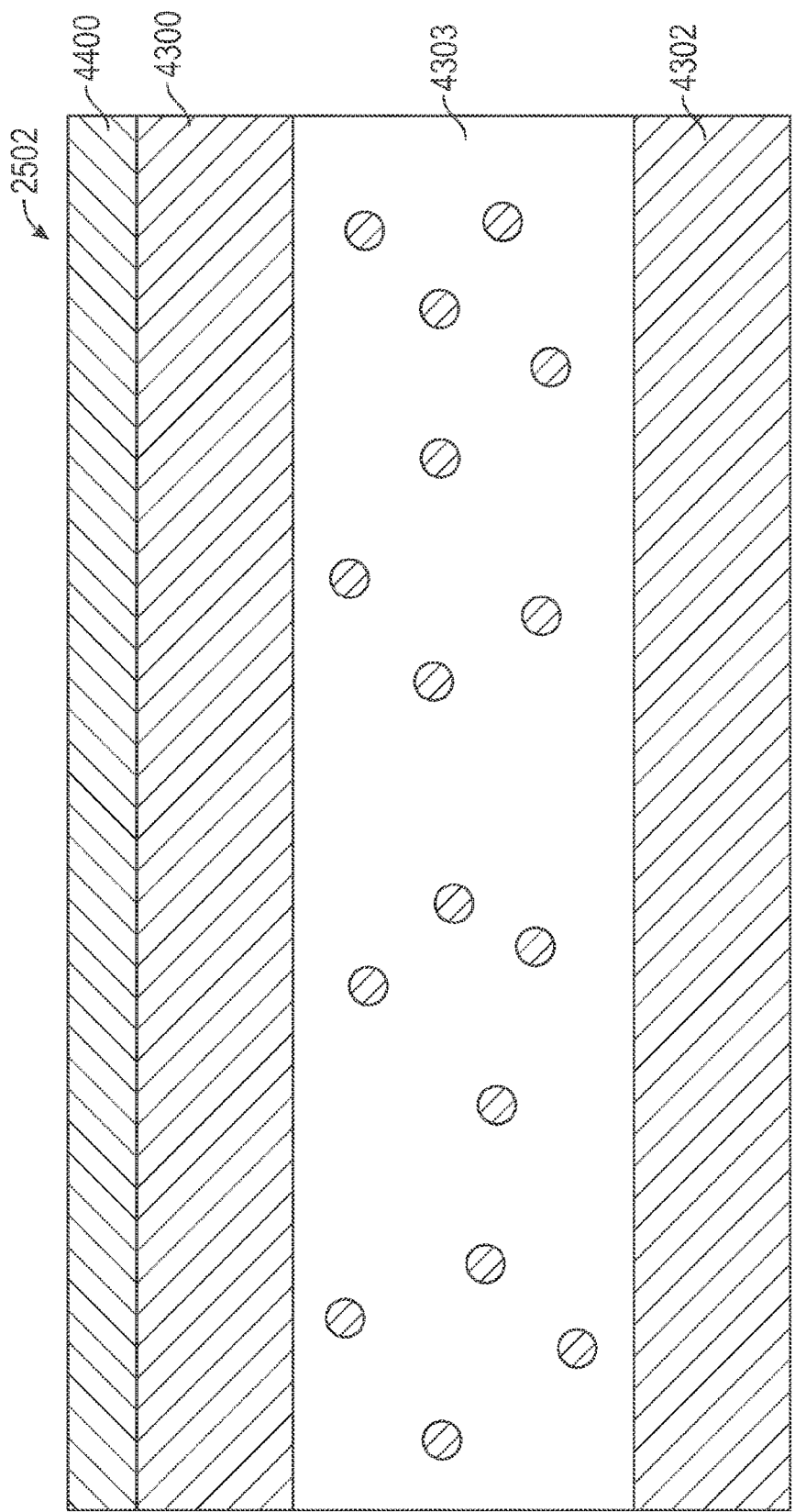
FIG. 44 illustrates a cross-sectional view of a portion of a coated wall of a patient-specific model of a patient's heart, according to aspects of the disclosure.

In order to provide a patient-specific model 2502 that generates a cardiac shadow similar to cardiac shadow 4102 of FIG. 41, the patient-specific model 2502 may be provided with x-ray interactive material. For example, as shown in FIG. 44, patient-specific model 2502 may be provided with an x-ray interactive coating 4400 (e.g., an x-ray attenuating coating such as an iodine coating, a barium coating such as a barium sulfate paint, a calcium phosphate coating, a radio opaque ink, a metal coating, a hydrophilic coating, and/or any combination thereof) on outer polymer layer 4300 (and/or on inner layer 4302).

Figure 45:
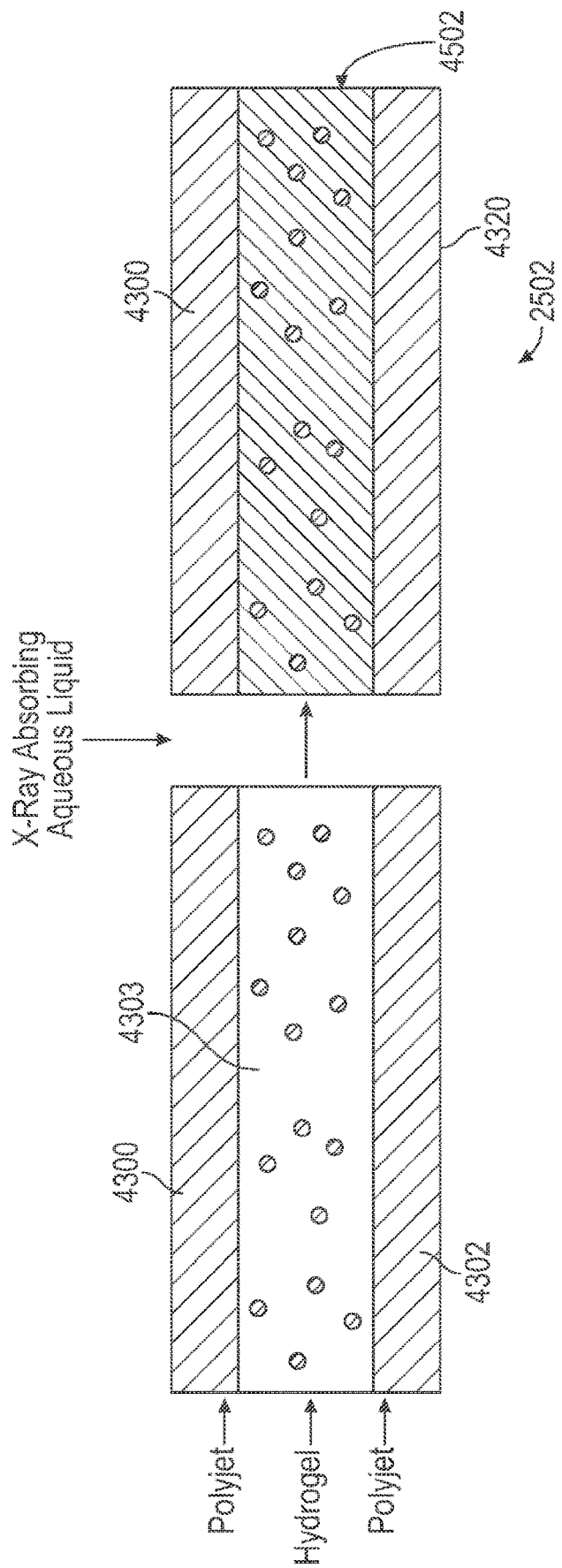
FIG. 45 illustrates a process for injecting an x-ray reactive material into a wall of a patient-specific model of a patient's heart, according to aspects of the disclosure.

Additionally, or alternatively, hydrogel layer 4303 may be injected with an x-ray interactive material (e.g., a contrast liquid including calcium, iodine, and/or barium such as Iohexol). FIG. 45 illustrates a process for injecting an x-ray reactive material such as an x-ray attenuating material into a wall of a patient-specific model of a patient's heart, according to aspects of the disclosure. As shown in FIG. 45, layer 4303 may be injected with an x-ray attenuating aqueous liquid to form an x-ray attenuating internal layer 4502 for patient-specific model 2502. The injected X-ray attenuating aqueous liquid may diffuse inside the hydrogel layer 4303 to obtain a homogenous X-ray absorption characteristic all over the model 2502 to reproduce the heart shadow described above in connection with FIG. 41. Coating and/or injection of x-ray attenuating materials for patient-specific model 2502 can be performed during a post-processing of the model (e.g., following an additive manufacturing process to generate the model). In the example of FIG. 45, the patient-specific model 2502 includes at least one wall portion having an outer layer 4300, an inner layer 4302, and an x-ray attenuating material 4502 interposed between the outer layer and the inner layer.

The features described above in connection with FIGS. 44 and/or 45 may provide patient-specific cartridge 308 with fluoroscopic features that cause the patient-specific model 2502 to generate a cardiac shadow similar to cardiac shadow 4102 of FIG. 41, under x-ray imaging of station 300 and cartridge 308 installed therein.

Figure 46:
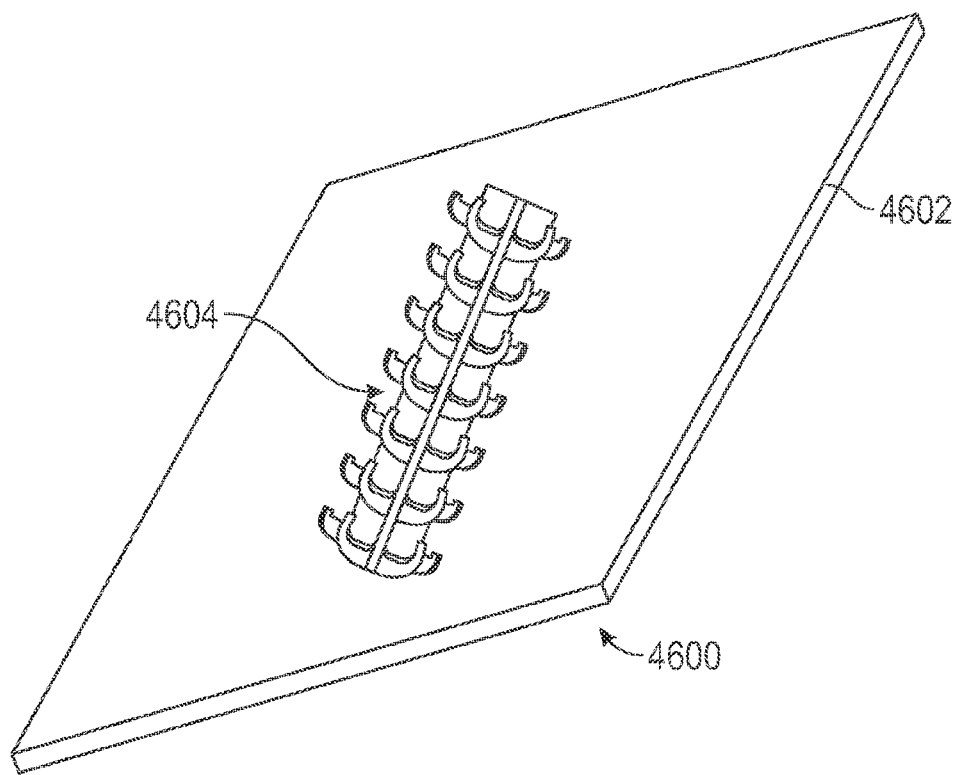
FIG. 46 illustrates a perspective view of a spinal shadow card, according to aspects of the disclosure.

FIG. 46 illustrates a perspective view of a spinal shadow card 4600 that can be provided in station 300 to generate, under x-ray imaging, a spinal shadow similar to spinal shadow 4104 of FIG. 41, according to aspects of the disclosure. The shadow of the spine is used during the procedure by the clinician to estimate where the catheter is inside the right atrium. By knowing over which vertebra the catheter is, the surgeon is able to understand whether they are in front of the septum to initiate a transseptal puncture, for example.

As shown in FIG. 46, spinal shadow card 4600 may include a substrate 4602 and a spinal simulation feature 4604 formed on the substrate. Spinal simulation feature 4604 may be printed on, embedded within, etched in, or otherwise formed on or in substrate 4602. For example, spinal simulation feature 4604 may be a radio opaque ink printed on an x-ray transparent substrate 4602. Spinal simulation feature 4604 may be patient-specific or may represent the geometrical shape of a shadow of a generic patient (e.g., to a C-ARM fluoroscopy instrument at least at 0 degrees during the catheter navigation in the right atrium).

Figure 47:
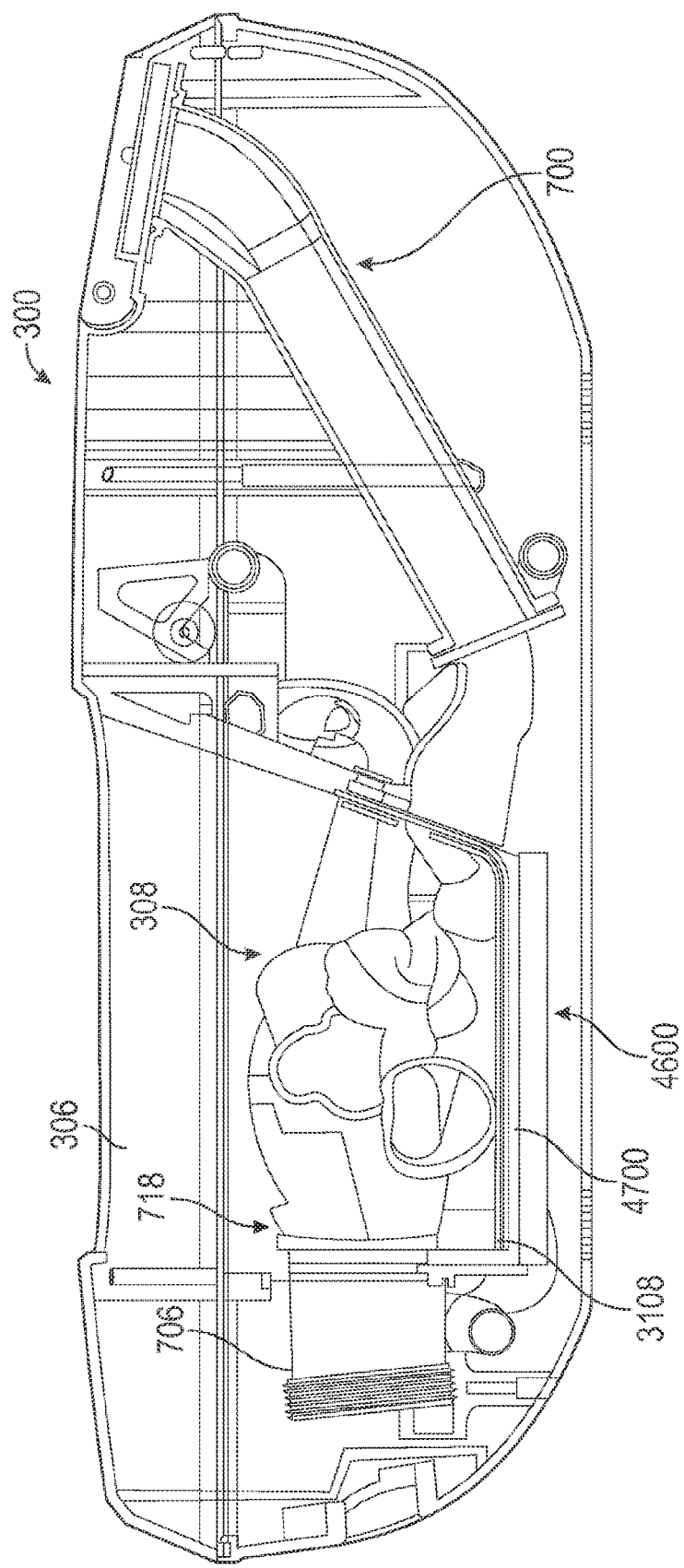
FIG. 47 illustrates a side view of a station of a physical simulator device with a spinal shadow card, according to aspects of the disclosure.

FIG. 47 illustrates a side view of a station 300 of a physical simulator device 202 showing how a spinal shadow card 4600 may be disposed within the station beneath bottom wall 4700 of tank 306. In this arrangement, a spinal simulation card is disposed outside the tank adjacent to a bottom wall of the tank, and an x-ray image of station 300 will include a simulated spinal shadow caused by spinal simulation features 4604.

As illustrated by FIG. 47, a surgical simulation device 202 may be provided that includes a station 300 having a housing 309, a tank 306 formed in the housing and configured to receive a patient-specific cartridge 308 that includes a patient-specific model 2502 of at least a portion of a heart of a patient, where the tank 306 has a bottom wall 4700 having a first surface that forms a bottom surface 1402 of the tank, and an opposing second surface, an esophageal access system 700 extending within the housing between an esophageal access port 304 on the housing and a first port 714 in the tank, a vascular access system 302 including a first end with a vascular access port 310 and a second end configured to be fluidly coupled to a second port 718 in the tank, and a spinal shadow simulation card 4600 disposed within the housing 309 adjacent the opposing second surface of the bottom wall 4700 of the tank. The patient-specific model 2502 includes mechanical and acoustic features that correspond to mechanical and acoustic features of the heart of the patient. The esophageal access system 700 is configured to allow access to the tank 306 by an ultrasound probe 505 for ultrasound imaging of the patient-specific cartridge 308.

Figure 48:
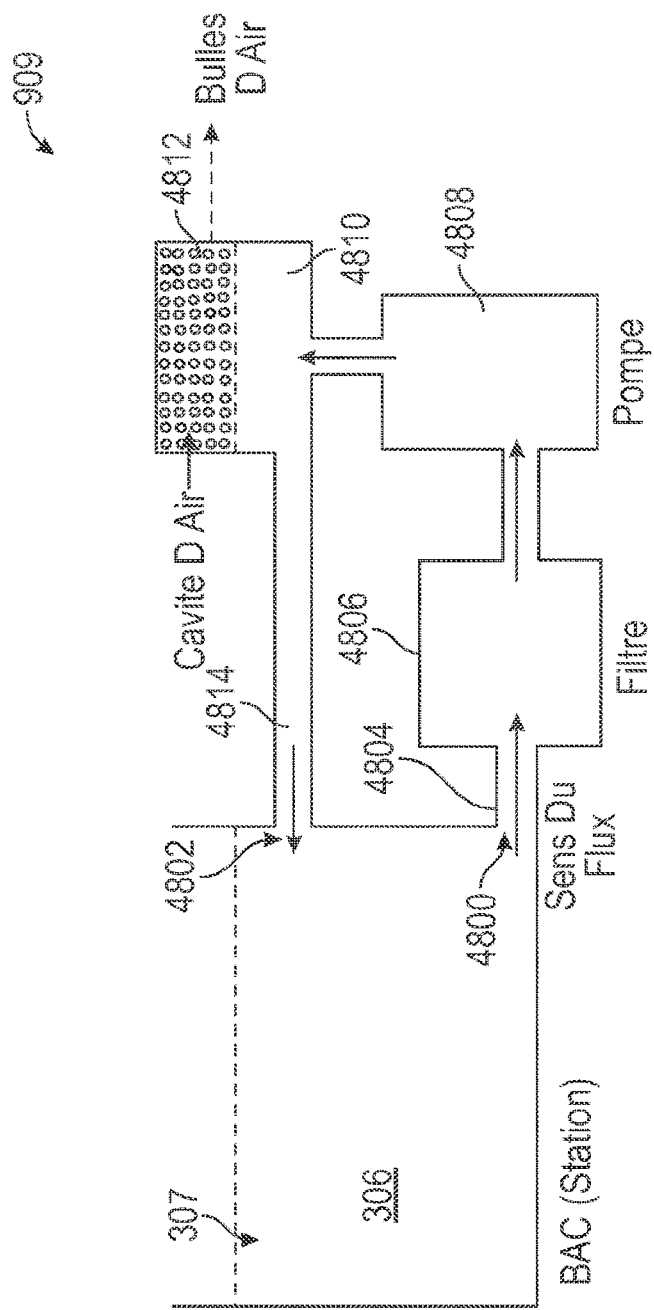
FIG. 48 illustrates a schematic view of a fluid flow system of a physical simulator device, according to aspects of the disclosure.

FIGS. 48-57 illustrate various aspects of fluid flow control system 909 of a physical simulator device 202. For example, FIG. 48 illustrates a schematic view of a fluid flow control system 909 that includes an outlet pipe 4804 and an inlet pipe 4814 fluidly coupled to tank 306 via openings 4800 and 4802 of a physical simulator device 202 (e.g., corresponding to openings 1406 and 1410 of FIG. 14, respectively). In the example of FIG. 48, outlet pipe 4804 includes a filter 4806, and a pump 4808 that controls the flow of blood simulation fluid 307 through pipes 4804 and 4814 and tank 306. In the example of FIG. 48, inlet pipe 4814 includes a chamber 4810 having an air cavity 4812 for removal of air bubbles from the blood simulation fluid 307 that could otherwise negatively impact ultrasound imaging.

Figure 49:
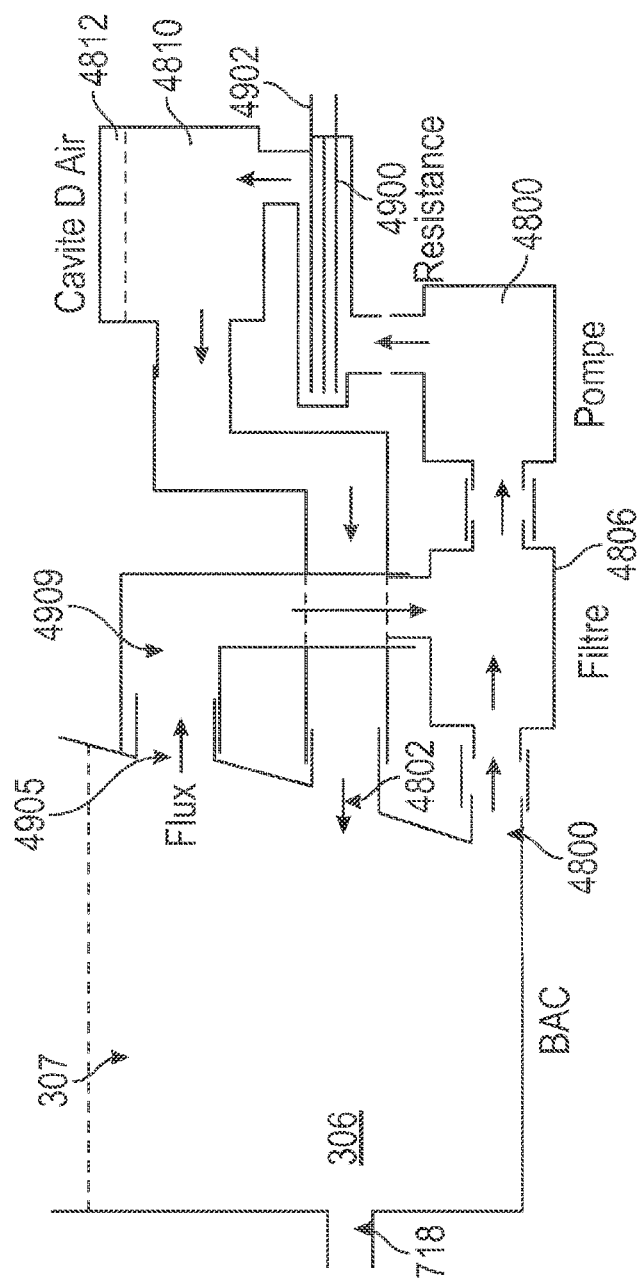
FIG. 49 illustrates a schematic view of another fluid flow system of a physical simulator device, according to aspects of the disclosure.

FIG. 49 illustrates a schematic view of another implementation of fluid flow control system 909 in which an additional outlet pipe 4909 extending between additional opening 4905 to filter 4806, and a heater 4900 coupled to a power supply 4902 are provided. Heater 4900 may be powered by power supply 4902 (e.g., a battery within station 300) to heat blood simulation fluid 307 (e.g., to approximately 37.5 degrees Celsius).

In the examples of FIGS. 48 and 49, a fluid control system 909 is provided in the station 300, and configured to circulate a blood simulation fluid 307 through the tank 306 at least a portion of the patient-specific model 2502. The fluid control system 909 includes an outlet pipe (e.g., pipe 4804 and/or 4909) coupled to a first opening (e.g., 4800 or 4905) in the tank, an inlet pipe (e.g., pipe 4814) coupled to a second opening (e.g., opening 4802) in the tank, and a pump 4808 configured to move the blood simulation fluid 307 through the inlet pipe, the tank, and the outlet pipe. The fluid control system 909 may also include a filter 4806 on the outlet pipe. The fluid control system may also include a heater 4900 disposed between the pump 4808 and the second opening. The fluid control system 909 may also include a chamber 4810 having an air cavity 4812 disposed between the pump and the second opening and/or between the heater and the second opening.

Figure 50:
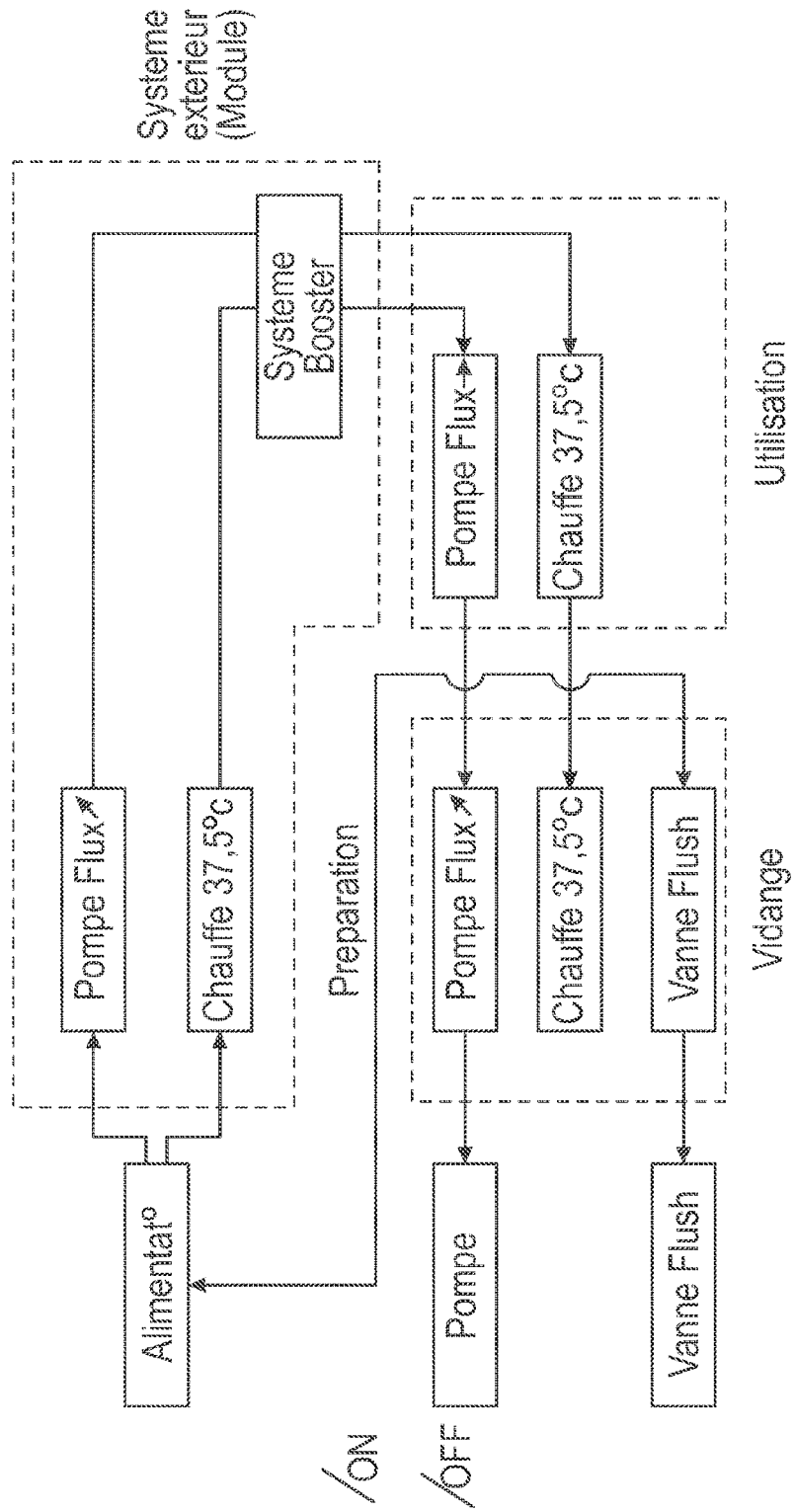
FIG. 50 illustrates a schematic view of a fluid heating system of a physical simulator device, according to aspects of the disclosure.

FIG. 50 schematically illustrates a functional procedure of the heating system for the station 300, including during a preparation operation, a use operation, and a flush operation. The preparation operation may include operation of an accessory fluid heater temporarily attached to the station 300, according to aspects of the disclosure.

Figure 51:
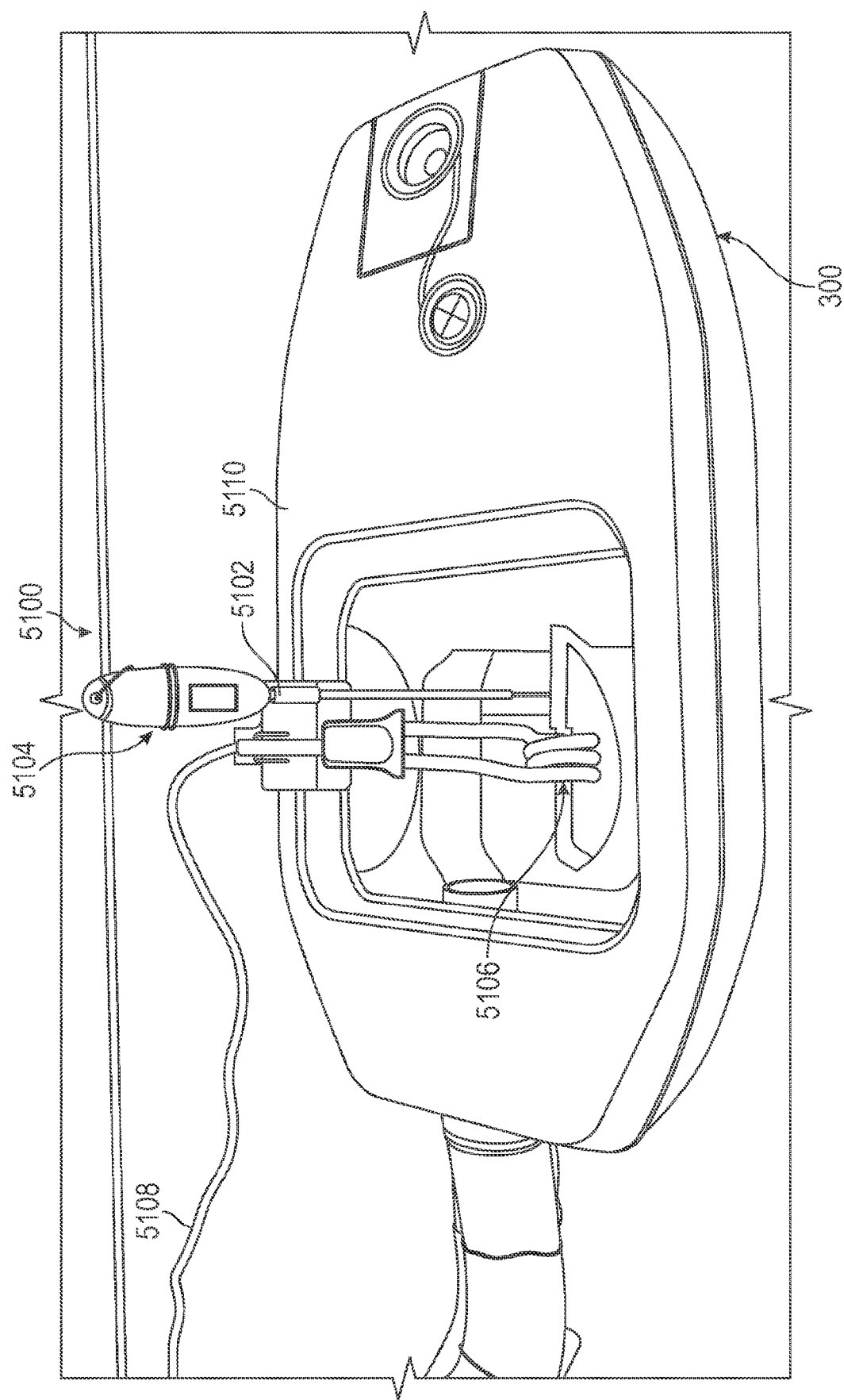
FIG. 51 illustrates a perspective view of an accessory fluid heater for a physical simulator device, according to aspects of the disclosure.

FIG. 51 illustrates a perspective view of an accessory fluid heater 5100 that can be provided for a physical simulator device 202, according to aspects of the disclosure. As shown in FIG. 51, in one implementation, an accessory heater 5100 may include a mounting structure 5102 configured to removably attach to a sidewall 5110 of station 300, and configured to hold a temperature sensor 5104, and a resistive heating element 5106 within fluid 307 in tank 306.

Figure 52:
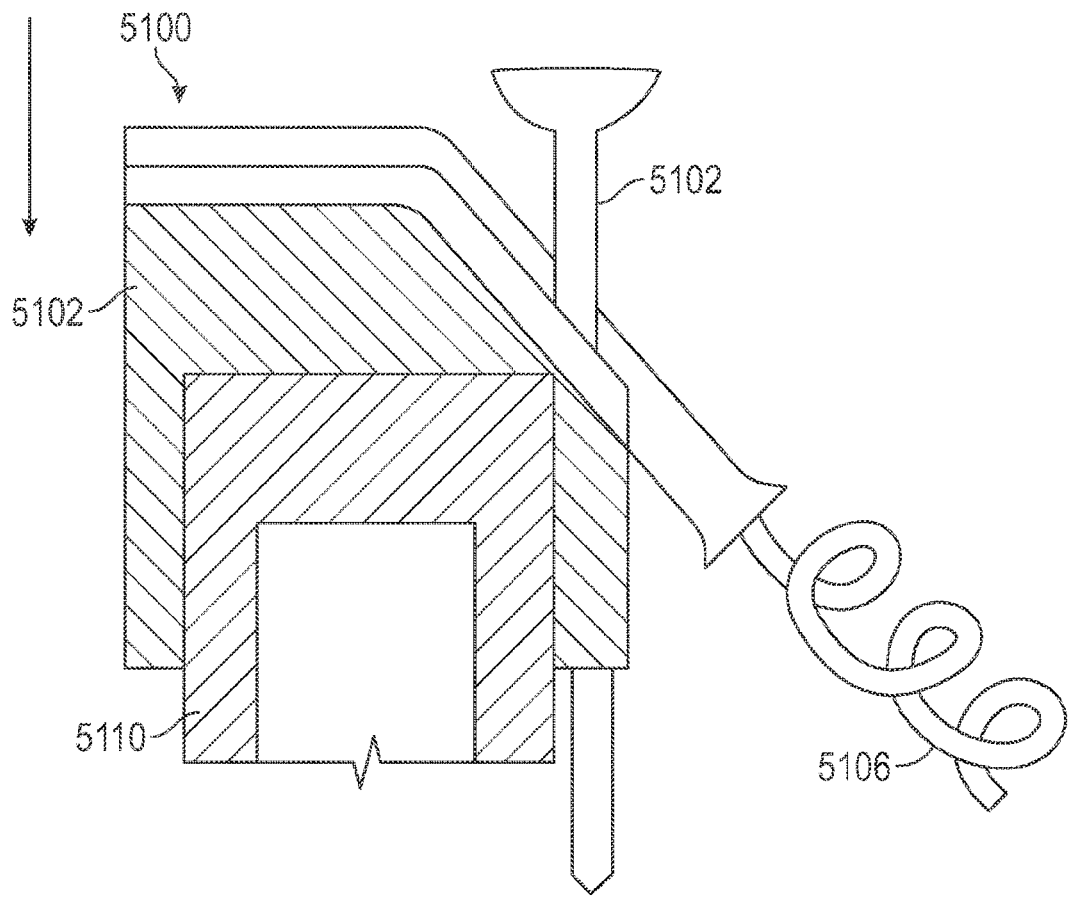
FIG. 52 illustrates a cross-sectional view of a mounting member of an accessory fluid heater for a physical simulator device, according to aspects of the disclosure.

FIG. 52 illustrates a cross-sectional view of a mounting member 5102, installed on sidewall 5110 of station 300. As shown in FIG. 52, mounting member 5102 may be arranged to wrap around and over the top of sidewall 5110 (e.g., secured by a friction fit), while holding temperature sensor 5104 and resistive heating element 5106 in a desired position. Resistive heating element 5106 may be provided in tank 305, in a feedback loop with temperature sensor 5104, to rapidly heat the blood simulation fluid 307 (e.g., to 37.5 degrees Celsius) prior to a simulated surgical procedure, the fluid thereafter being held at the desired temperature by internal heater 4900 (see FIG. 49). Resistive heating element 5106 may be powered by an external power source 5108.

FIGS. 53A, 53B, and 53C illustrate various features of another implementation of an accessory heater for physical simulator device 202.

For example, as shown in FIG. 53A, an accessory heater 5300 may be provided that includes two mounting portions 5304, configured to wrap around and over opposing sidewalls 5110 and 5112 of station 300, and a cap portion 5302 extending between the two mounting portions 5304.

FIG. 53B illustrates a cross-sectional view of a mounting portion 5304 of the accessory fluid heater 5300 of FIG. 53A. As shown in FIG. 53B, mounting portion 5304 may include a first vertical extension 5308 having a first magnet 5306 and a second vertical extension 5310 having a second magnet 5313. As shown, sidewall 5112 of tank 306 may include magnets 5309 and 5311 configured to magnetically engage with magnets 5306 and 5313 of mounting portion 5304 to temporarily secure accessory heater 5300 to tank 306. Sidewall 5110 may include magnets similar to magnets 5309 and 5311, for magnetically engaging with magnets in the other mounting portion 5304 of accessory heater 5300. As shown in FIG. 53C, a resistive heating element 5390 may extend from cap portion 5302 into blood simulation fluid 307 (when mounting portions 5304 are mounted to sidewalls 5110 and 5112) to rapidly heat fluid 307 (e.g., to 37.5 degrees Celsius) prior to a simulated surgical procedure.

Figure 54:
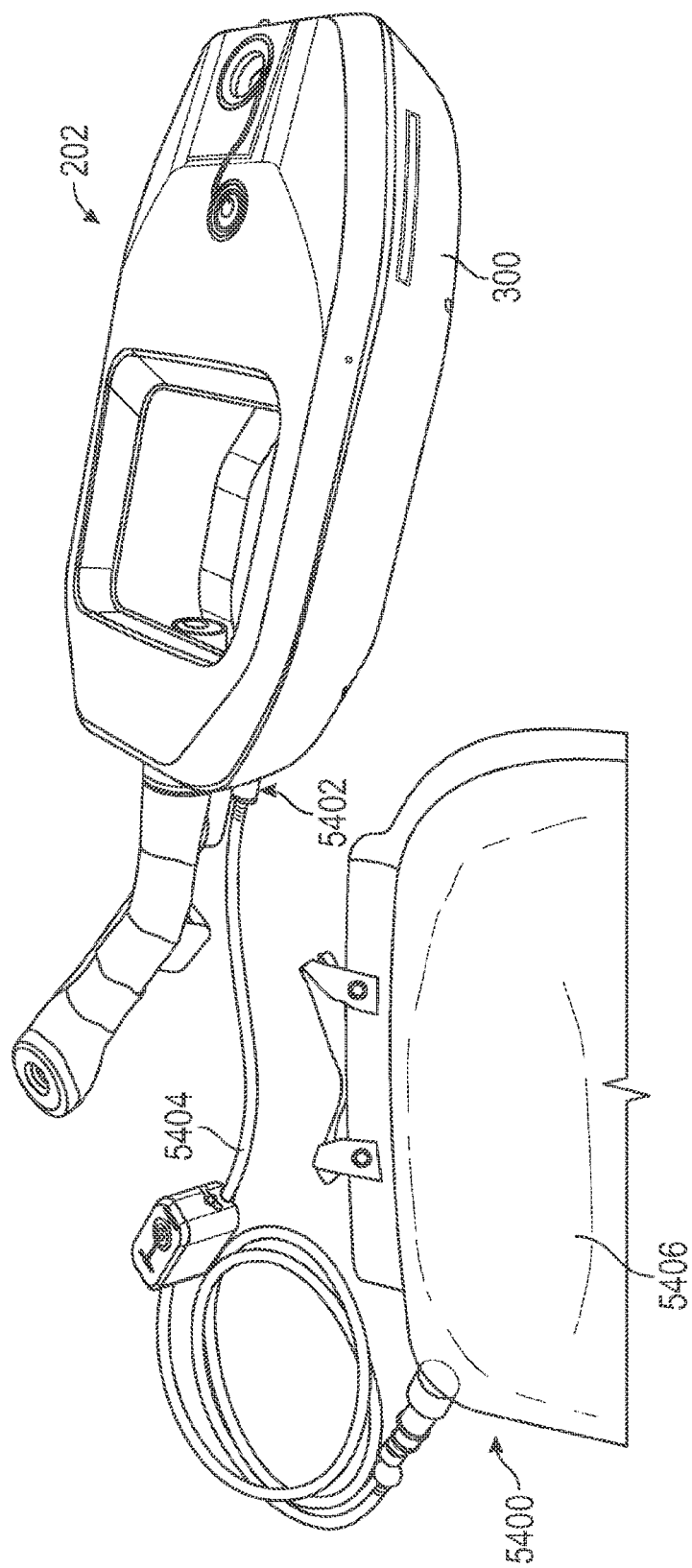
FIG. 54 illustrates a perspective view of a flush system for a physical simulator device, according to aspects of the disclosure.

As shown in FIG. 54, physical simulator device 202 may include a flush system 5400 configured to couple to station 300 for flushing blood simulation fluid 307 from station 300. As shown in FIG. 54, flush system 5400 may include external flush tubing 5404 that extends between a flush valve 5402 and a flush receptacle 5406. In some implementation flush system 5400 may include an external flush pump (e.g., as shown on flush tubing 5404 if FIG. 54). Additionally or alternatively, station 300 may include a pump that can be used for flushing fluid to fluid tubing 5404.

Figure 55:
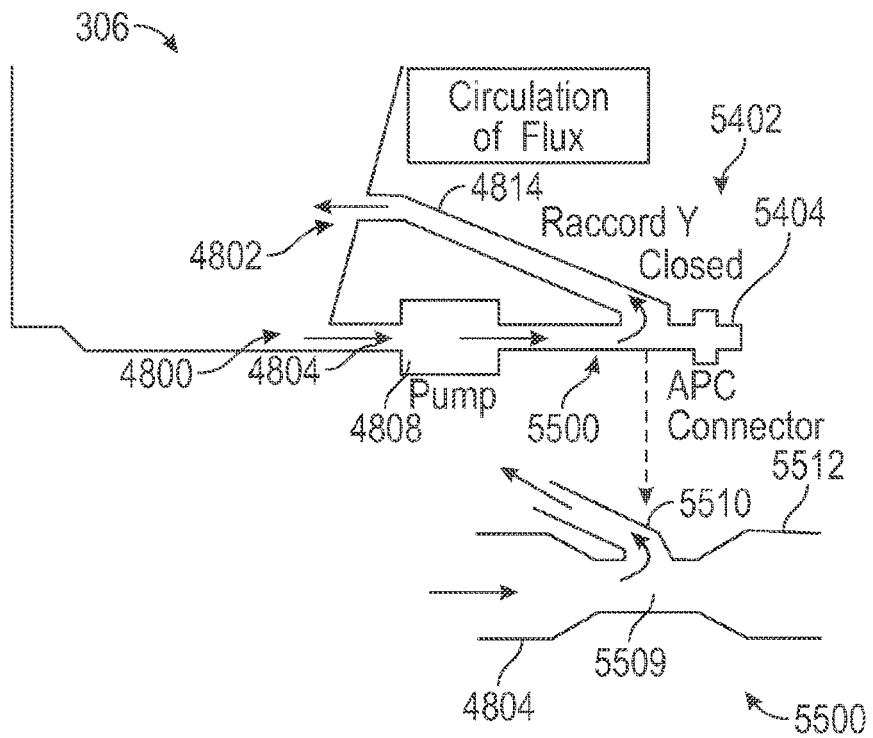
FIGS. 55 and 56 illustrate schematic views of respective open and closed arrangements of a portion of a fluid flow system of a physical simulator device for coupling to the flush system of FIG. 54, according to aspects of the disclosure.
Figure 56:
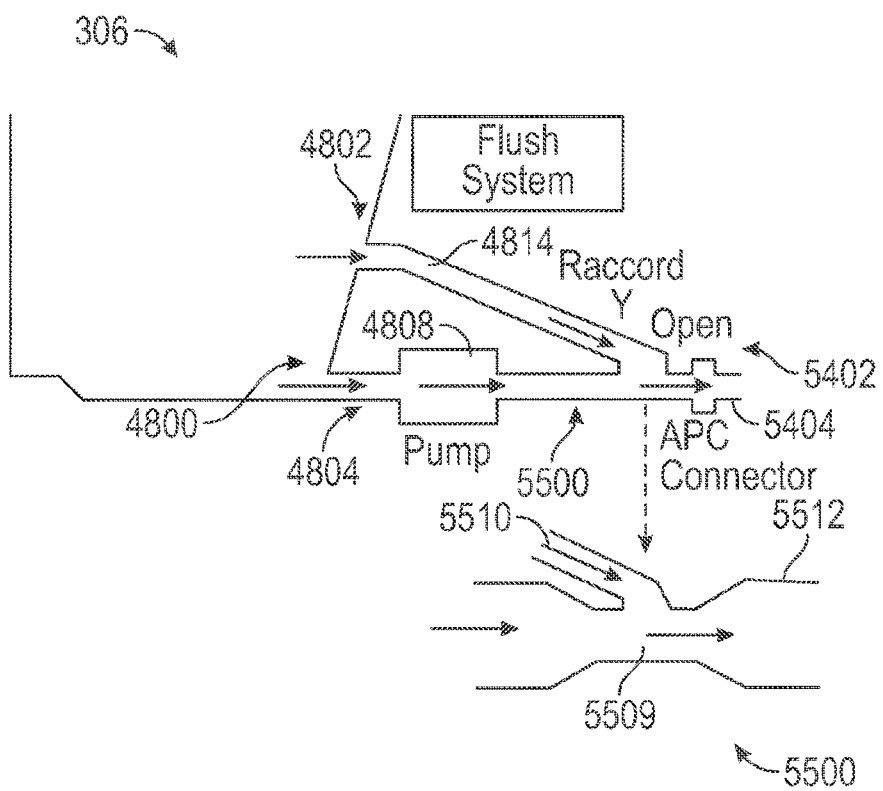

FIG. 55 shows how, internally to station 300, fluid flow system 909 may include a Y-pipe 5500 at an intersection between outlet pipe 4804 and inlet pipe 4814 before flush valve 5402. FIG. 55 includes arrows that illustrate the fluid flow within outlet pipe 4804 and inlet pipe 4814 (noting that other features of fluid control system 909 such as heater 4900, pump 4808, and chamber 4810 are not shown in FIG. 55 for clarity of the present description) when flush valve 5402 is closed. In contrast, FIG. 56 includes arrows that illustrate the fluid flow within outlet pipe 4804, inlet pipe 4814, and flush tubing 5404 when flush valve 5402 is open. FIGS. 55 and 56 each also include an enlarged view of Y-pipe 5500 showing how the Y-pipe may include a restricted portion 5509 between outlet pipe 4804 and flush portion 5512, at the location of the intersection with a return section 5510 to inlet pipe 4814, to create a venturi effect to help facilitate flushing of the system. FIG. 57 illustrates a cross-sectional perspective view showing further details of the constriction of Y-pipe 5500. The venturi effect generated by the constriction of the Y-pipe 5500 allows pump 4808 in the station 300 to be used to circulate fluid within the station, and to generate an aspiration to flush the station. The constriction 5509 may narrow the diameter of pipe 4804 from, for example, approximately 10 mm to approximately 8 mm, 6 mm, or 4 mm (as examples). In the examples of FIGS. 54-57, the fluid control system 909 includes a Y-pipe 5500 disposed between the flush valve 5402 and both the inlet pipe 4814 and the outlet pipe 4804 for tank 306.

FIG. 58 illustrates a schematic side view of a patient-specific cartridge during installation in a tank of a station of a physical simulator device. In the example of FIG. 58, distal support 3110 of patient-independent frame 2500 may first be placed into position against access port 718 in sidewall 1491 of tank 306, while base portion 3108 of frame 2500 is rotated toward bottom wall 4700 of tank 306, until base portion 3108 contacts bottom wall 4700 and portion 3112 is in contact with sidewall 1489, as shown in FIG. 59.

Figure 61:
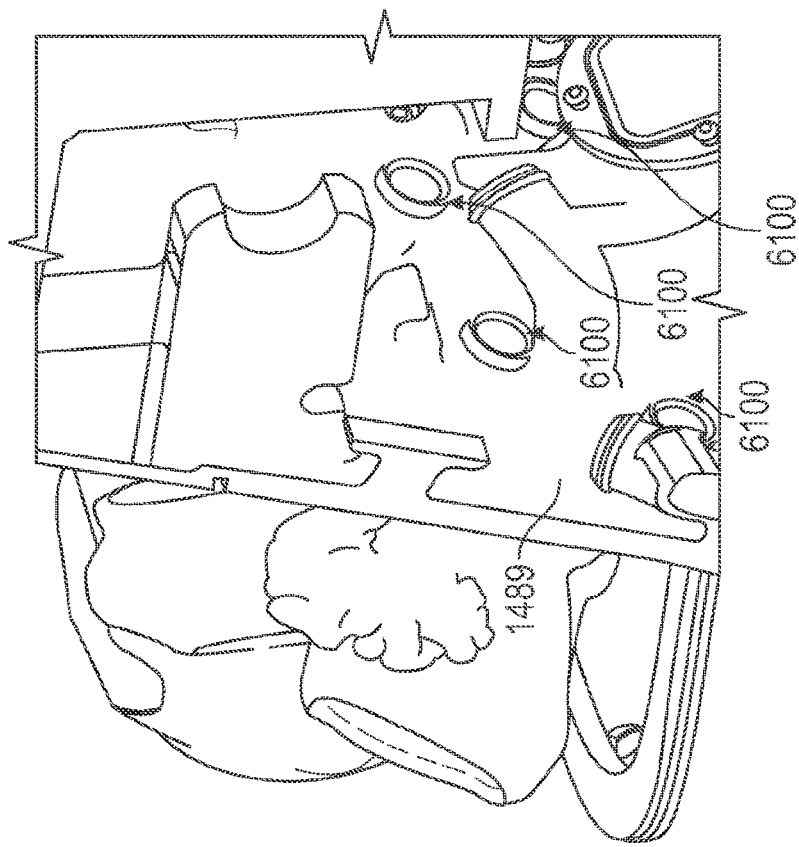
FIG. 61 illustrates a schematic perspective view of securement members on a sidewall of a tank of station, according to aspects of the disclosure.
Figure 60:
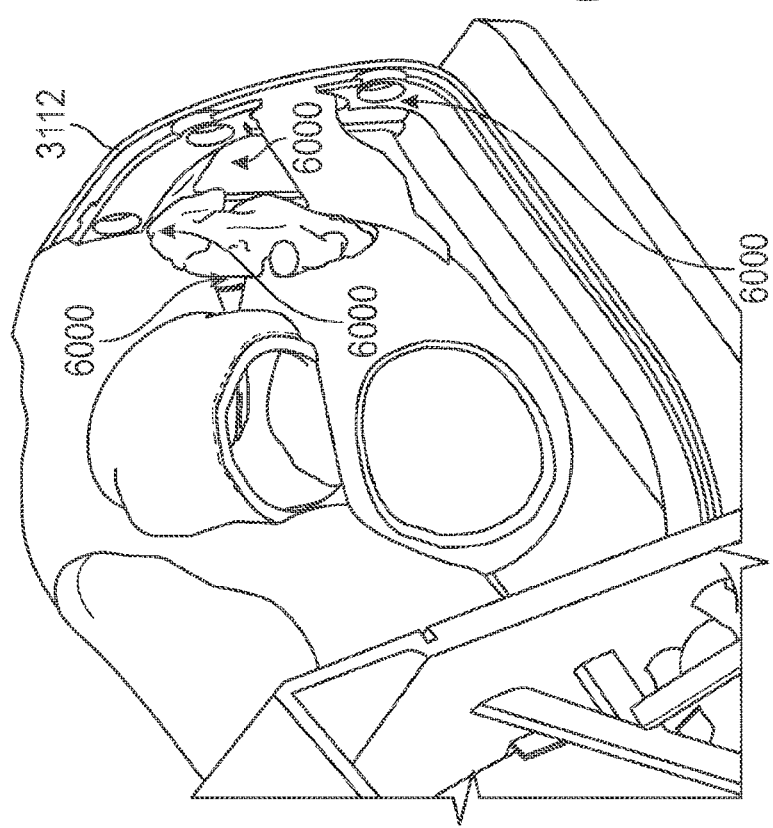
FIG. 60 illustrates a schematic perspective view of securement members on a frame of a patient-specific cartridge, according to aspects of the disclosure.
Figure 62:
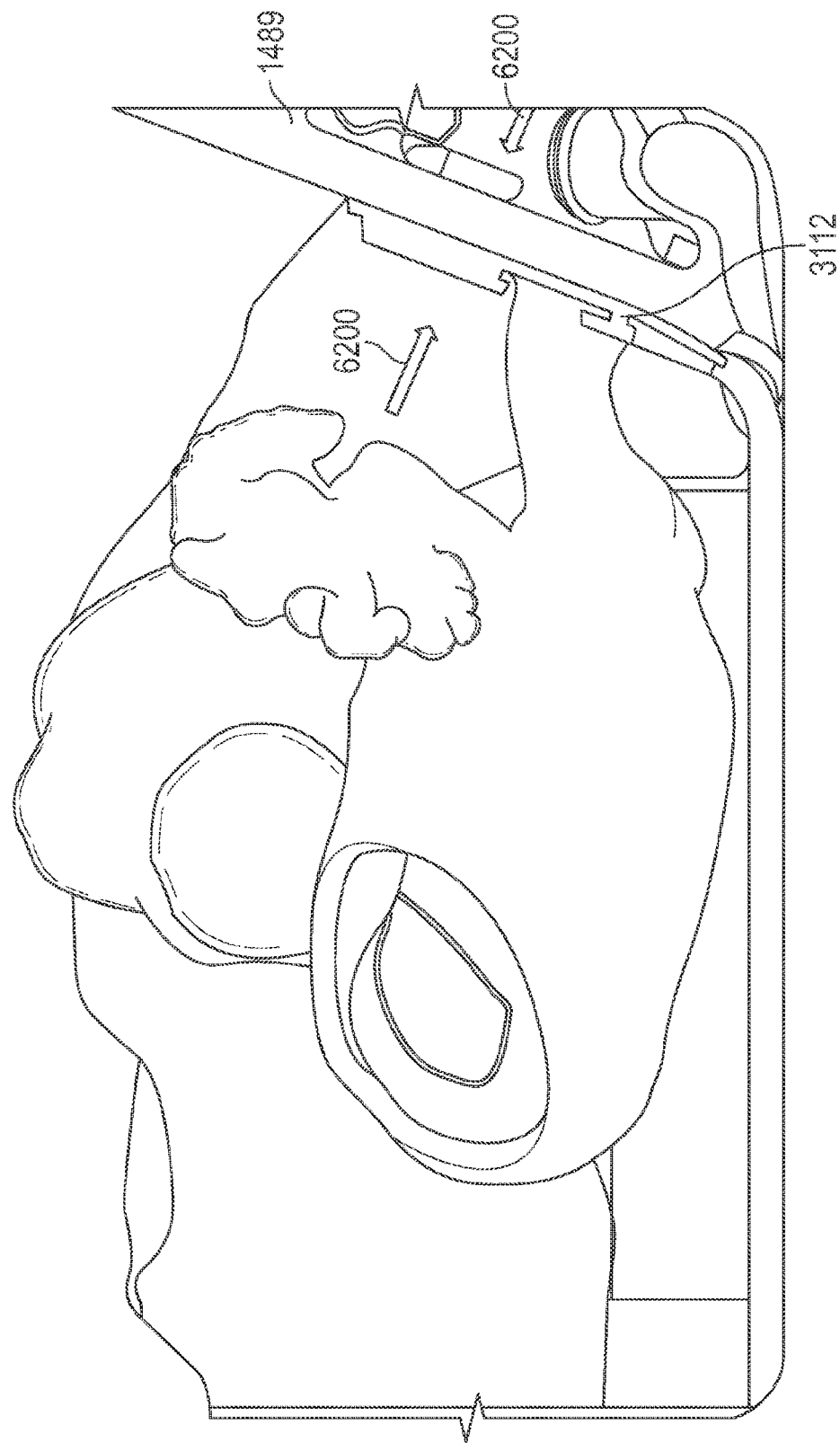
FIG. 62 illustrates a schematic side view of a securement interaction between securement members on a sidewall of a tank of station and corresponding securement members of a frame of a patient-specific cartridge, according to aspects of the disclosure.

FIG. 60 shows how portion 3112 of frame 2500 can include engagement features such as magnets 6000. As shown in FIG. 61, sidewall 1489 of tank 306 may be provided with corresponding engagement features 6100 for engagement with engagement features 6000 on frame 2500, to secure cartridge 308 within tank 306. For example. FIG. 62 includes arrows 6200 illustrating a magnetic engagement between portion 3112 of frame 2500 and sidewall 1489 of tank 306. Magnets 6000, disposed on the patient-independent frame 2500 (e.g., along with magnets 6100 in the sidewall of tank 306) help facilitate plug-and-play installation and removal of the patient-specific cartridge 308 in the surgical simulator device 202.

In the examples of FIGS. 60-62, the frame 2500 includes a base portion 3108 configured to abut a bottom surface 1402 of the tank 306 when the patient-specific cartridge 308 is installed in the tank. The frame 2500 also includes an opening 2609 configured to align with an access port 718 on a first sidewall 1491 of the tank 306, and a proximal portion 3112 including at least one engagement member (e.g., one or more of magnets 6000) configured to engage with a corresponding engagement member (e.g., one or more of magnets 6100) on an opposing second sidewall 1489 of the tank 306.

Figure 63:
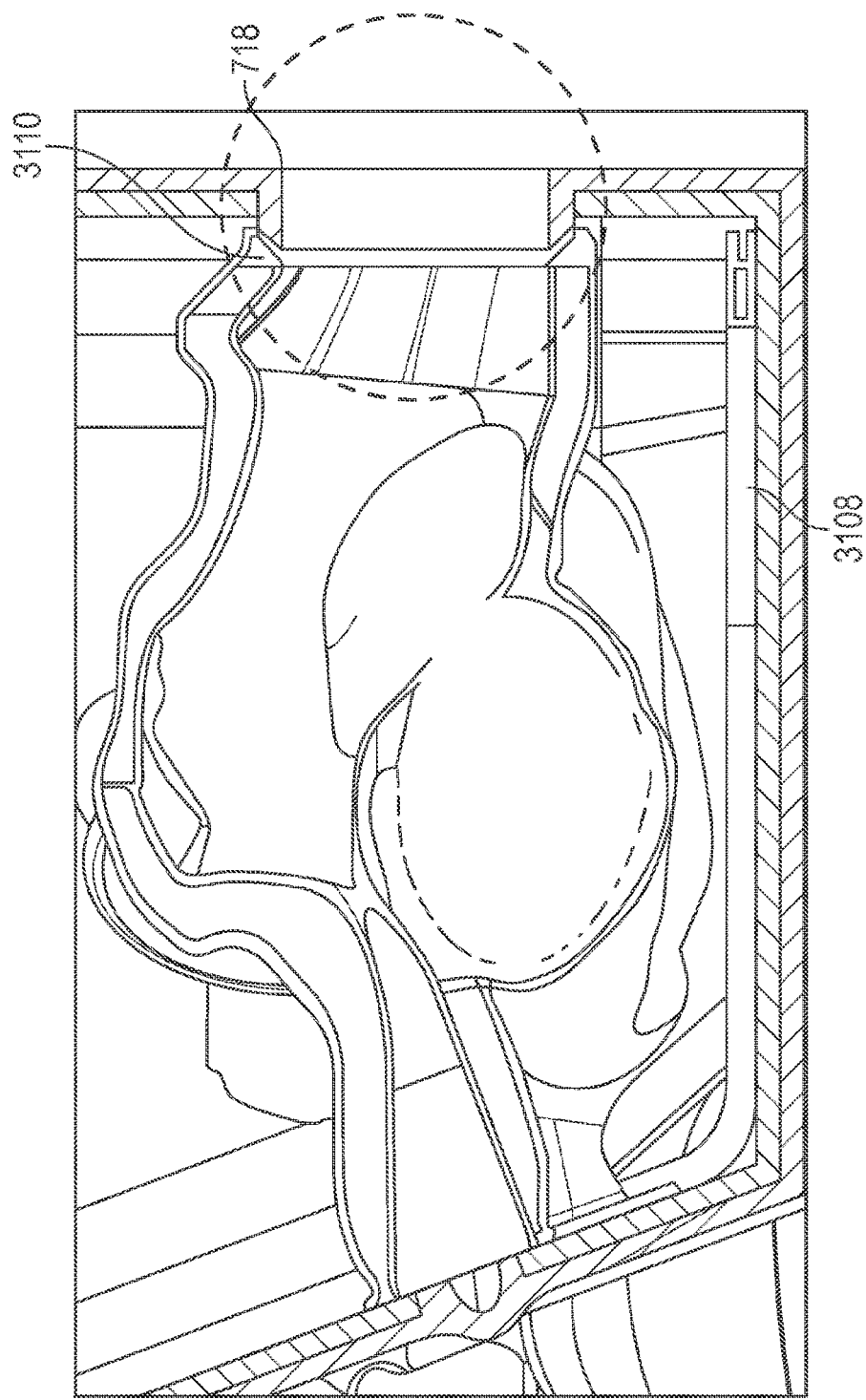
FIG. 63 illustrates a schematic side view of a securement interaction between an access port of a tank of station and a distal support of a frame of a patient-specific cartridge, according to aspects of the disclosure.

FIG. 63 shows how, when magnetic engagement between portion 3112 of frame 2500 and sidewall 1489 of tank 306 holds a first side of frame 2500 in place within tank 306, an engagement between access port 718 and distal portion 3110 of frame 2500 may hold the opposing side of frame 2500 in place within tank 306.

As one illustrative example of a method of using the technology disclosed herein, a method is described that includes providing a surgical simulation device 202 having a station 300 having a housing 309, a tank 306 formed in the housing 309, and a vascular access system 302 coupled to the housing. The method may include providing, in the tank 306, a patient-specific cartridge 308 that includes a patient-specific model 2502 of at least a portion of a heart of a patient. The method may also include inserting an imaging device, such as an ultrasound probe 505, through an esophageal access system 700 within the housing from an esophageal access port 304 on the housing, though a first port 714 in the tank, and into a recess 1400 in a bottom surface 1402 of the tank 306 beneath the patient-specific cartridge 308. The method may also include inserting a surgical element (e.g., a guidewire and/or one or more cardiac interventional devices) from a vascular access port 310 of the vascular access system 302, through a main lumen 1700 of the vascular access system, and into a portion of the patient-specific model 2502 via a second port 718 in the tank 306. The method may also include, prior to providing the patient-specific cartridge 308 in the tank 306, coupling first, second, and third interfacing portions 3100, 3103, and 3102 of the patient-specific model 2502 to corresponding first, second, and third openings 2609, 2611, and 2613 in a frame 2500 of the patient-specific cartridge 308. The method may also include circulating a blood simulation fluid 307 through the tank 306 and at least portions of the patient-specific model 2502 (e.g., using fluid control system 909). The method may also include heating the blood simulation fluid 307 with a heater 4900 in the station 300. The method may also include, prior to heating the blood simulation fluid 307 with the heater 4900 in the station 300, pre-heating the blood simulation fluid 307 with an accessory heater (e.g., accessory heater 5100 or accessory heater 5300) configured to attach to at least one sidewall 5110 of the station 300. The method may also include obtaining fluoroscopy images of the patient-specific cartridge 308 using x-ray attenuating material in or one the patient-specific model 2502, while the patient-specific cartridge is in the tank.

The patient-specific model may include a right atrium, a septum, and a left atrium, and the method may include inserting, via the second port in the tank, the surgical element into the right atrium of the patient-specific model. The method may also include puncturing the septum of the patient-specific model with the surgical element. The method may also include passing a device through the punctured septum into the left atrium of the patient-specific model. The patient-specific model may also include a left atrial appendage, and the method may also include occluding the left atrial appendage of the patient-specific model with the device. The septum, the left atrium, and the left atrial appendage of the patient-specific model have mechanical and acoustic characteristics that correspond to mechanical and acoustic characteristics, respectively, of a septum, a left atrium, and a left atrial appendage of the patient. The method may also include generating an ultrasound image of the patient-specific cartridge using the imaging device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above in certain combinations and even initially claimed as such, one or more features from a claimed combination can in some cases be excised from the combination, and the claimed combination may be directed to a sub-combination or variation of a sub-combination.

Similarly, while operations may be described herein in a particular order, this should not be understood as requiring that such operations be performed in the particular order or in sequential order, or that all illustrated operations be performed, to achieve desirable results.

Moreover, the separation of various system components in the implementations described above should not be understood as requiring such separation in all implementations, and it should be understood that the described components and systems can generally be integrated together in a single product or packaged into multiple products.

Implementations of portions of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of portions of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A surgical simulation device, comprising:
   a patient-specific cartridge that includes a patient-specific model of at least a portion of a heart of a patient, the patient-specific model including at least a portion configured to mimic an anatomical shape and a mechanical behavior of the portion of the heart of the patient;
   a station having a housing;
   a tank formed in the housing and configured to receive the patient-specific cartridge;
   an esophageal access system extending within the housing between an esophageal access port on the housing and a first port in the tank; and
   a vascular access system comprising a first end with a vascular access port and a second end configured to be fluidly coupled to a second port in the tank.

2. The surgical simulation device of claim 1, further comprising a recess in a bottom surface of the tank and aligned with the first port in the tank, wherein the recess has a width along the bottom surface of the tank that is wider than a transesophageal echocardiography probe.

3. The surgical simulation device of claim 1, wherein the portion of the heart includes a right atrium, a left atrium, a circumflex artery, an aorta, mitral valve, left ventricle, a left atrial appendage, and a septum of the heart.

4. The surgical simulation device of claim 3, wherein the right atrium of the patient-specific model is fluidically coupled to an internal lumen within the vascular access system that replicates at least a femoral vein, a common iliac vein, and an inferior vena cava of a generic patient.

5. The surgical simulation device of claim 1, wherein the vascular access system comprises a sealing membrane at a proximal end thereof, and wherein the station comprises an access port that extends from an interface with the vascular access system to the second port in the tank.

6. The surgical simulation device of claim 1, wherein the esophageal access system comprises first and second pipe sections within the housing, the first pipe section extending from the esophageal access port on the housing to the second pipe section, and the second pipe section extending from the first pipe section to the first port in the tank.

7. The surgical simulation device of claim 6, wherein the first pipe section includes a first bend at a proximal end, and a substantially straight conduit extending from the first bend to the second pipe section,
   wherein the second pipe section includes a second bend, wherein the second bend forms an angle of between one hundred thirty degrees and one hundred seventy degrees between the substantially straight conduit and a bottom surface of the tank,
   wherein the esophageal access system further comprises a first membrane at the esophageal access port and a second membrane at an interface between the first pipe section and the second pipe section.

8. The surgical simulation device of claim 1, wherein the esophageal access port, the vascular access port, and the tank are relatively positioned to replicate relative positions, respectively, of a mouth, a femoral vein access location, and a heart of a generic patient.

9. The surgical simulation device of claim 1, wherein the patient-specific model comprises a fossa ovalis having two outer layers and an inner reinforced layer, the inner reinforced layer including an array of honeycomb structures.

10. The surgical simulation device of claim 9, wherein the fossa ovalis of the patient-specific model has a flexibility that decreases with increasing radial distance from a center thereof.

11. The surgical simulation device of claim 1, wherein the patient-specific cartridge comprises a frame configured to couple the patient-specific model to the tank, wherein the frame comprises first, second, and third openings configured to align with first, second, and third access ports in the tank.

12. The surgical simulation device of claim 11, wherein the patient-specific model comprises:
   a patient-specific portion that corresponds to the anatomical shape of the portion of the heart of the patient; and
   first, second, and third interfacing portions that deviate from the anatomical shape of the corresponding portions of the patient's heart to extend between the patient-specific portion and the first, second, and third openings.

13. The surgical simulation device of claim 12, wherein the first, second, and third interfacing portions correspond, respectively, to a superior vena cava interfacing portion, an inferior vena cava interfacing portion, and a pulmonary vein interfacing portion of the patient-specific model.

14. The surgical simulation device of claim 12, wherein the patient-specific model comprises a simulated right atrium having a window.

15. The surgical simulation device of claim 11, wherein the frame comprises:
   a base portion configured to abut a bottom surface of the tank when the patient-specific cartridge is installed in the tank; and
   an opening configured to align with an access port on a first sidewall of the tank; and
   a proximal portion comprising at least one engagement member configured to engage with a corresponding engagement member on an opposing second sidewall of the tank.

16. The surgical simulation device of claim 1, wherein the patient-specific model comprises at least one wall portion having an x-ray attenuating coating.

17. The surgical simulation device of claim 1, wherein the patient-specific model comprises at least one wall portion having an outer layer, an inner layer, and an x-ray attenuating material interposed between the outer layer and the inner layer.

18. The surgical simulation device of claim 1, further comprising a spinal simulation card disposed outside the tank adjacent to a bottom wall of the tank.

19. The surgical simulation device of claim 1, further comprising a fluid control system in the station, configured to circulate a blood simulation fluid through the tank at least a portion of the patient-specific model, wherein the fluid control system comprises:
   an outlet pipe coupled to a first opening in the tank;

an inlet pipe coupled to a second opening in the tank; and a pump configured to move the blood simulation fluid through the inlet pipe, the tank, and the outlet pipe.

20. The surgical simulation device of claim 19, wherein the fluid control system further comprises a filter on the outlet pipe.

21. The surgical simulation device of claim 20, wherein the fluid control system further comprises a heater disposed between the pump and the second opening.

22. The surgical simulation device of claim 21, wherein the fluid control system further comprises a chamber having an air cavity disposed between the heater and the second opening.

23. The surgical simulation device of claim 22, wherein the fluid control system further comprises a flush valve, and a Y-pipe disposed between the flush valve and both the inlet pipe and the outlet pipe.

* * * * *